United States Patent
Regev

(10) Patent No.: US 12,019,439 B2
(45) Date of Patent: Jun. 25, 2024

(54) FREE WING MULTIROTOR WITH VERTICAL AND HORIZONTAL ROTORS

(71) Applicant: Colugo Systems Ltd., Yavne (IL)

(72) Inventor: Amit Regev, Moshav Bitzaron (IL)

(73) Assignee: COLUGO SYSTEMS LTD, Yavne (IL)

( * ) Notice: Subject to any disclaimer, the term of this patent is extended or adjusted under 35 U.S.C. 154(b) by 0 days.

(21) Appl. No.: 18/090,488

(22) Filed: Dec. 29, 2022

(65) Prior Publication Data

US 2023/0393572 A1 Dec. 7, 2023

Related U.S. Application Data

(63) Continuation of application No. 16/488,585, filed as application No. PCT/IL2018/050239 on Mar. 4, 2018, now Pat. No. 11,579,604.

(60) Provisional application No. 62/469,845, filed on Mar. 10, 2017.

(30) Foreign Application Priority Data

Jan. 15, 2018 (IL) .......................................... 256941

(51) Int. Cl.
| | |
|---|---|
| *G05D 1/00* | (2006.01) |
| *B64C 3/38* | (2006.01) |
| *B64C 29/00* | (2006.01) |
| *B64C 39/02* | (2023.01) |
| *B64U 10/13* | (2023.01) |
| *B64U 10/25* | (2023.01) |
| *B64U 30/10* | (2023.01) |
| *B64U 30/20* | (2023.01) |
| *B64U 50/13* | (2023.01) |

(52) U.S. Cl.
CPC ........... *G05D 1/0016* (2013.01); *B64C 3/385* (2013.01); *B64C 29/0033* (2013.01); *B64C 39/024* (2013.01); *B64U 10/13* (2023.01); *B64U 10/25* (2023.01); *B64U 30/10* (2023.01); *B64U 30/20* (2023.01); *B64U 50/13* (2023.01); *B64U 2201/20* (2023.01)

(58) Field of Classification Search
CPC ....... B64C 27/008; B64C 27/10; B64C 27/22; B64C 27/52; B64C 29/033; B64C 3/38; B64C 27/027; B64C 27/20; B64C 27/28; B64C 39/024; B64C 2201/027; B64C 2201/141; B64U 10/13; B64U 2201/10
USPC ........................................... 244/17.23; 701/2
See application file for complete search history.

(56) References Cited

U.S. PATENT DOCUMENTS

| | | | | |
|---|---|---|---|---|
| 10,809,716 | B2 * | 10/2020 | Zhong | H04N 23/62 |
| 11,079,752 | B1 * | 8/2021 | Lombardini | G05D 1/0016 |
| 2017/0060128 | A1 * | 3/2017 | Matloff | B64C 39/024 |
| 2017/0168481 | A1 * | 6/2017 | Flanigan | B64C 39/024 |
| 2017/0199521 | A1 * | 7/2017 | Tang | A63F 13/235 |
| 2018/0095492 | A1 * | 4/2018 | Matloff | A63H 27/12 |

(Continued)

*Primary Examiner* — Joshua E Rodden
(74) *Attorney, Agent, or Firm* — Shalom Wertsberger; Saltamar Innovations

(57) ABSTRACT

A multirotor aircraft that includes a chassis, three or more vertical rotors, one or more free wings and one or more fixed horizontal rotors. The free wing is attached to the chassis by an axial connection so that the angle of the free wing is changed relative to the chassis according the flow of air over the free wing. The fixed horizontal rotor enables the multirotor aircraft to lower and climb while flying forward at a stable horizontal pitch of the chassis.

3 Claims, 44 Drawing Sheets

(56) References Cited

U.S. PATENT DOCUMENTS

2021/0286355 A1* 9/2021 Chan .................... G05D 1/0033
2022/0326705 A1* 10/2022 Thompson ............ B64C 39/024

* cited by examiner

FIG. 1I
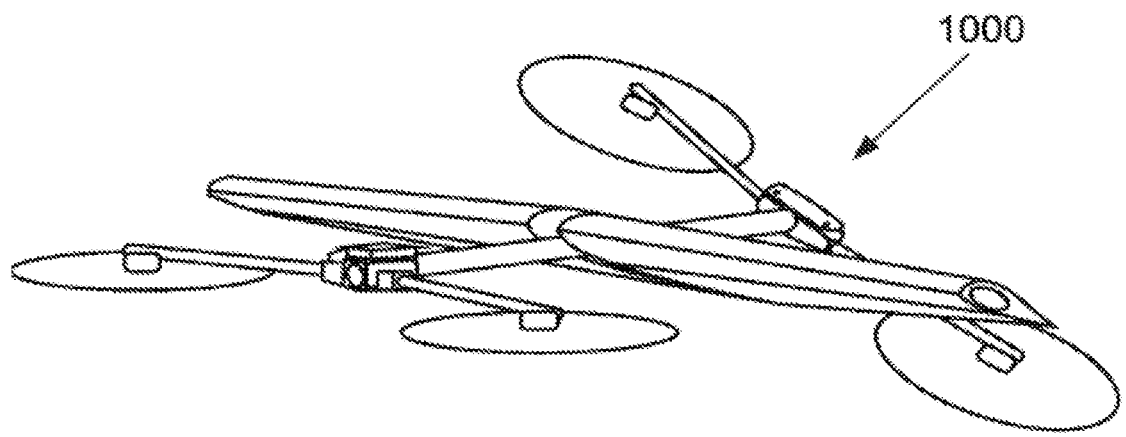
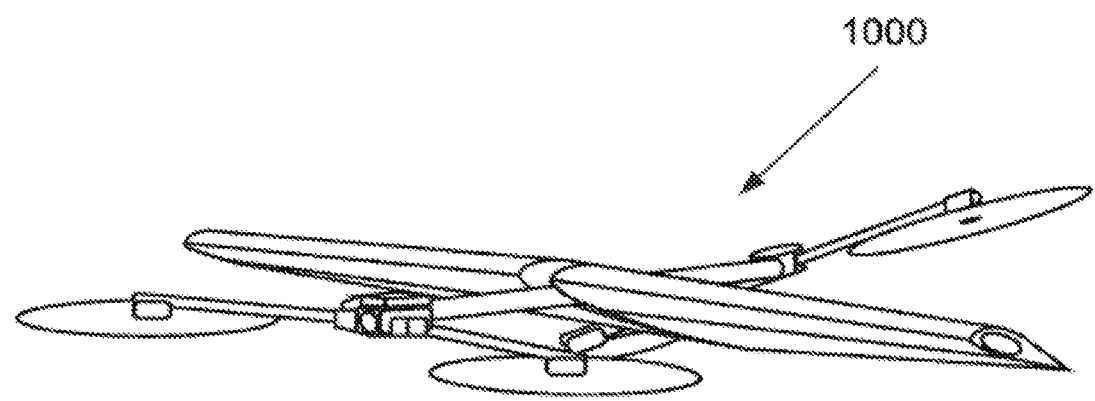
FIG. 1J

FIG. 2C
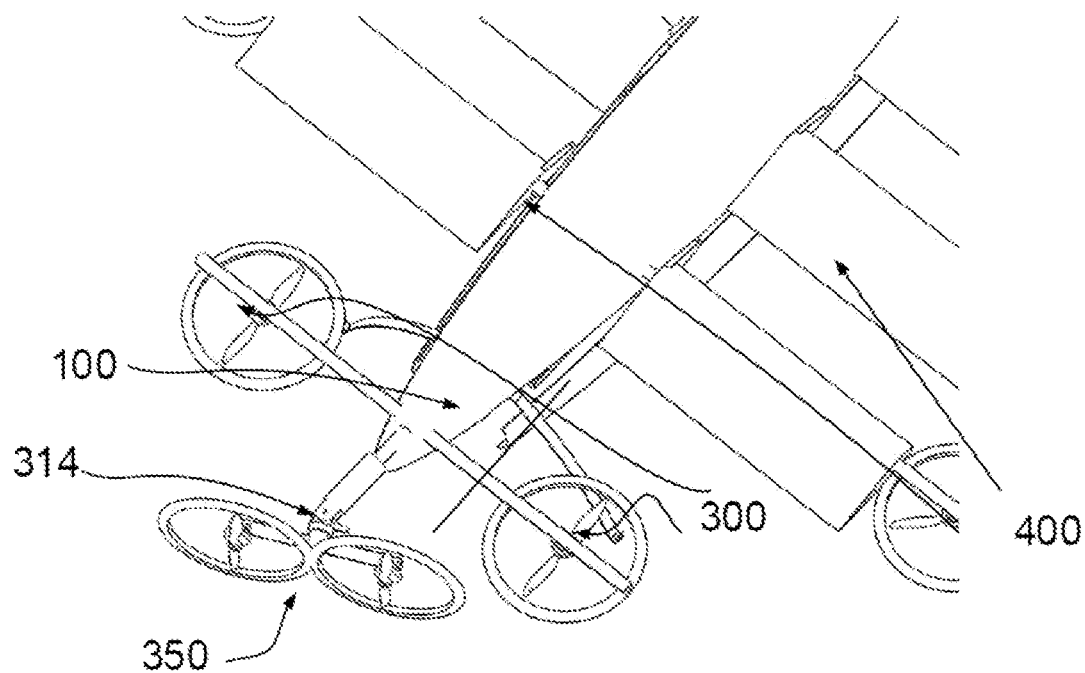
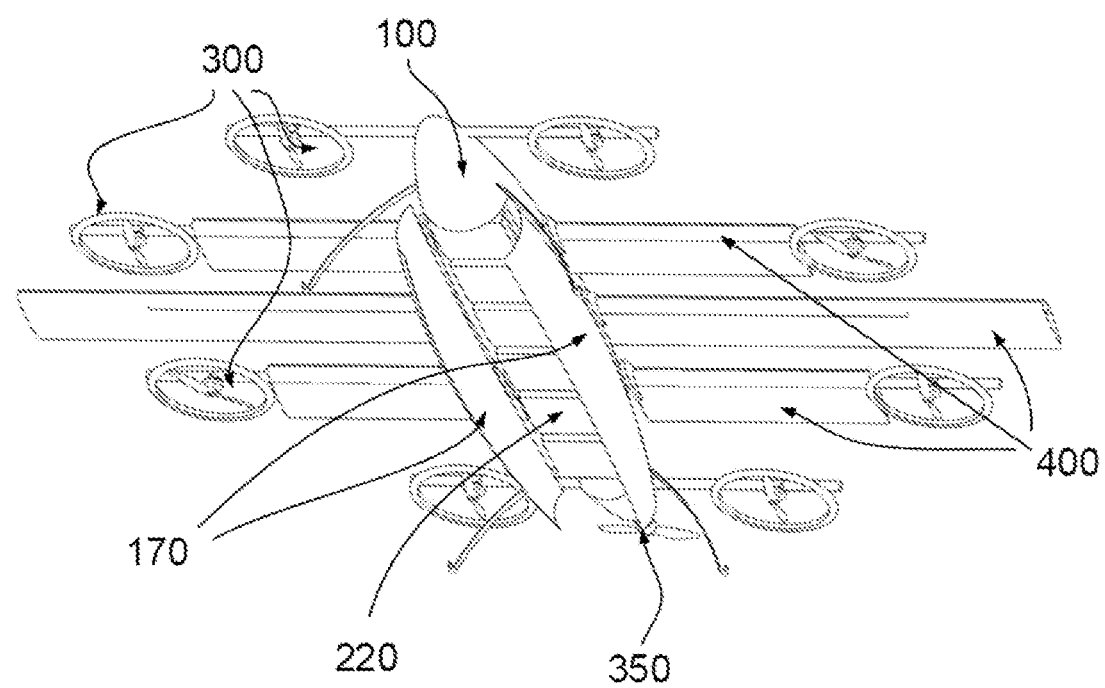
FIG. 2D

FIG. 2G
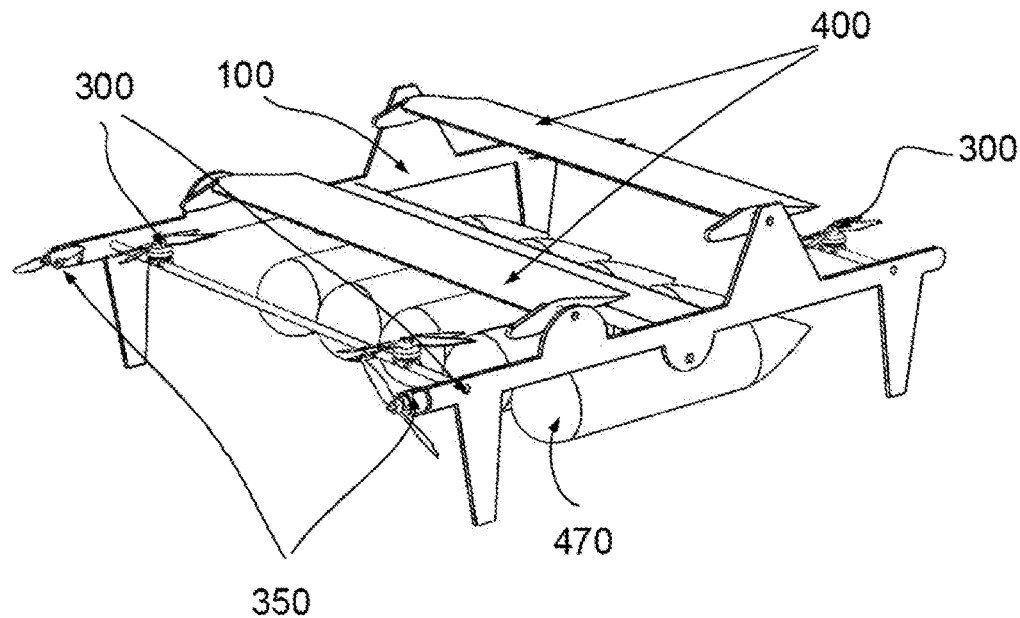
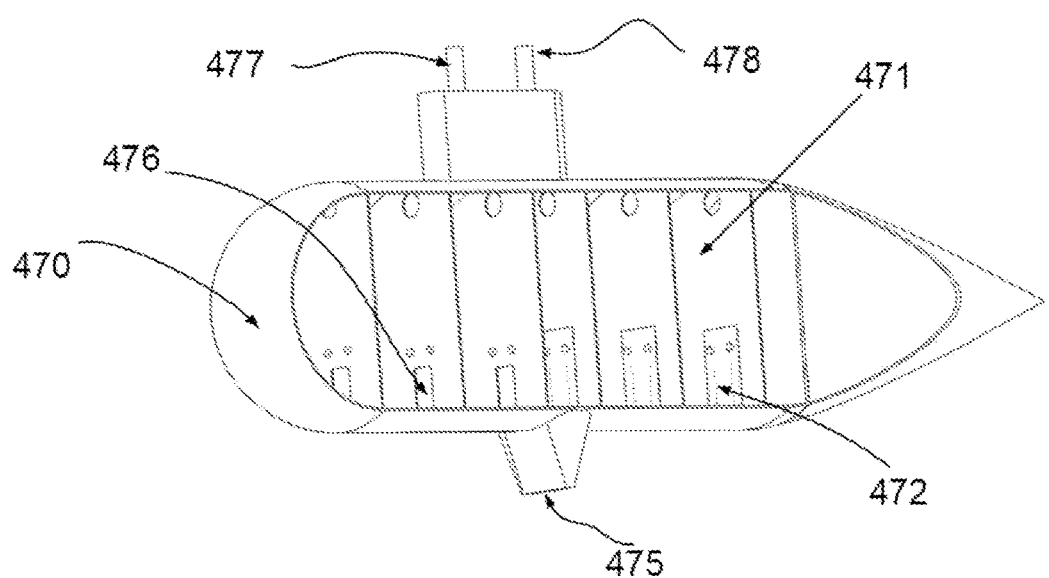
FIG. 2H

FIG. 3A
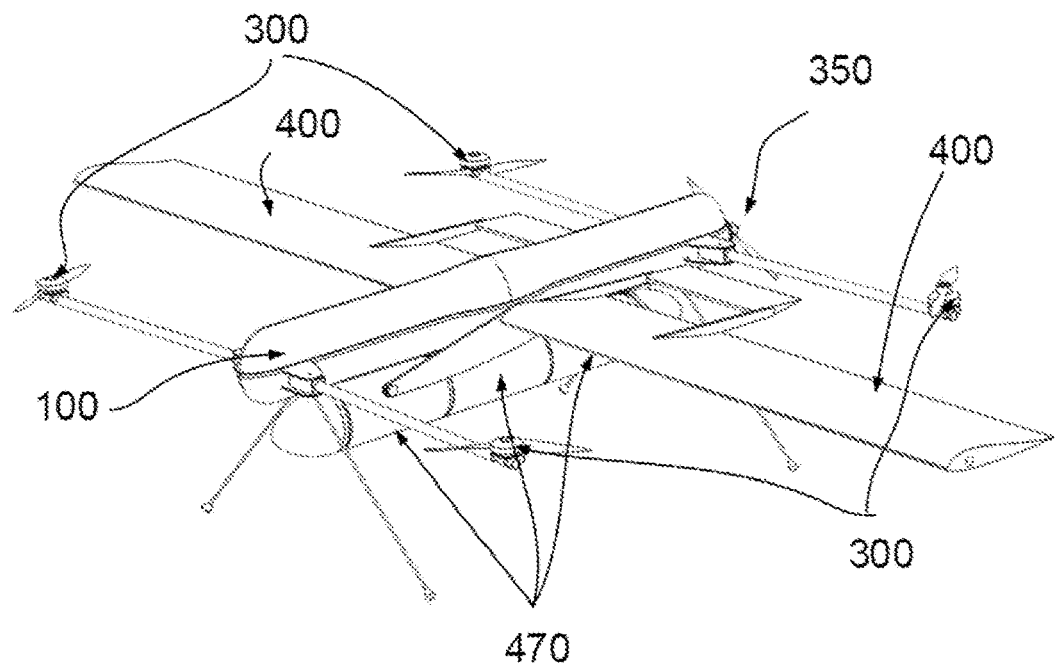
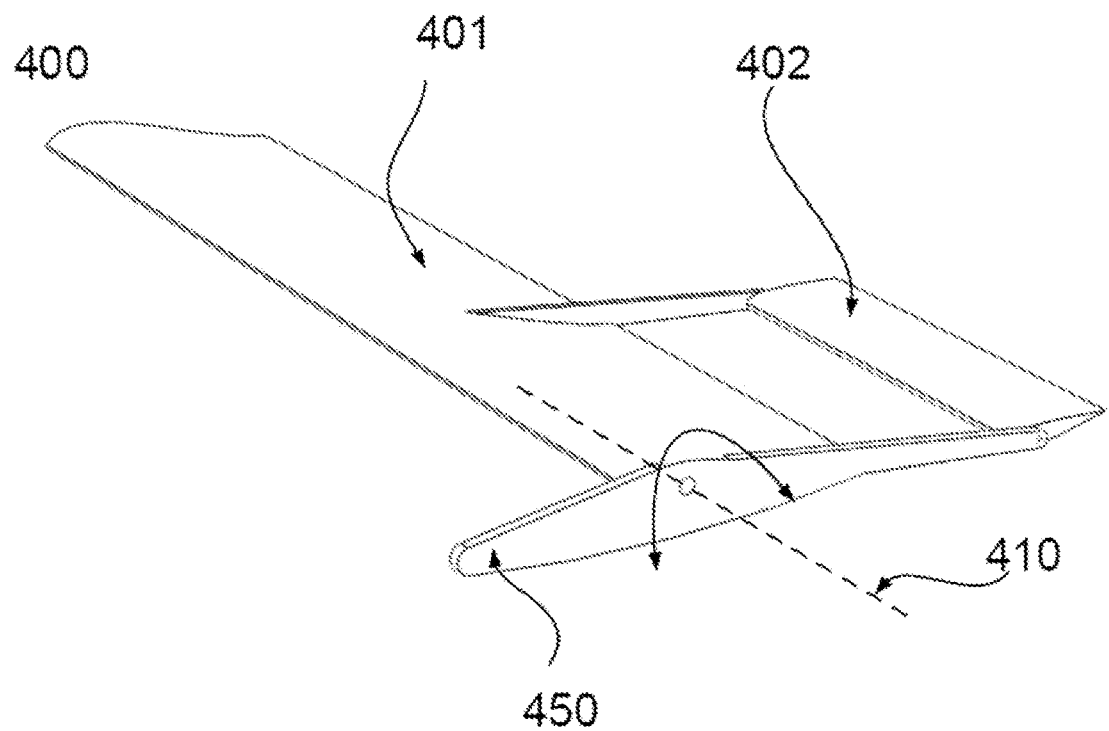
FIG. 3B

FIG. 4A
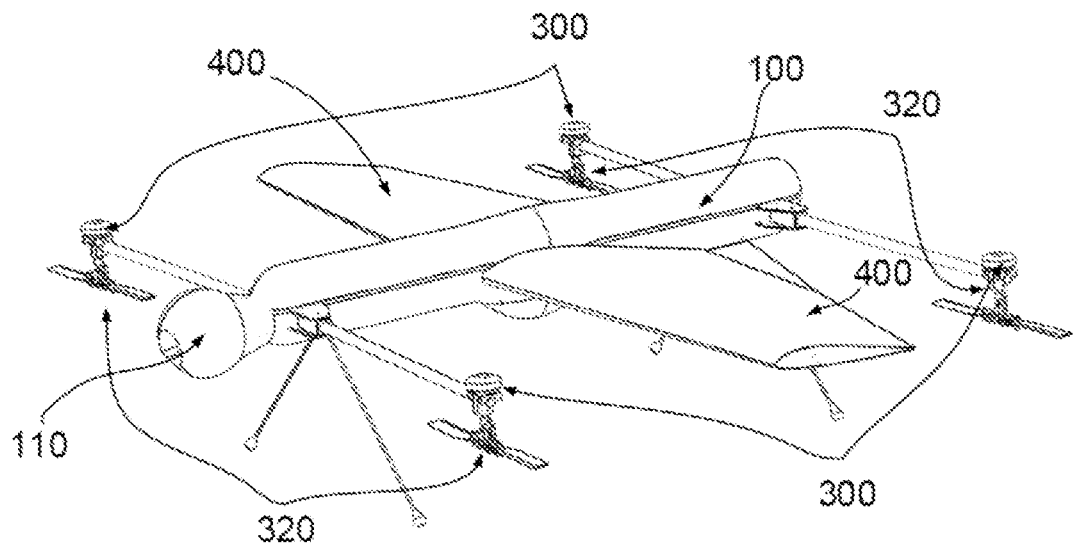
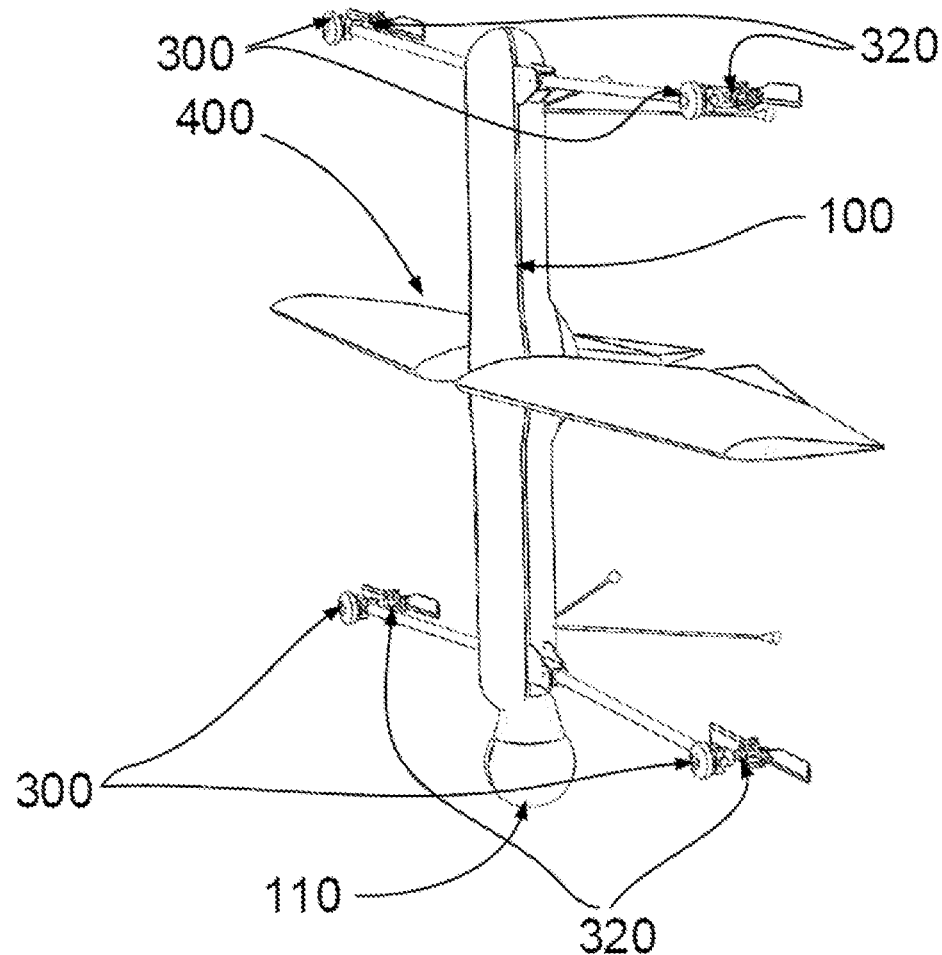
FIG. 4B

FIG. 5A
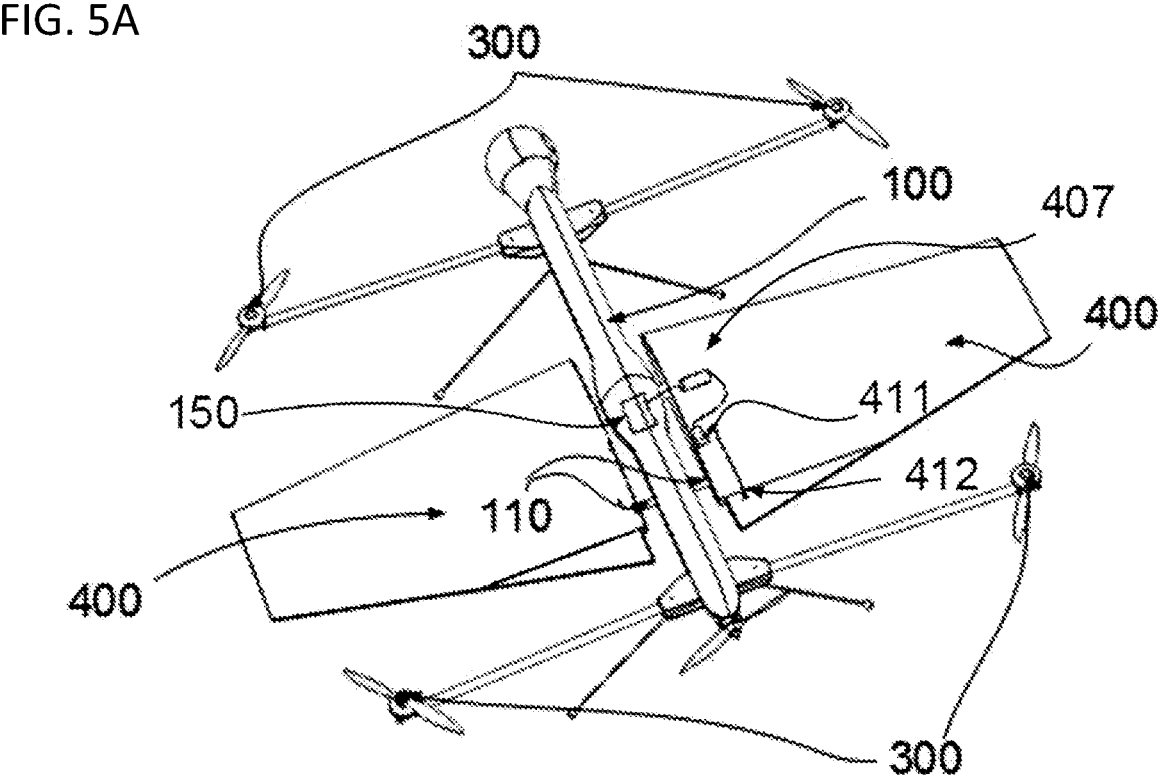
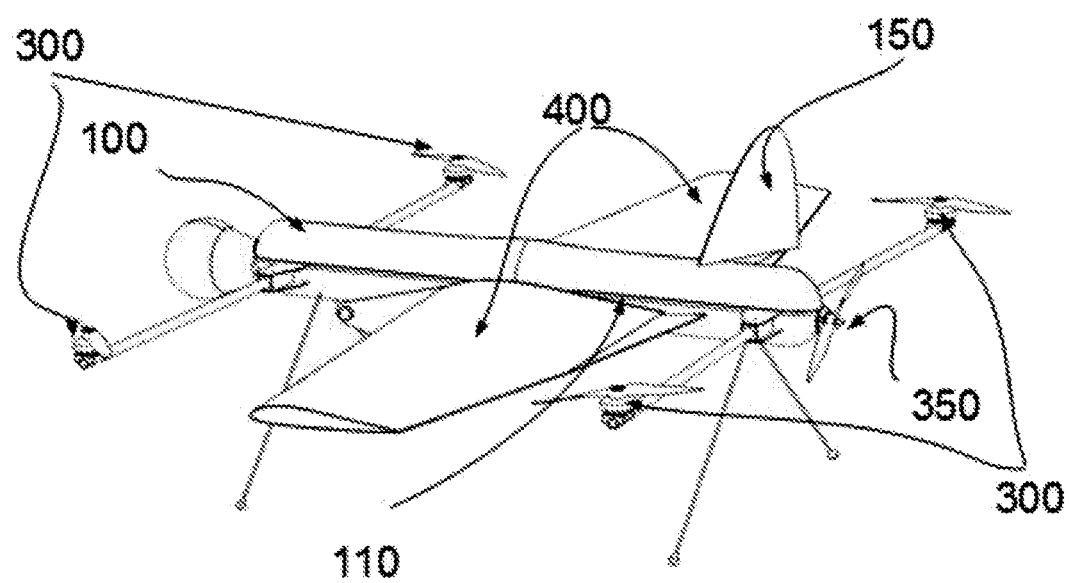
FIG. 5B

FIG. 9A
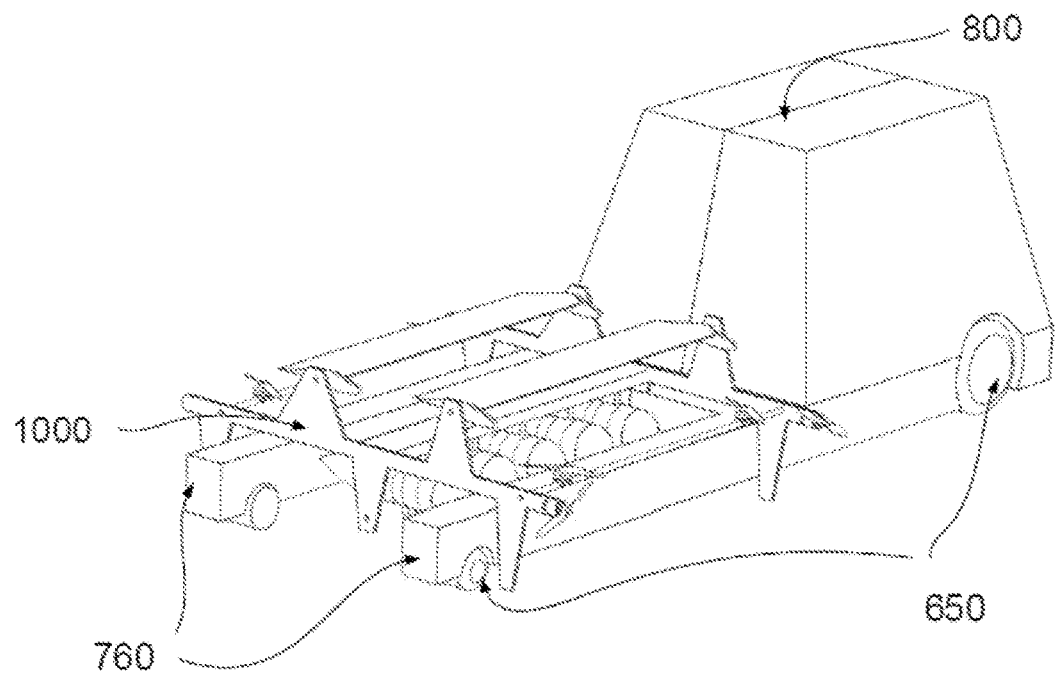
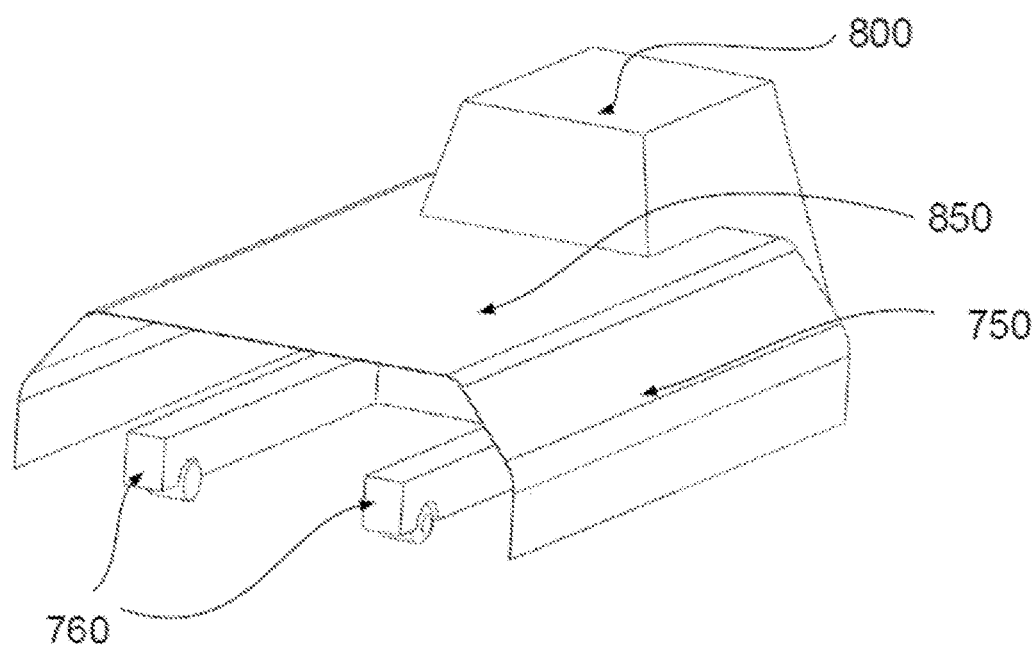
FIG. 9B

FIG. 9C
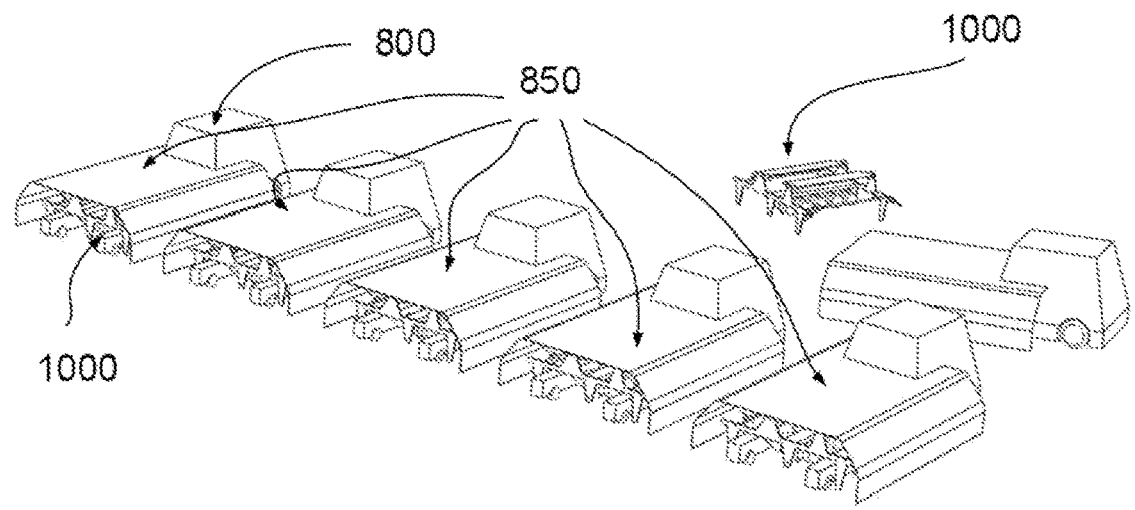
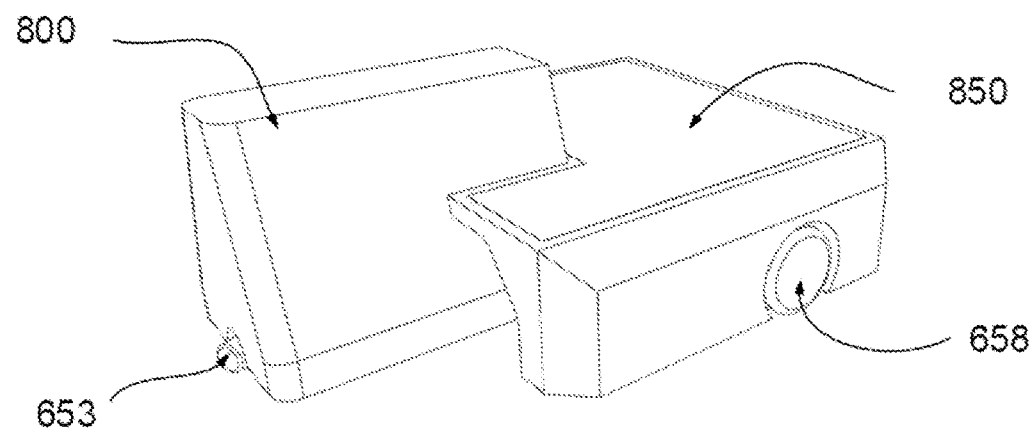
FIG. 9D

FIG. 10A
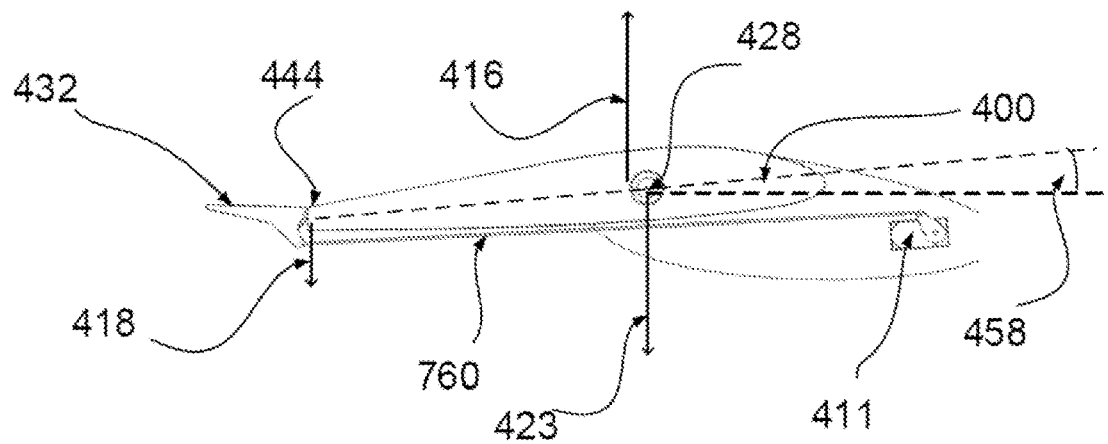
FIG. 10B
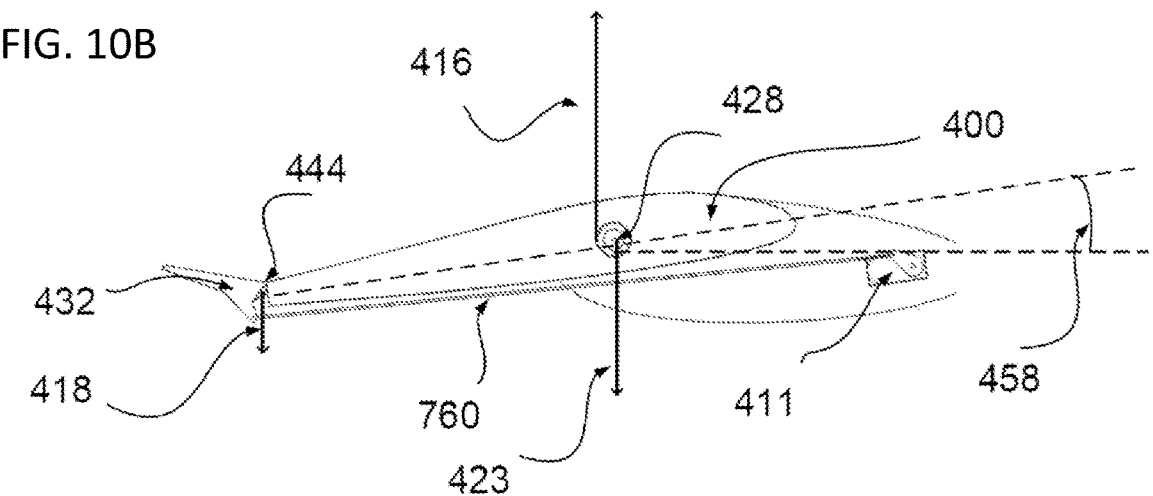
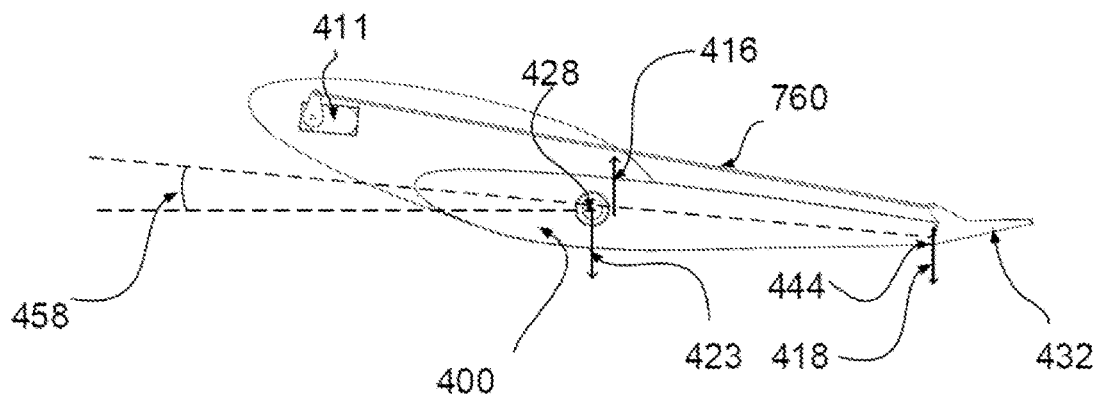
FIG. 10C

FIG. 14A
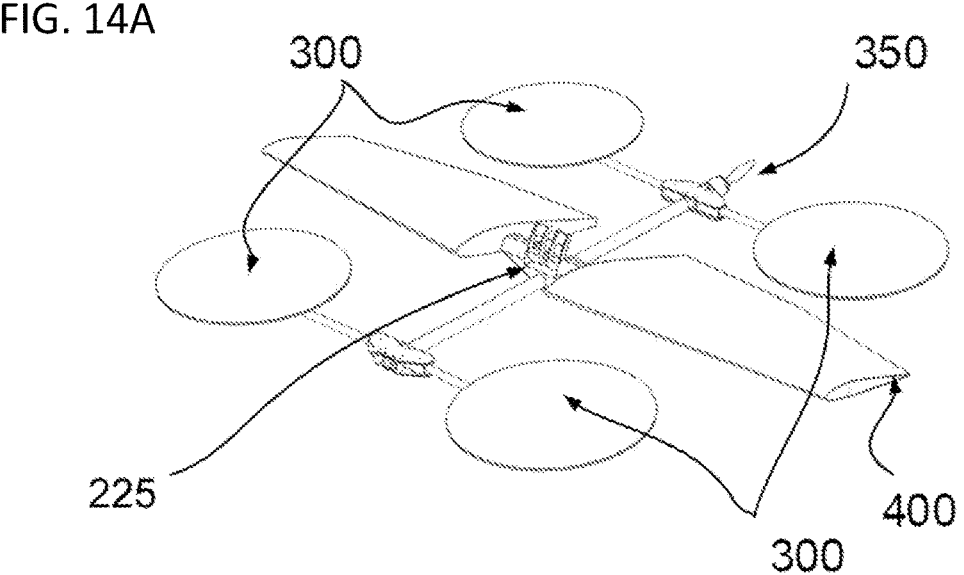
FIG. 14B
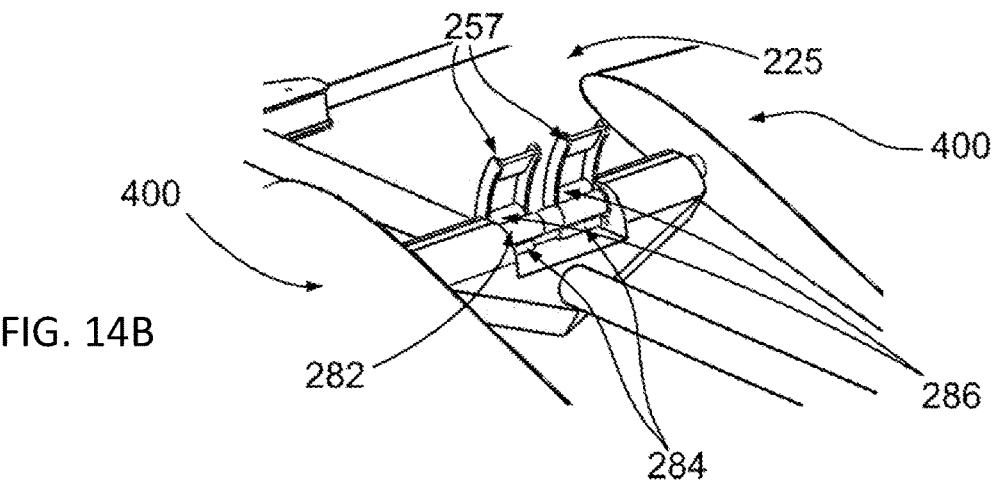
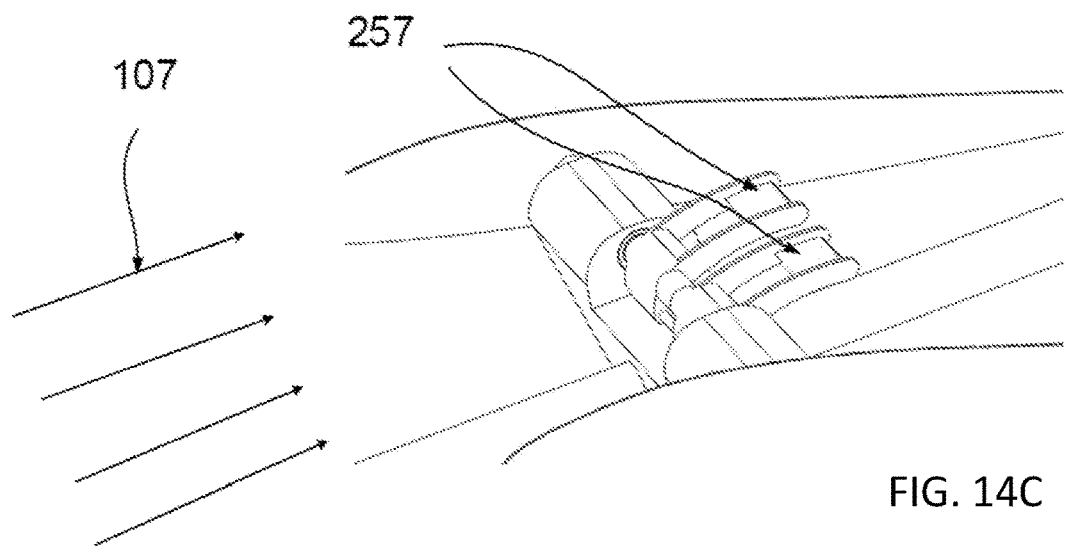
FIG. 14C

FIG. 15A
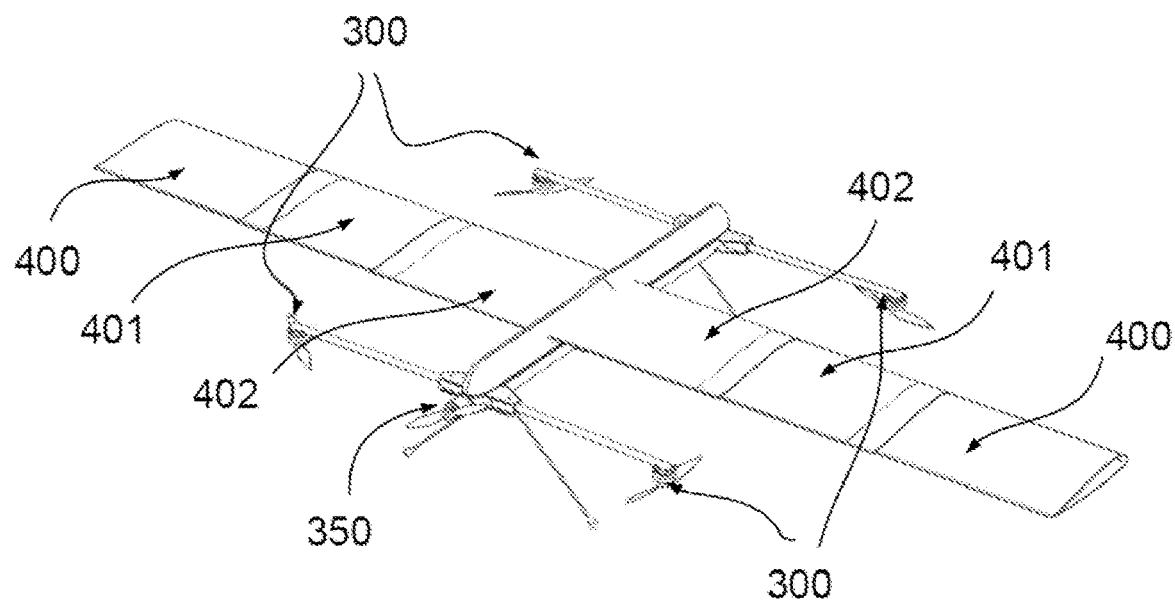
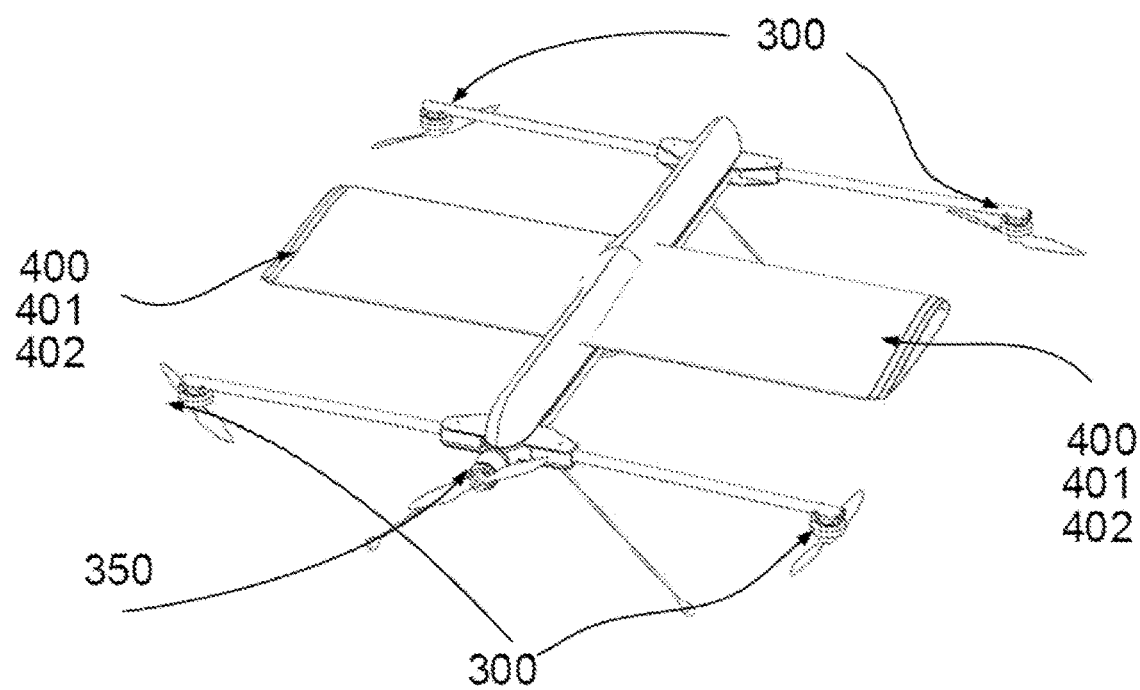
FIG. 15B

AVIONICS COMPONENTS

Figure Legend
MC= Motor Controller
M1= Motor 1

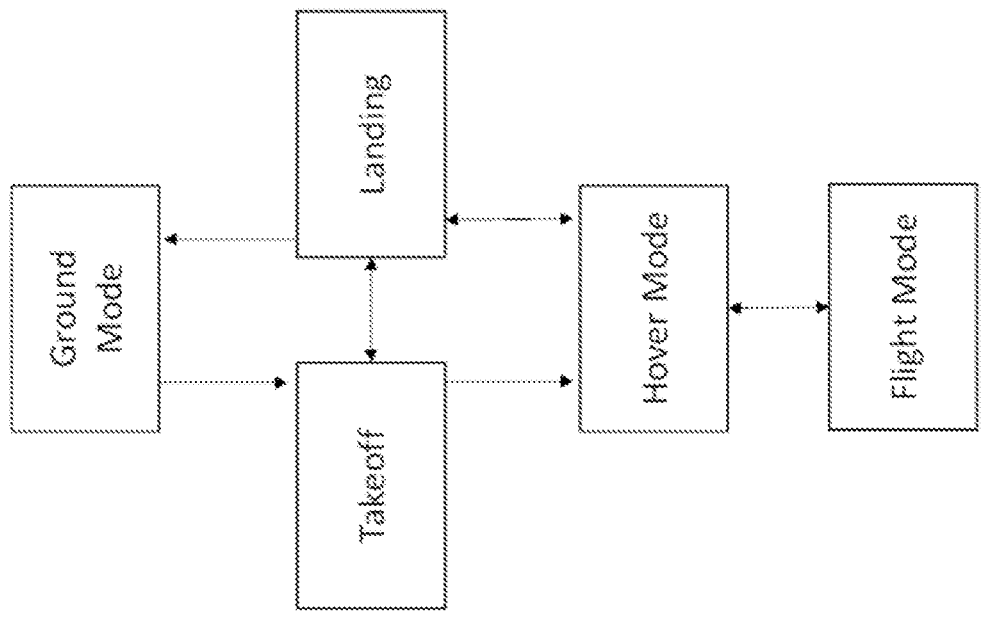

Basic Flight modes

- Transition conditions
  - Ground mode to Take off:
    - Arming motors/rotors
  - Takeoff to Hover:
    - Reaching predefined height or increase speed
  - Hover to Flight:
    - Activating push/pull rotor
  - Flight to hover:
    - Stop push rotor
  - Hover to Landing:
    - Reaching position and pre defined height and no speed
  - Landing to Hover:
    - Increase speed
  - Landing to Ground:
    - Disarming motors/rotors
  - Take of to Landing and vice versa (manual mode only)
    - Changing direction of vertical speed with throttle stick

FIG. 19

Ground mode

- Full control over wing plates
- full functionality of all sensors
- All motors are disarmed

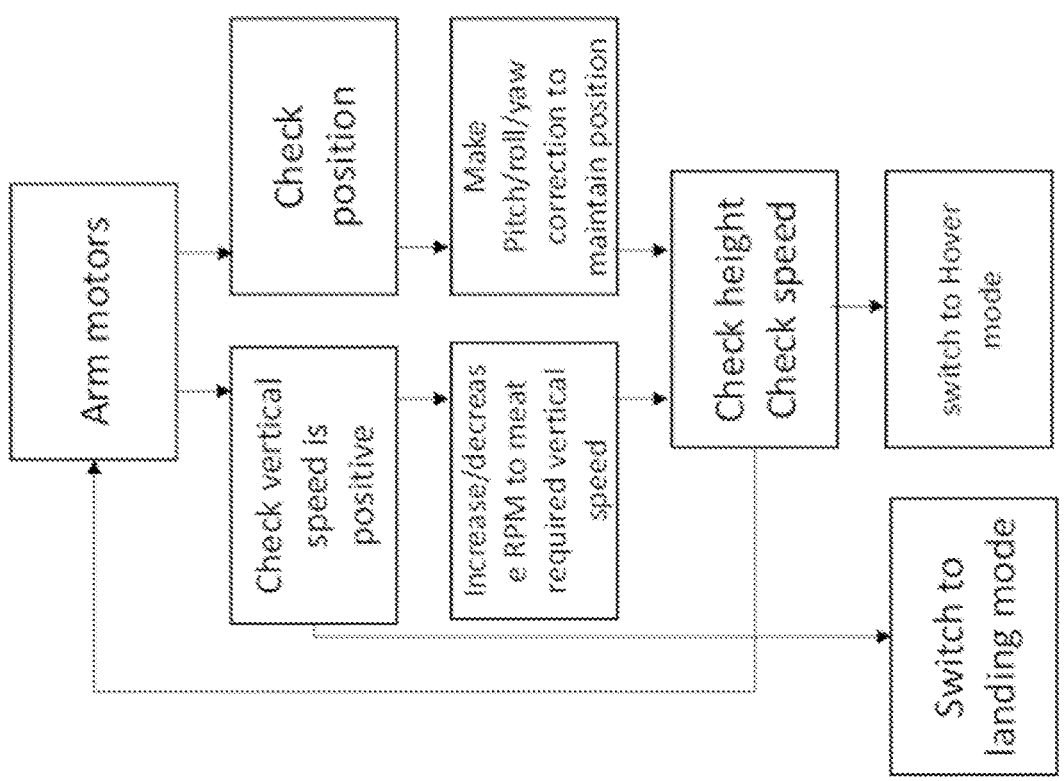

Takeoff mode

- Only vertical motors are controlling and stabilizing the drone
- Wings plates are locked in maximal lift state
- Only vertical speed allowed pitch roll and yaw are used to maintain position
- In manual mode throttle position defines vertical speed
- Negative vertical speed will switch to landing mode
- transition to hover upon reaching predefine height or speed > 0

FIG. 21

Hover mode

- Only vertical motors are controlling and stabilizing the drone
- Wings plates are changed to provide lift for required vertical speed
- In manual mode pitch stick controls push rotor RPM
- Opposite wing plates control when flying backward and wings are stabilized in opposite direction

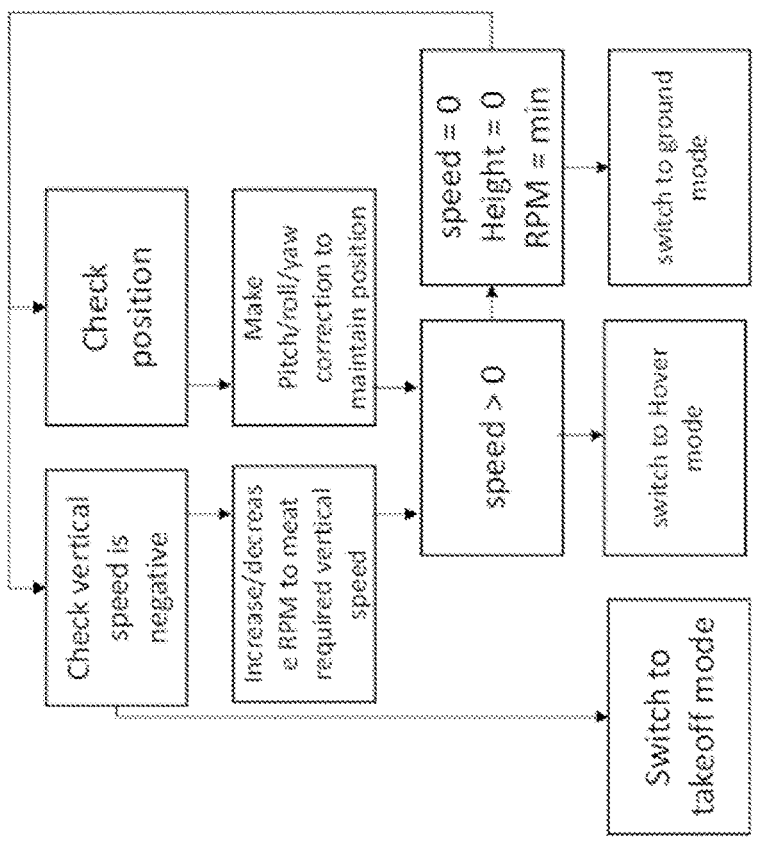

Landing mode

- Only vertical motors are controlling and stabilizing the drone
- Wings plates are locked in minimal lift state
- Only vertical speed allowed pitch roll and yaw are used to maintain position
- In manual mode throttle position defines vertical speed
- positive vertical speed will switch to takeoff mode
- transition to hover upon speed > 0
- Transition to ground upon measured airspeed and height = 0 and minimal RPM on rotors

FIG. 24

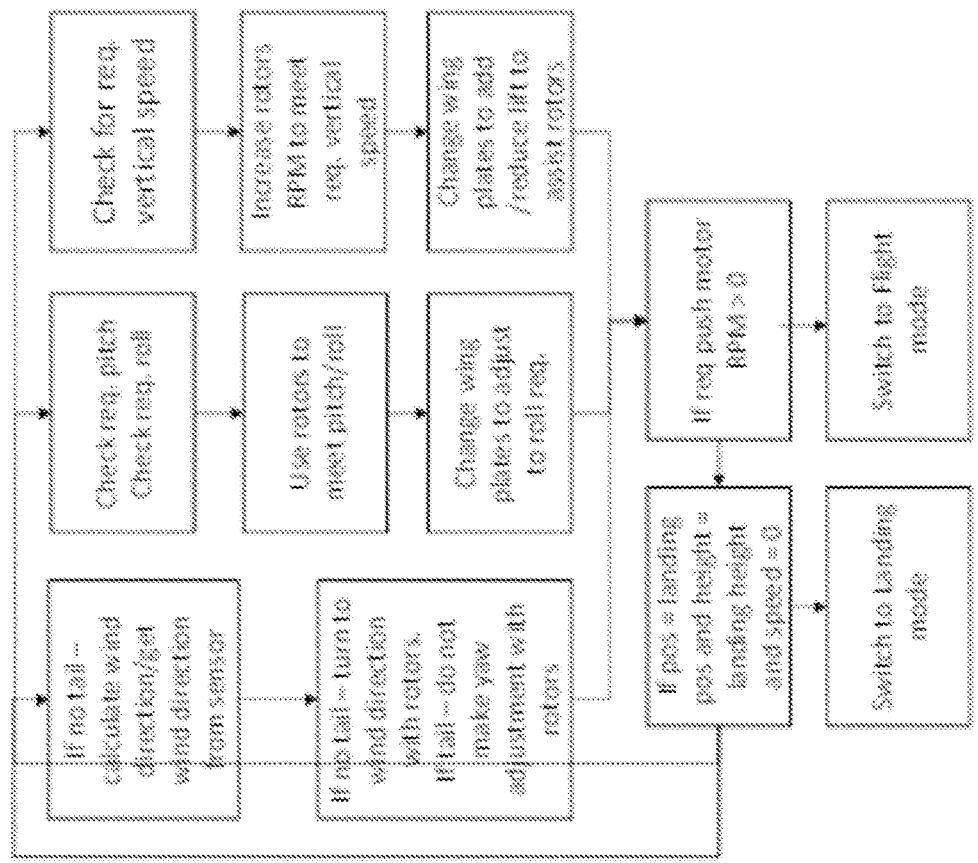

Wind facing hover mode

- Used to provide as much lift as possible from wind during hover.
- Wind direction may be calculate from:
  - GPS by measuring drift.
  - Change in relative position to Reference point on ground
  - wind sensor
- Locked or Static Yaw tail will automatically cause the drone to face the wind
- Wings plates are changed to provide lift for required vertical speed and assist rotors
- In manual mode pitch stick controls push rotor RPM
- In Order to save power the user may choose to use "Wind facing hover mode"

FIG. 25

Assisting wings with rotors in flight mode

- No wing support for Yaw and Pitch — always controlled by vertical rotors
- Roll and vertical is controlled by wing plats
- In low speed rotor always assist wings to control roll and vertical speed
- In high speed assistance is provided only if error in vertical speed or roll is bigger than a pre defined angle

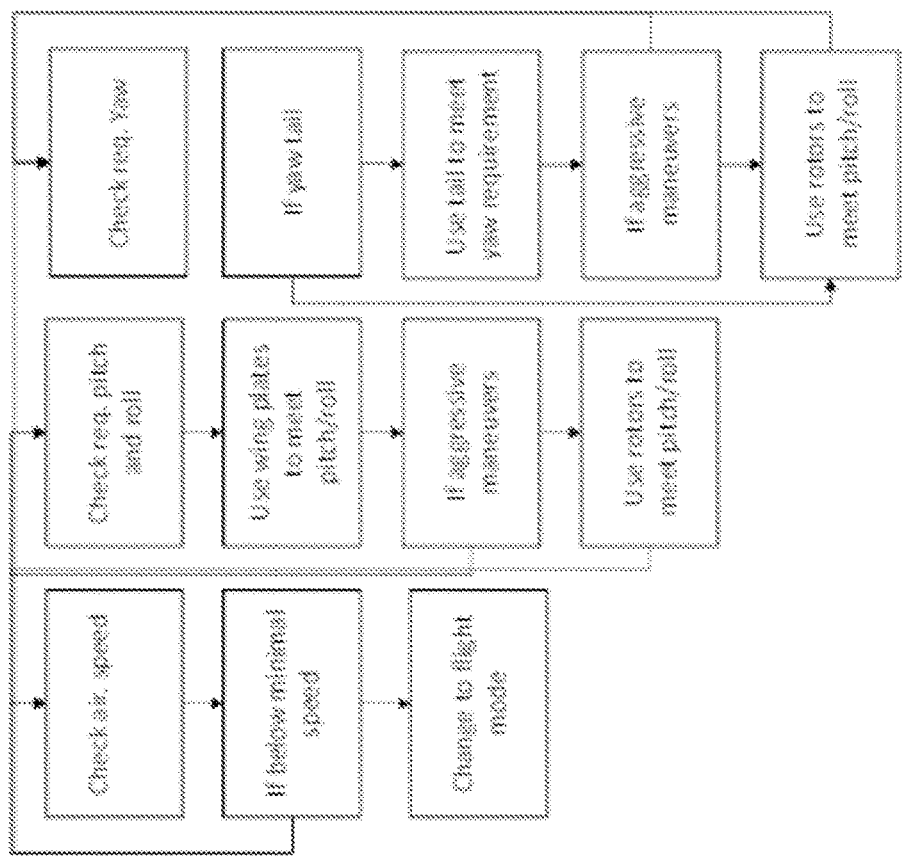

Plane mode

- Wings are locked in plane angle
- May be activated only above predefined speed that allows full control (pitch roll, yaw and speed) by wings plates, tail and push rotor.
- In case no yaw tail – rotors will provide yaw
- Below minimal speed normal flight mode will automatically be activated to avoid stalling.
- Rotor may provide assistance in order to provide more aggressive maneuvers

FIG. 27

FIG. 30A
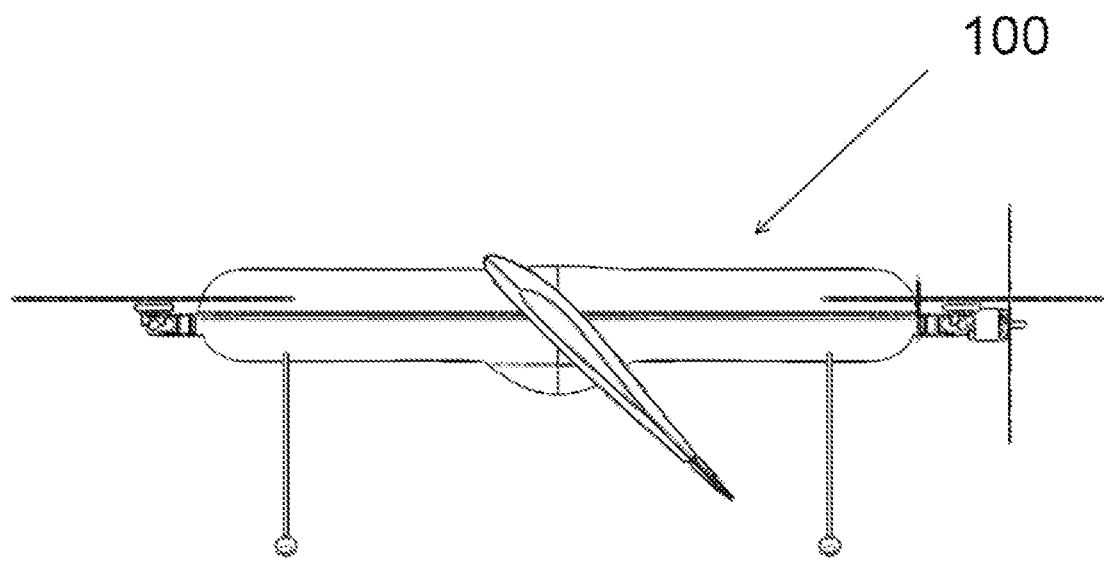
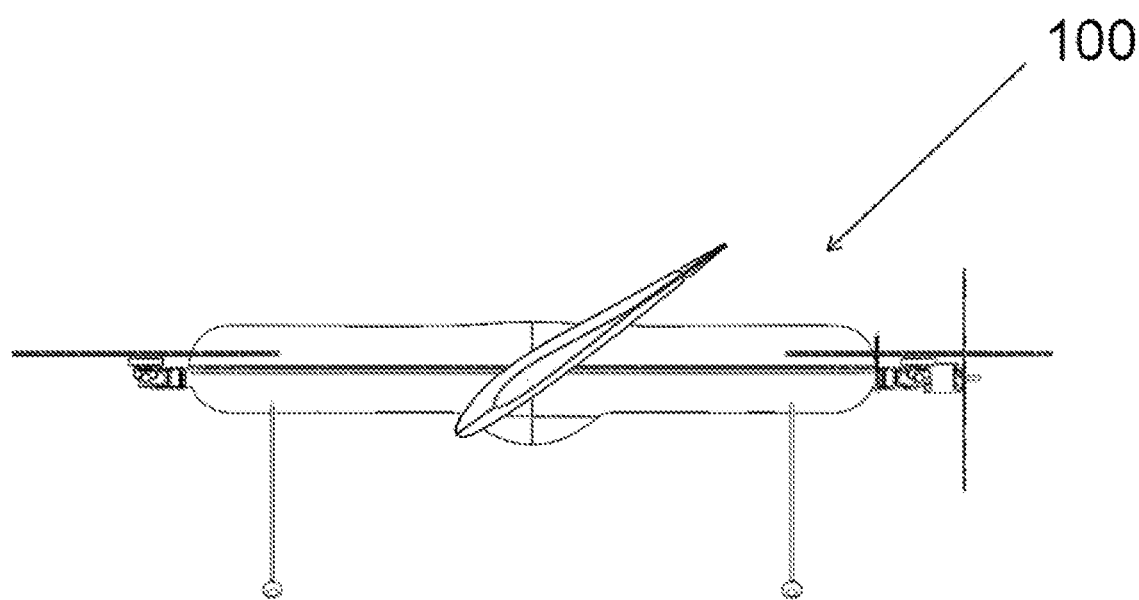
FIG 30B

FREE WING MULTIROTOR WITH VERTICAL AND HORIZONTAL ROTORS

TECHNICAL FIELD

The present invention refers in general to a multirotor that includes three or more vertical rotors, a fixed horizontal rotor and a free wing that can rotate freely around its longitudinal axis, thus providing the aircraft with lift during horizontal flight.

BACKGROUND ART

The inventor and applicant of the invention subject matter of the present patent application is also the inventor and applicant of PCT/IL2015/050874 which was published as WO2016/035068 and claims priority from Israeli patent application 234443, which describes a multirotor that includes chassis, three or more vertical rotors, and a free wing that can rotate freely around its longitudinal axis, thus providing the aircraft with lift during horizontal flight. The present invention refers to such multirotor that further includes a fixed horizontal rotor and unique control system. The contents of the above PCT/IL2015/050874 are all incorporated by reference as if fully set forth herein in their entirety. This invention deals with the substance and control of aircraft with a free wing, having the ability of vertical take-off and landing. It flies horizontally in a constant pitch angle by using a wing which moves freely around a vertical axis and driven by vertical and horizontal engines. By using a constant wing at least two thirds of the energy needed for the flight is saved.

Aircrafts with a constant wing are usually built from a chassis, wings and engines which are joined together rigidly. This forces the aircraft to adjust to the direction of the air flow so that air flows around the wing to produce lift. In order to climb or lower the vehicle has to change its pitch angle. The pitch angle is a nuisance for several reasons. First, it makes it uncomfortable for people to walk inside the aircraft when the angle is too sharp or changed. Second, when a camera or a baggage are installed then some stabilizing devices are needed, like engines and mechanisms with some degrees of freedom which will stabilize them in order to keep the camera in a constant horizontal angle. These stabilizing devices are complicated, expensive and add extra weight to the aircraft. The present invention combines a unique structure and a unique flight control algorithm which enable the aircraft to fly horizontally at a fixed pitch angle both while climbing and lowering as long as no turns are needed. This removes one important degree of freedom, because during aerial photographing the aircraft flies straight but has to change its altitude according to the physical features. If a vertical Photograph of the ground is needed, it can be done without a use of stabilization gimbal or other stabilization means of the camera.

An industry has recent emerged, that is engaged in the development, manufacture, and use of aircraft able to take off and/or land vertically and to fly horizontally. These aircraft may be either manned or unmanned vehicles and have employ of variety of configurations with respect to the wings, propulsion and lift systems, payload areas, and the like. Such aircraft are often characterized by having a propulsion system that enables vertical takeoff and landing of the aircraft. Once the aircraft is airborne, the orientation of the propulsion system (e.g., including propellers or jet engines) may be adjusted in order to propel the aircraft forward in horizontal flight. Accordingly, such aircraft are able to take off and land vertically, hover, and fly horizontally using the propulsion system. The aircraft is controlled and stabilized using sensors and a flight control system that controls and transmits commands to the aircraft's propulsion system.

One of the disadvantages of such known aircraft configuration is the limitation in which the aircraft can remain airborne. This limitation stems from the fact that when the aircraft is in horizontal flight, some of the energy from the propulsion system is utilized for horizontal, forward movement. Therefore, certain aircraft configurations include wings to enhance energy efficiency in horizontal flight. In certain aircraft configurations equipped with wings, part or all of propulsion system is attached to the wings by a fixed connection, so that the angle there between is fixed and rotary movement of the propulsion system occurs simultaneously with wing rotation.

In other configurations, the wing and propulsion system are fixed in relation to the chassis. A disadvantage of the aforementioned configuration in which propulsion and wing have a fixed connection, relates to losses and inefficiencies during takeoff, landing, and hover. For example, when the wings are vertical relative to the earth (e.g., with engines facing upwards, functioning like a helicopter) and conditions are windy, drag and instability ensue. Similarly, in an aircraft configuration in which both engines and the wing are connected to the chassis by a fixed connection, a negative lift and/or drag is created on the wing during takeoff, landing, or hover with either a rear wind or a side wind.

The above disadvantages result in energy losses (and therefore also increased engine operation) or even a deviation from a designated vertical landing line or hovering point. This may be especially problematic when the aircraft is to be landed on the roof of a building, in which case a side wind at the precise moment of landing may divert the aircraft from its landing point.

Using actuators and various mechanical mechanisms to stabilize the aircraft may reduce reliability, which is particularly hazardous when the components are critical for flight. Furthermore, such mechanisms are heavy and thus reduce the maximum flight time or freight-carrying capacity of the aircraft.

Prior art solutions for vertical takeoff and landing (VTOL) vehicles have not resolved the need for an approach to perform one or more of the above actions without drawbacks, e.g., mechanical/electrical complexity, efficiency losses, reliability losses, size and weight constraints, and/or cost-prohibitive. Therefore, there is a need for systems and methods that address one or more of the deficiencies described above amongst others. Accordingly, there remains a need to provide aerodynamic and efficient vehicle that overcomes one or more of the above noted deficiencies.

LIST OF DRAWINGS

The drawings attached to the request are not intended to limit the extent of the invention or the way it is applied. They are only meant to visualize the invention and are one of many possibilities to apply.

FIGS. 1G-J depict the multirotor equipped with a free wing.

Figure 2A:
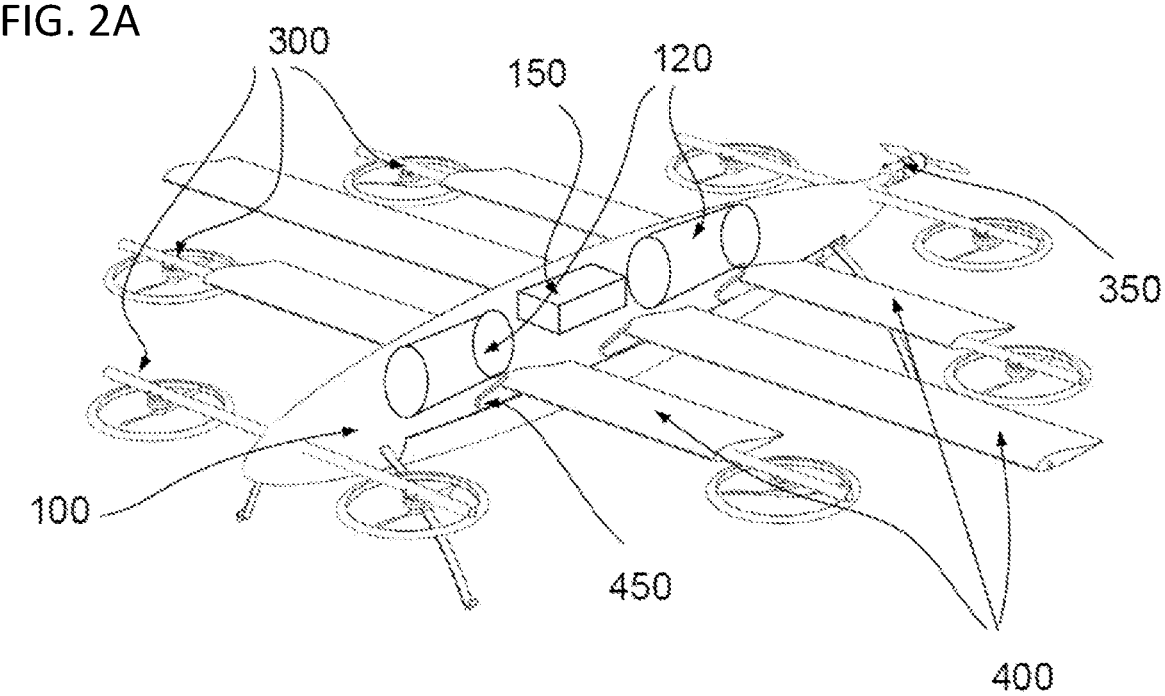

FIG. 2A illustrates an example free wing vehicle in accordance with one or more aspects of the present disclosure.

Figure 2B:
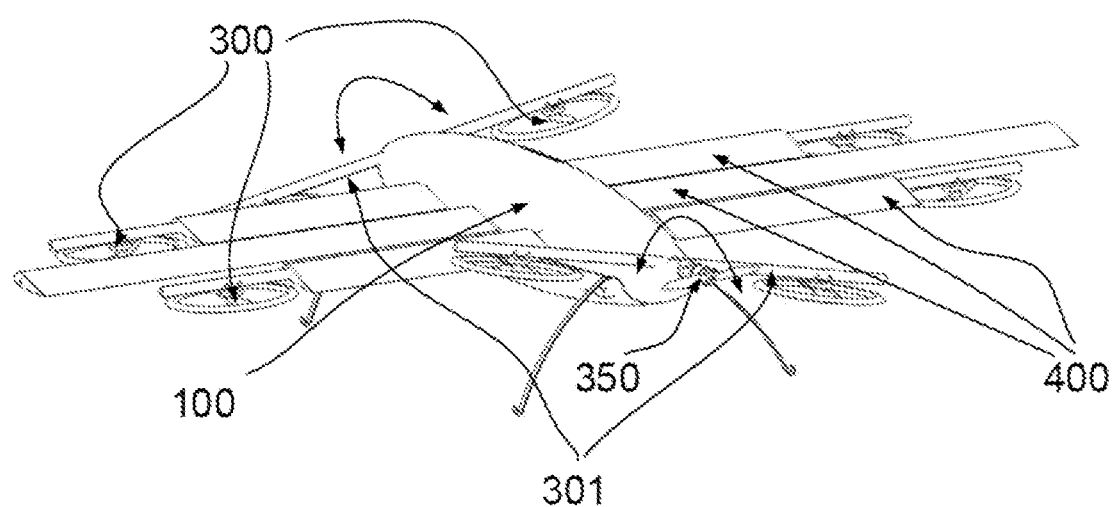

FIG. 2B illustrates the free wing vehicle of FIG. 2A in a flight mode operation.

FIG. 2C is a close-up view of a pair of rotors at an aft end of a multirotor vehicle in accordance with one or more aspects of the present disclosure.

FIG. 2D illustrates the free wing vehicle of FIG. 2A in a cargo bay door open configuration.

Figure 2E:
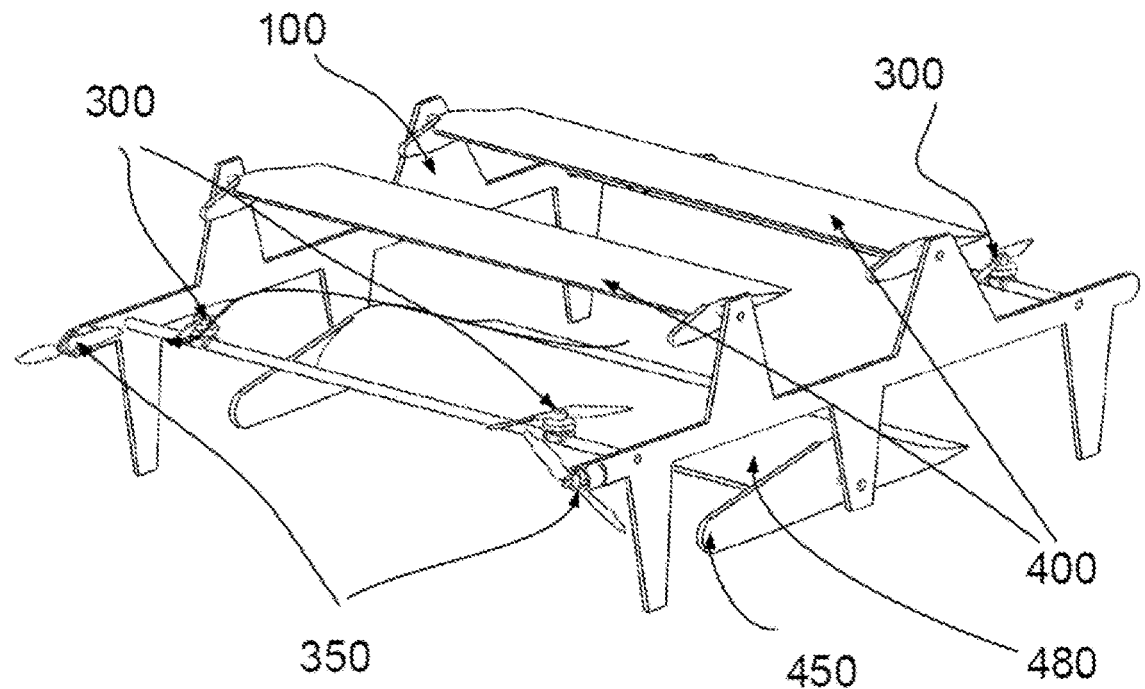

FIG. 2E illustrates an upper perspective view of another example free wing vehicle in accordance with one or more aspects of the present disclosure.

Figure 2F:
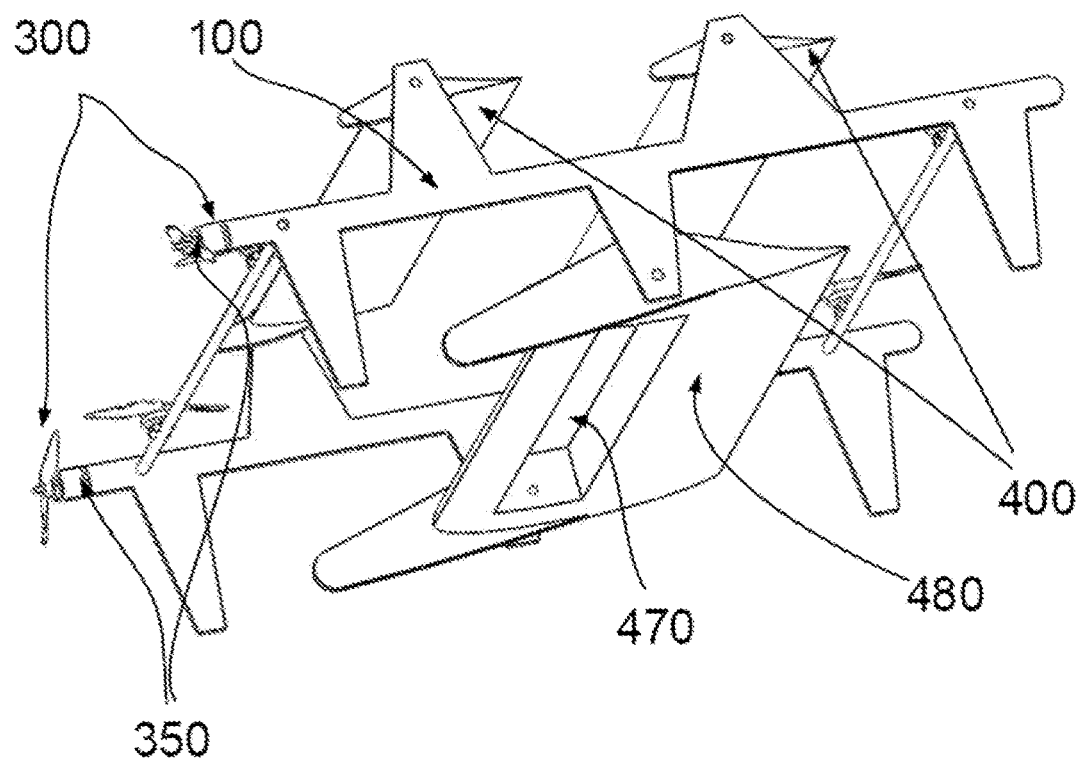

FIG. 2F illustrates a lower perspective view of another example free wing vehicle in accordance with one or more aspects of the present disclosure.

FIG. 2F illustrates an upper perspective view of another example free wing vehicle in accordance with one or more aspects of the present disclosure.

FIG. 2H is a cross-section view of a container of the free wing vehicle of FIG. 2F.

FIG. 3A is an upper perspective view of a free wing quadcopter with a divided wing, in accordance with one or more aspects of the present disclosure.

FIG. 3B illustrate the divided wing of the free wing quadcopter of FIG. 3A.

Figure 3C:
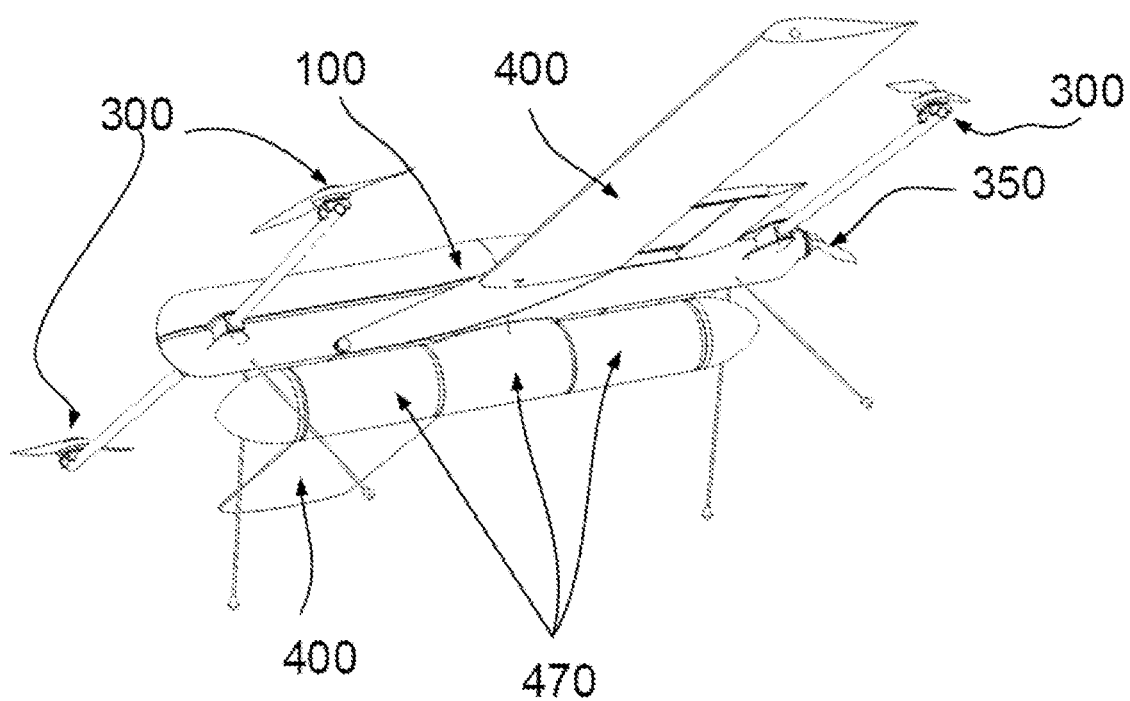

FIG. 3C is an upper perspective view of a free wing quadcopter of FIG. 3A.

FIG. 4A is a free wing quadcopter with a gimbaled camera, in accordance with one or more aspects of the present disclosure.

FIG. 4B illustrates the free wing quadcopter of FIG. 4A in a flight mode operation.

FIG. 5A is a bottom view of a free wing quadcopter with a wing locking mechanism, in accordance with one or more aspects of the present disclosure.

FIG. 5B is an upper perspective view of the free wing quadcopter of FIG. 5A.

Figure 5C:
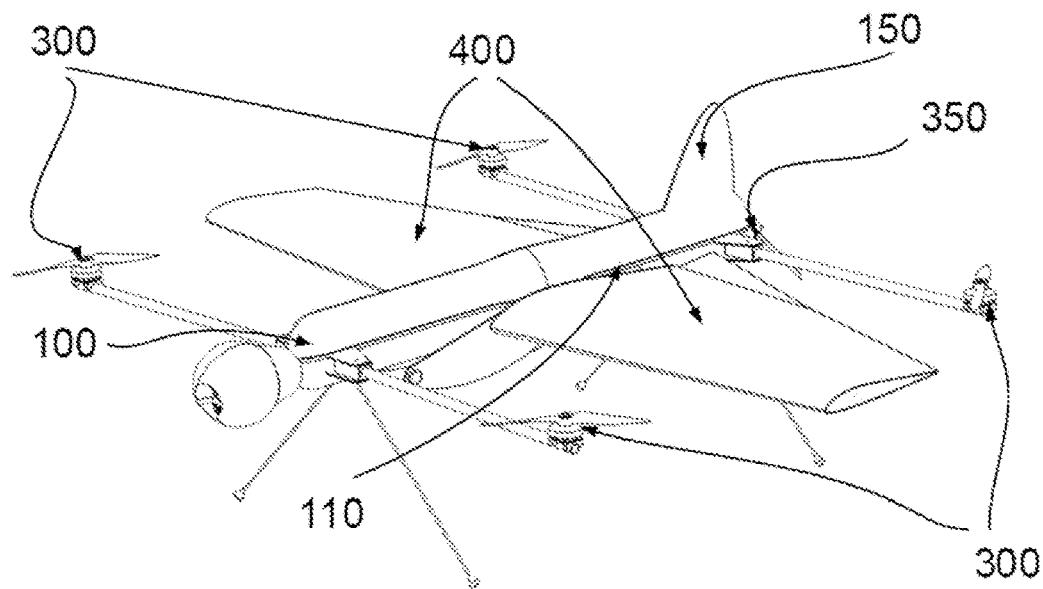

FIG. 5C is a lower perspective view of the free wing quadcopter of FIG. 5A.

Figure 5D:
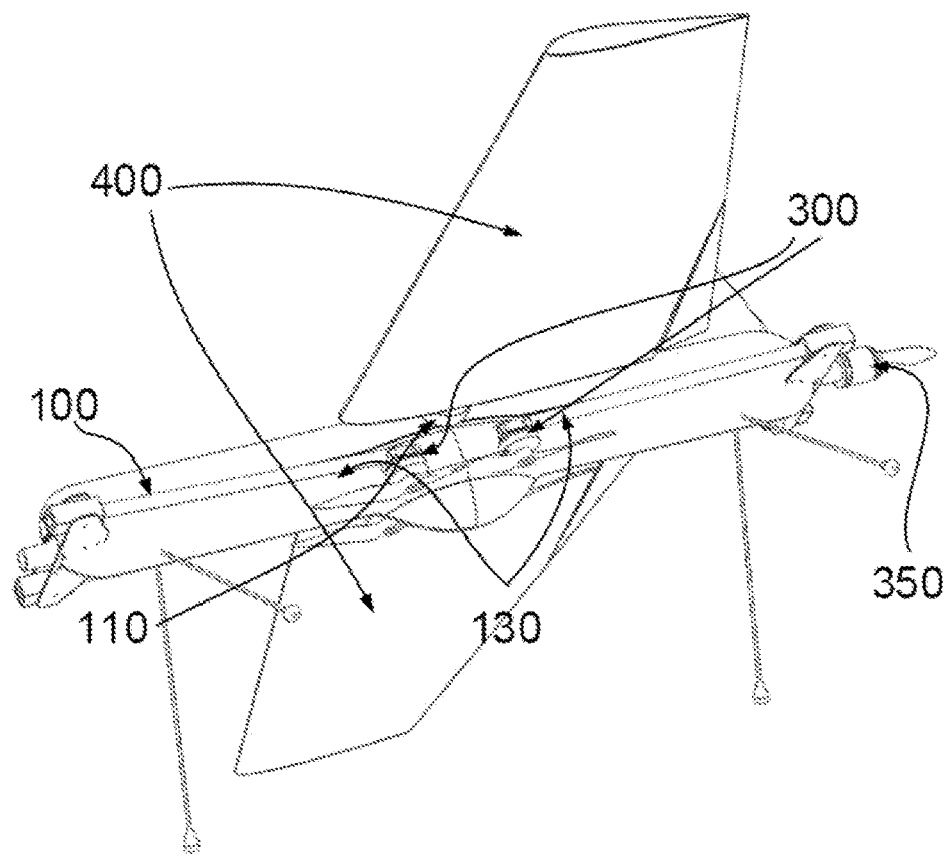

FIG. 5D is a close-up view of the wing-locking mechanism of the free wing quadcopter of FIG. 5A.

Figure 6:
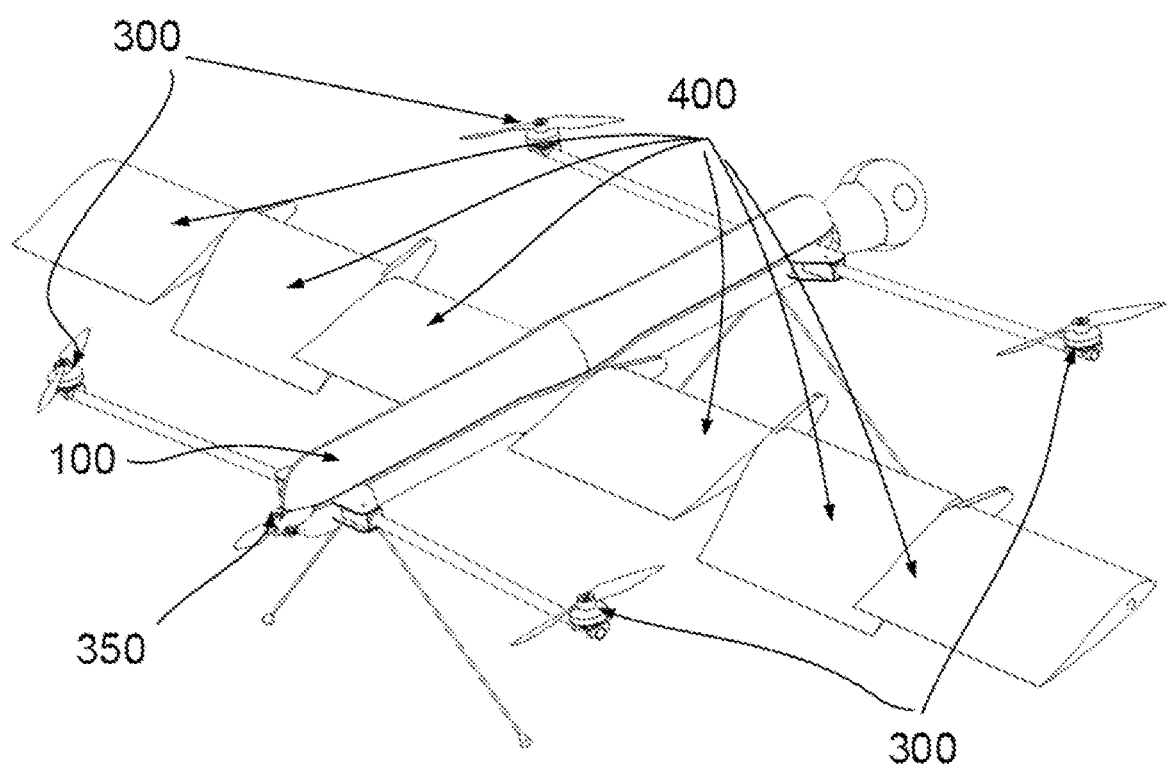

FIG. 6 illustrates a free wing quadcopter with multi-part wing.

Figure 7A:
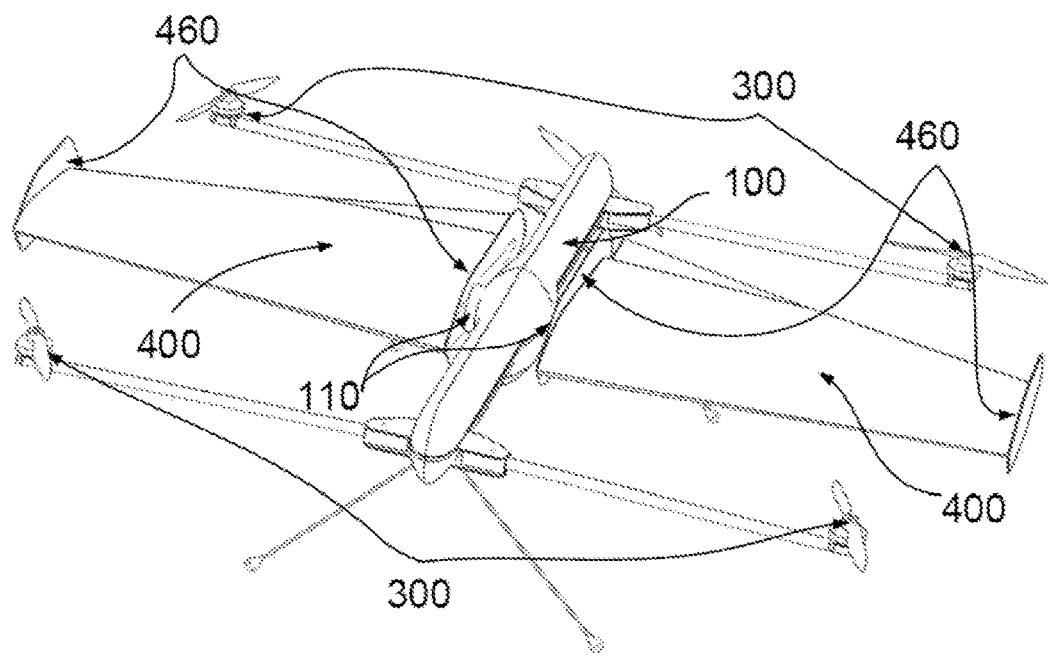

FIG. 7A illustrates a free wing quadcopter with a wing assist in accordance with one or more aspects of the present disclosure.

Figure 7B:
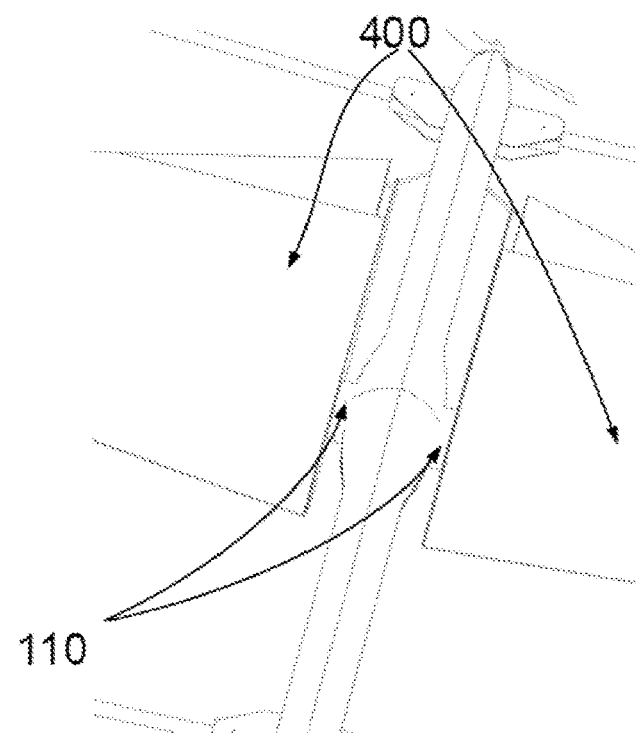

FIG. 7B is a close up view of the wing assist of the free wing quadcopter of FIG. 7A.

Figure 8A:
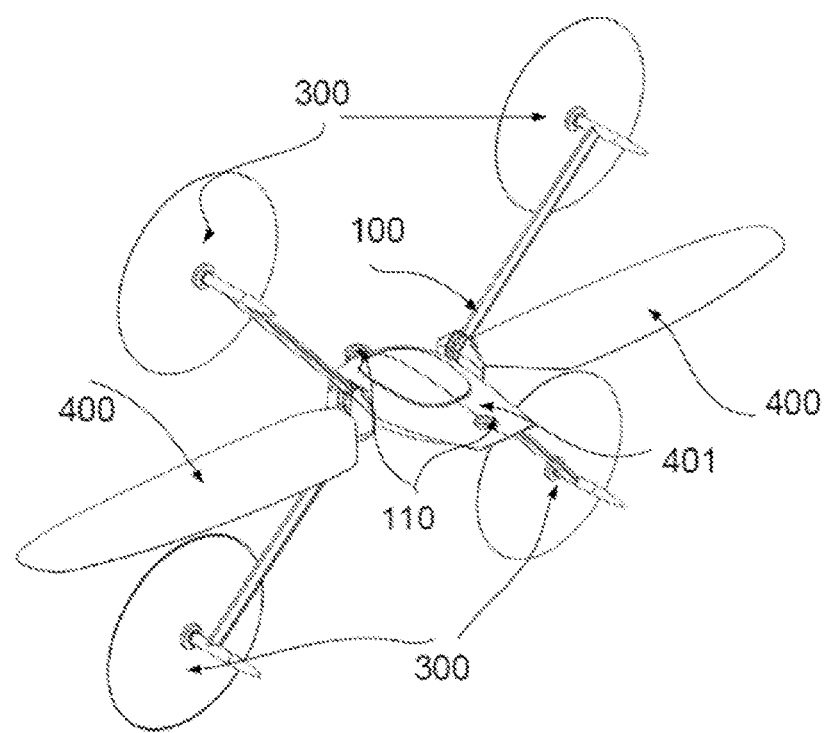

FIG. 8A is a free wing quadcopter with middle stabilizing rotors, in accordance with one or more aspects of the present disclosure.

Figure 8B:
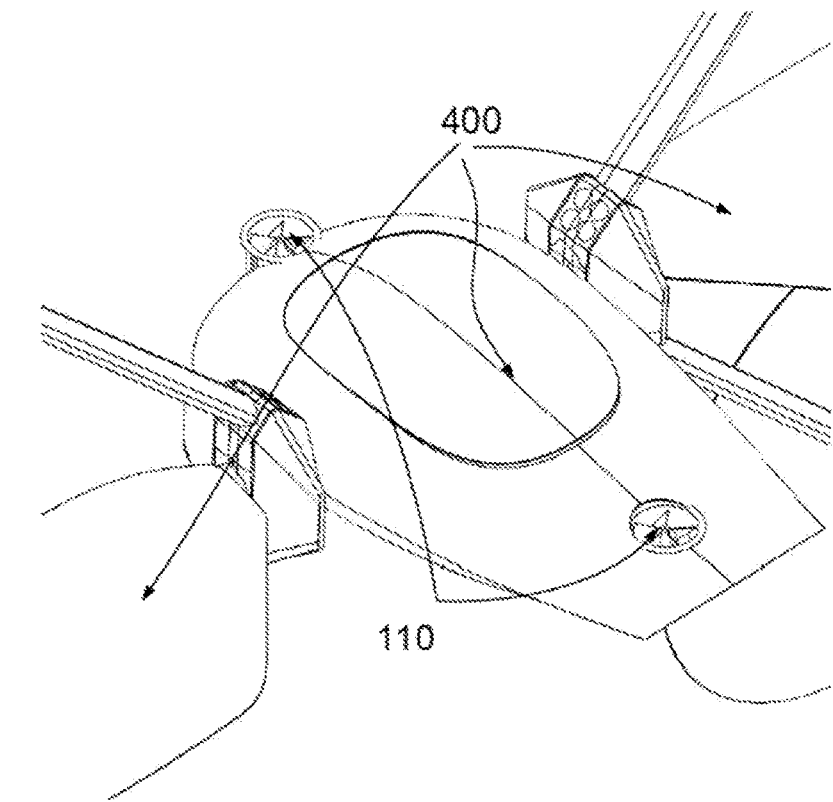

FIG. 8B is a close up view of the middle stabilizing rotors of the free wing quadcopter of FIG. 8A.

FIG. 9A illustrates a free wing vehicle mounted on a service vehicle in accordance with one or more aspects of the present disclosure.

FIG. 9B illustrates the service vehicle of FIG. 9A with a protective cover thereon.

FIG. 9C illustrates an array of the service vehicles of FIG. 9A.

FIG. 9D illustrates the service vehicle of FIG. 9A with a modified driving configuration.

FIG. 10A is a cross sectional view of a wing of a free wing vehicle in accordance with one or more aspects of the present disclosure.

FIG. 10B is a cross sectional view of a wing of a free wing vehicle of Figure with an increased angle of attack.

FIG. 10C is a cross sectional view of a wing of a free wing vehicle of Figure with a rotated wing configuration.

Figure 11:
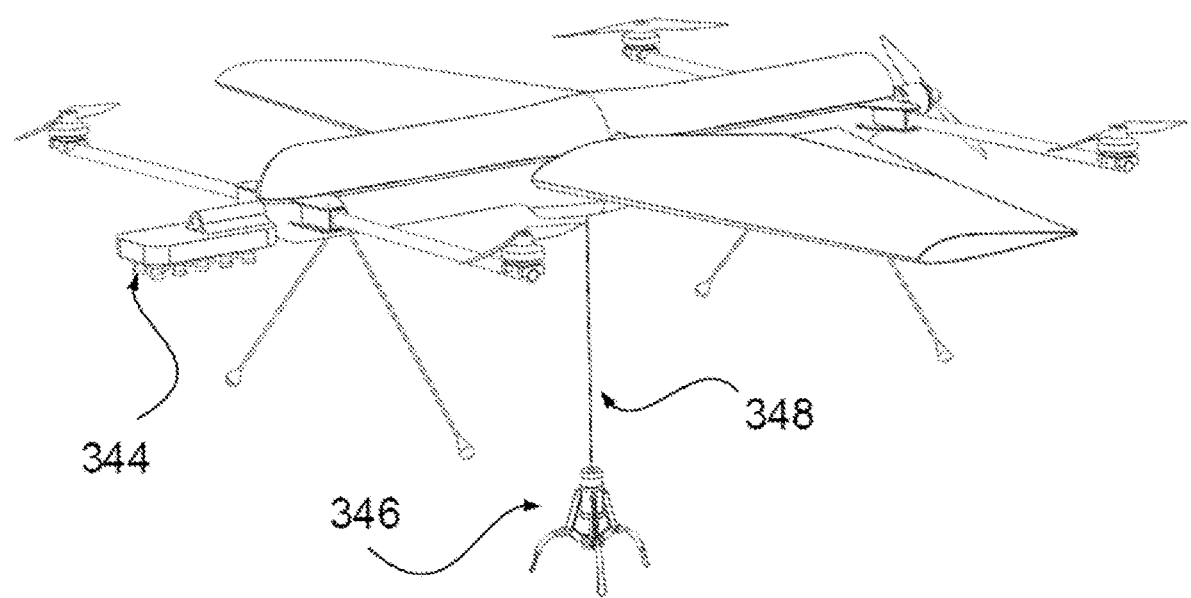

FIG. 11 illustrates a free wing vehicle mounted with a grasping mechanism in accordance with one or more aspects of the present disclosure.

Figure 12A:
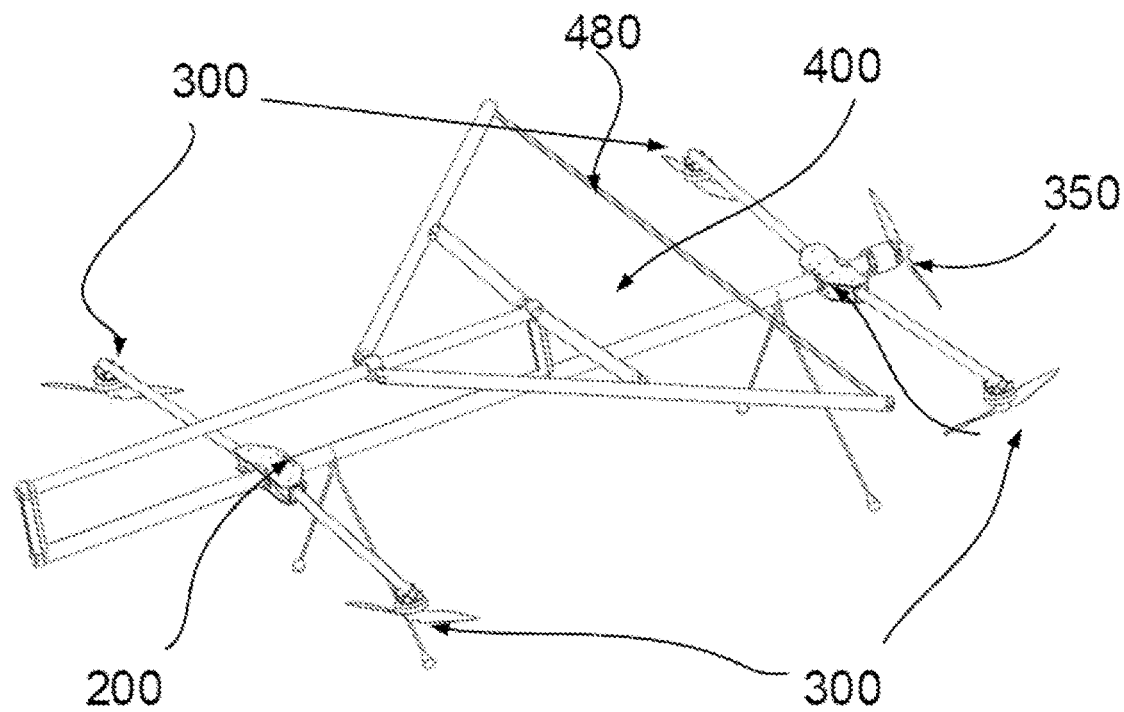

FIG. 12A depicts a multirotor aircraft with 4 horizontal thrust rotors, vertical pusher rotor and a mechanism of 2 stages folded wings in an unfold position.

Figure 12B:
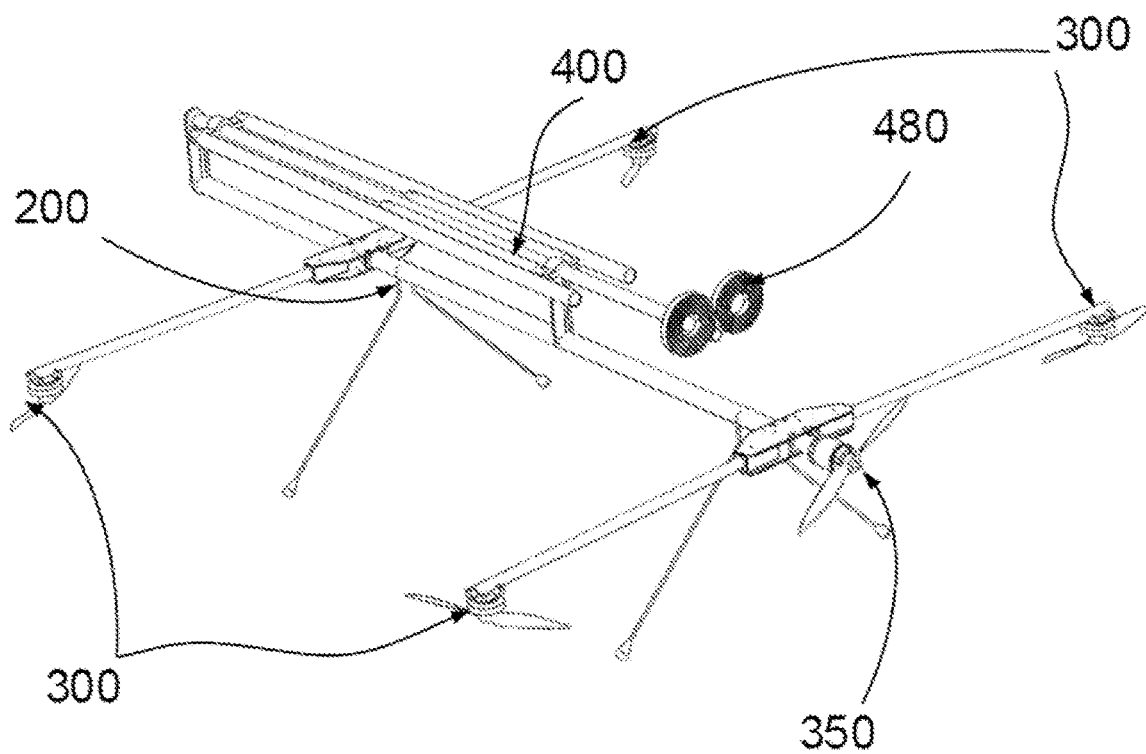

FIG. 12B depicts a multirotor aircraft with 4 horizontal thrust rotors, vertical pusher rotor and a mechanism of 2 stages folded wings in a folded position.

Figure 13A:
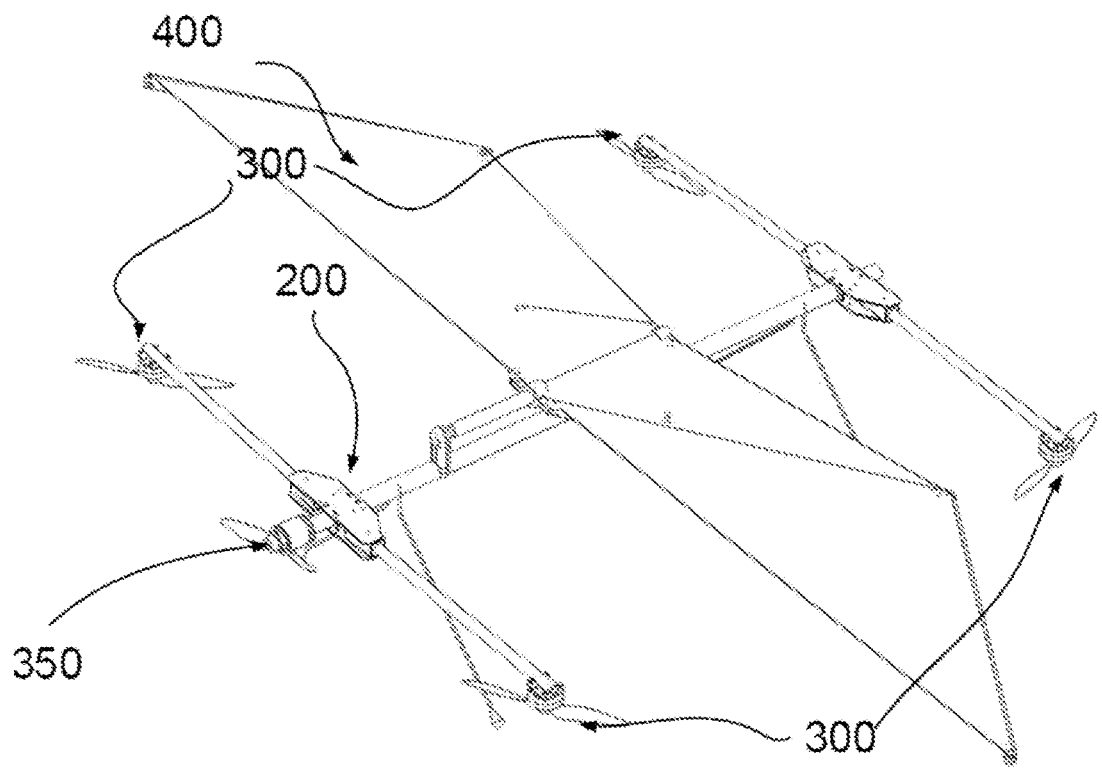

FIG. 13A depicts a multirotor aircraft with 4 horizontal thrust rotors, vertical pusher rotor and a mechanism of 2 stages folded wings in a folded position.

Figure 13B:
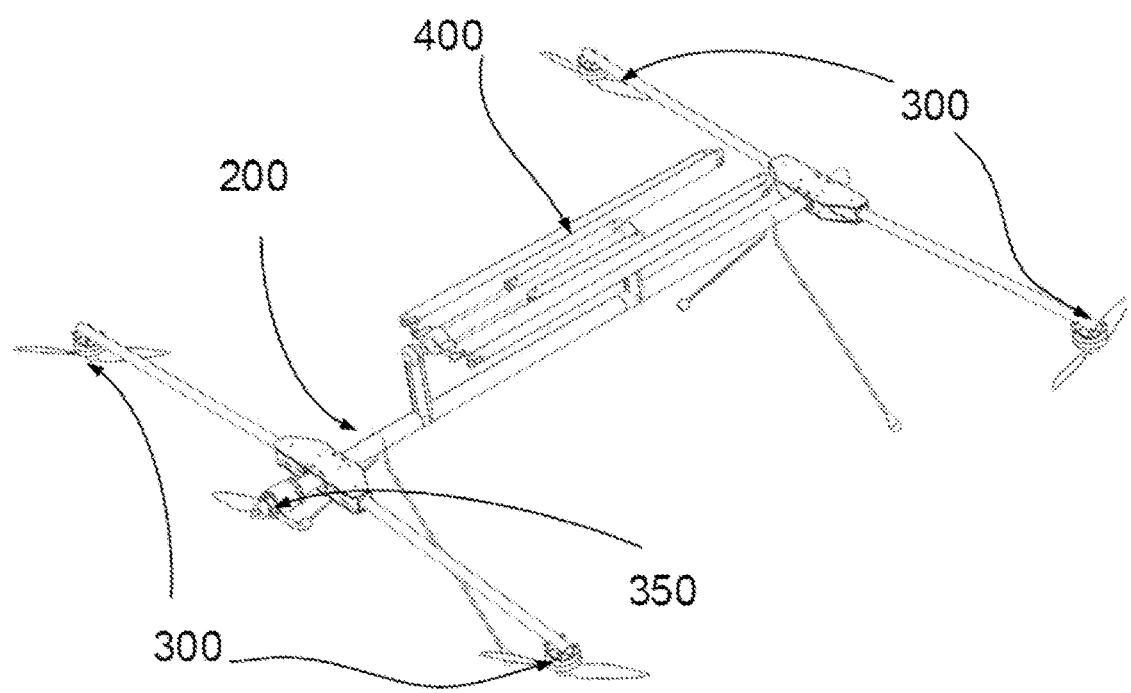

FIG. 13B depicts a multirotor aircraft with 4 horizontal thrust rotors, vertical pusher rotor and a mechanism of 3 joints folded wings in a folded position.

FIG. 14A illustrates an aerodynamically actuated free wing quadcopter vehicle in accordance with one or more aspects of the present disclosure.

FIGS. 14B and 14C are close up views of an aerodynamic actuator of the free wing quadcopter vehicle of FIG. 14A.

FIG. 15A illustrates an extendable free wing quadcopter vehicle in accordance with one or more aspects of the present disclosure.

FIG. 15B is the extendable free wing quadcopter vehicle in a retracted configuration of FIG. 15A.

Figure 16:
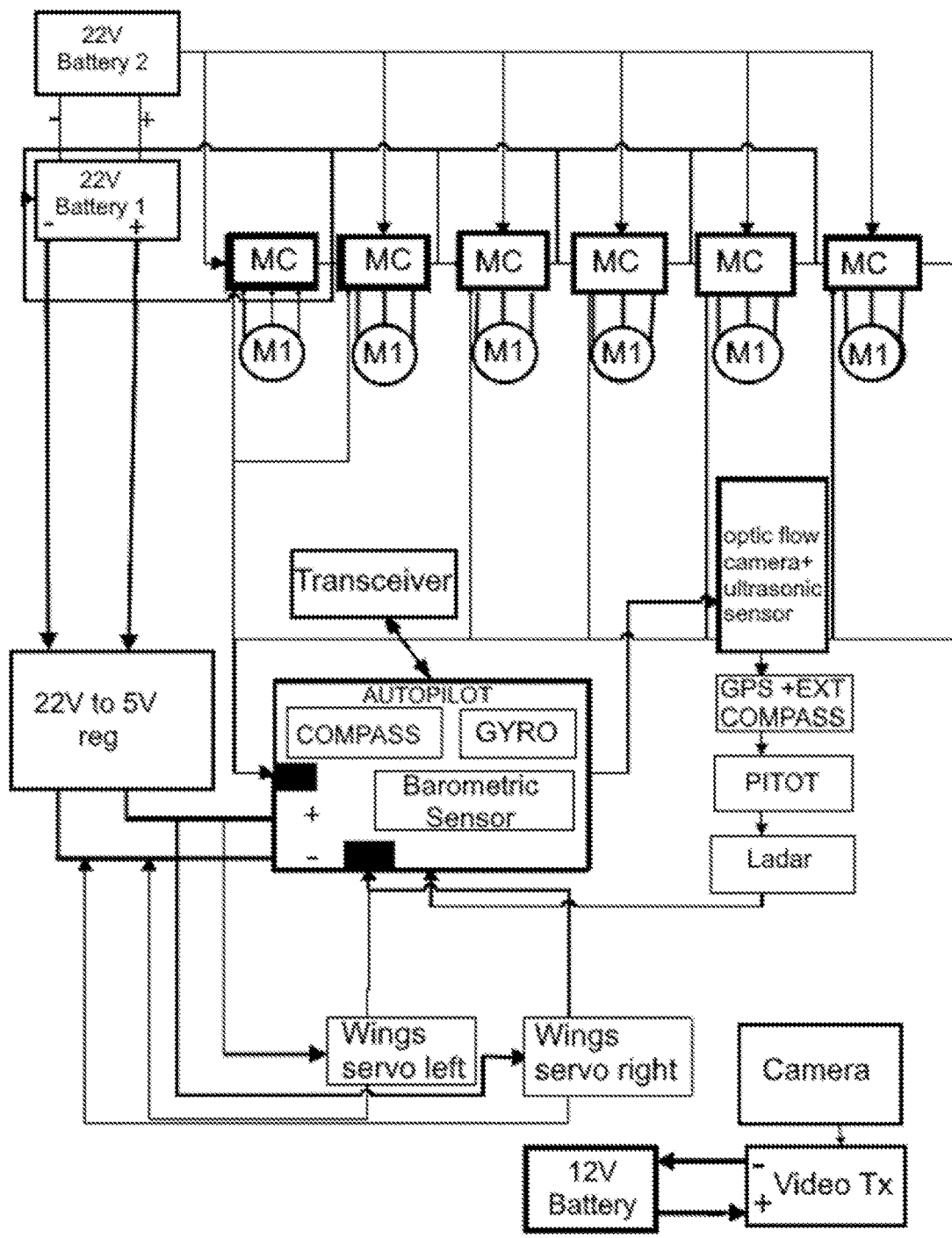

FIG. 16 is a system diagram of an avionics system for a free wing vehicle in accordance with one or more aspects of the present disclosure.

Figure 17:
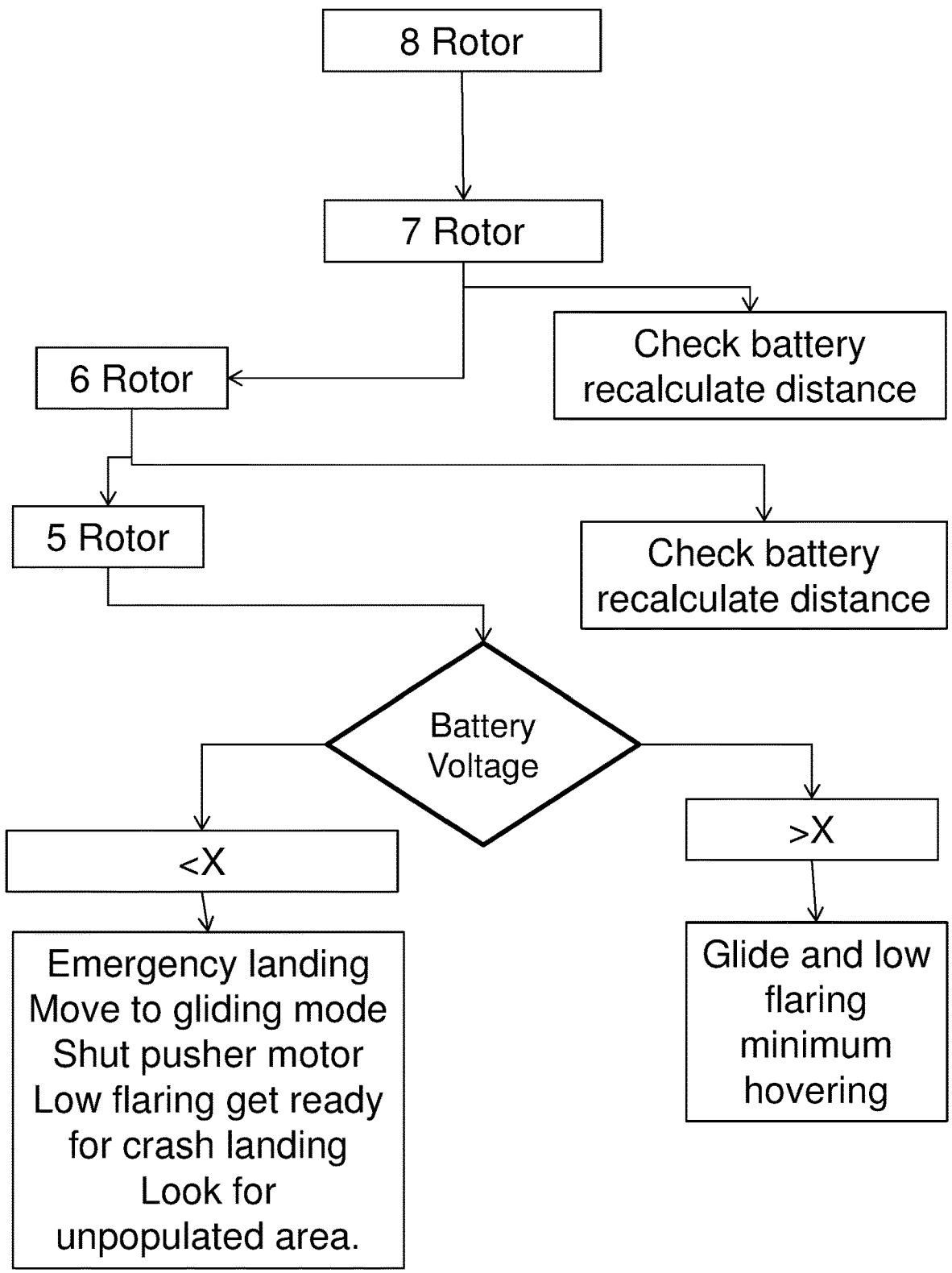

FIG. 17 is a flow diagram for a motor emergency of a free wing vehicle in accordance with one or more aspects of the present disclosure.

Figure 18:
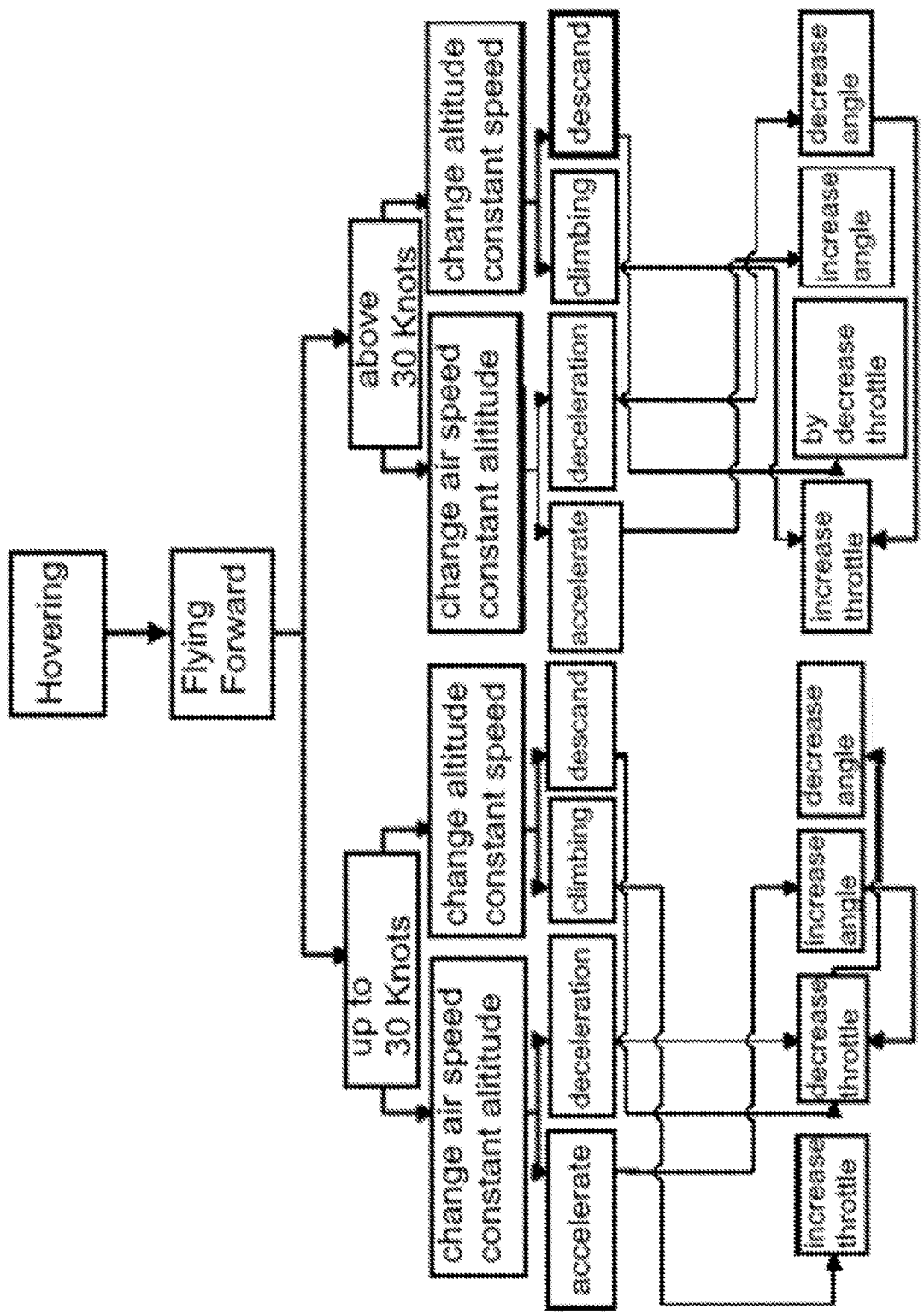
Figure 20:
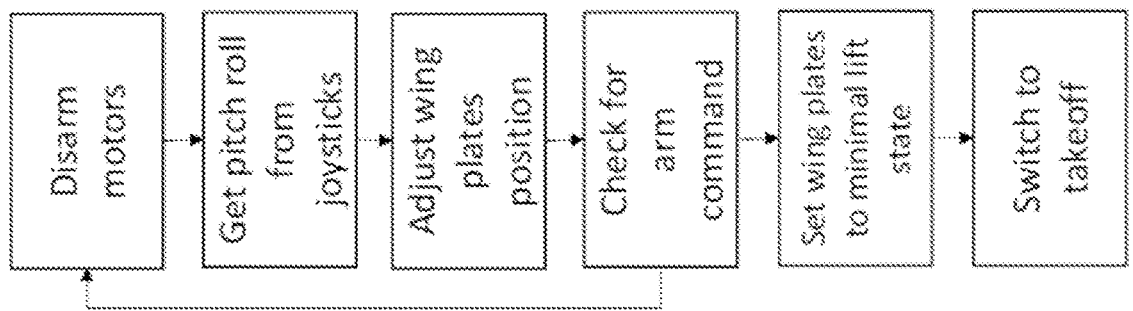
Figure 22:
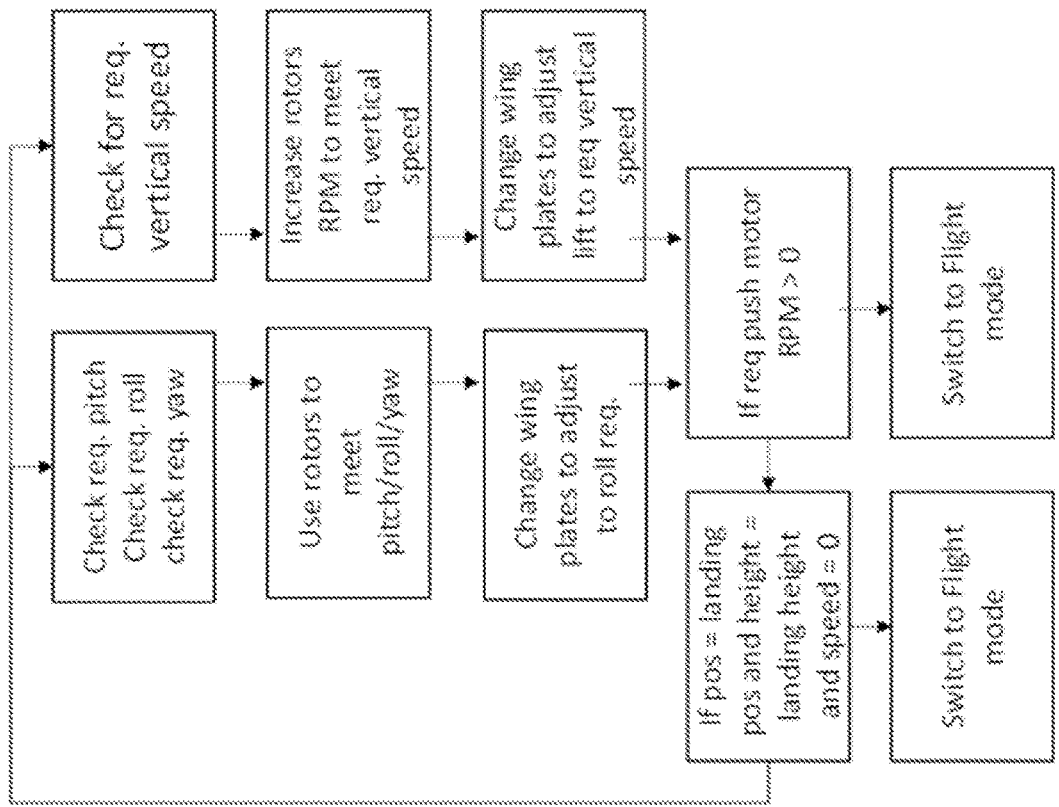
Figure 23:
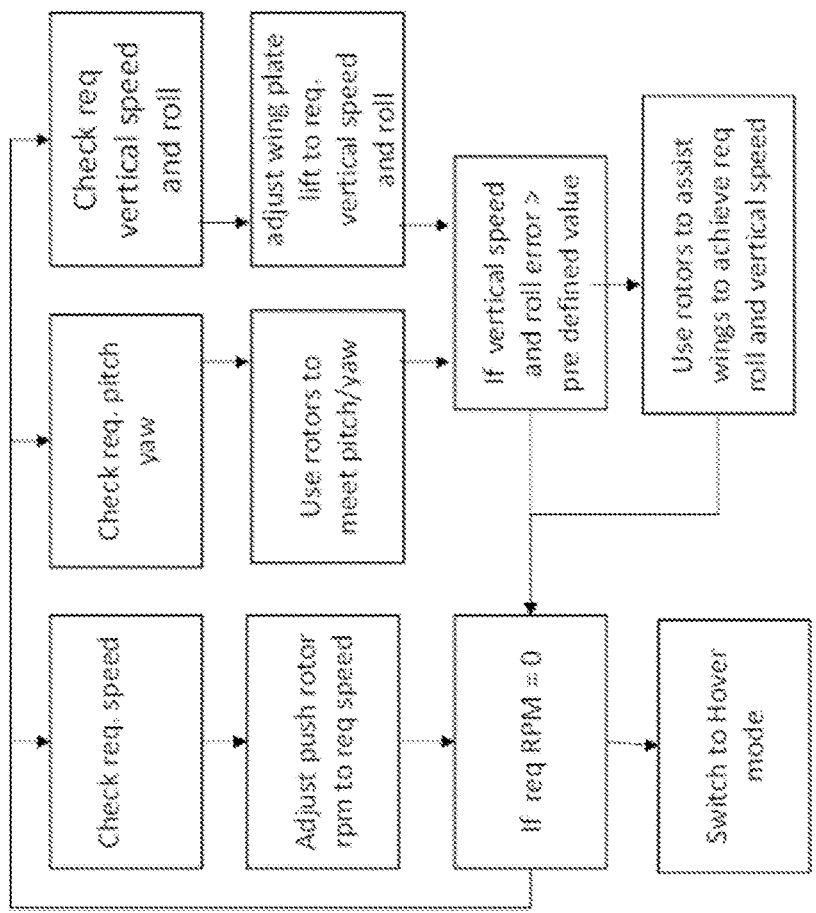
Figure 26:
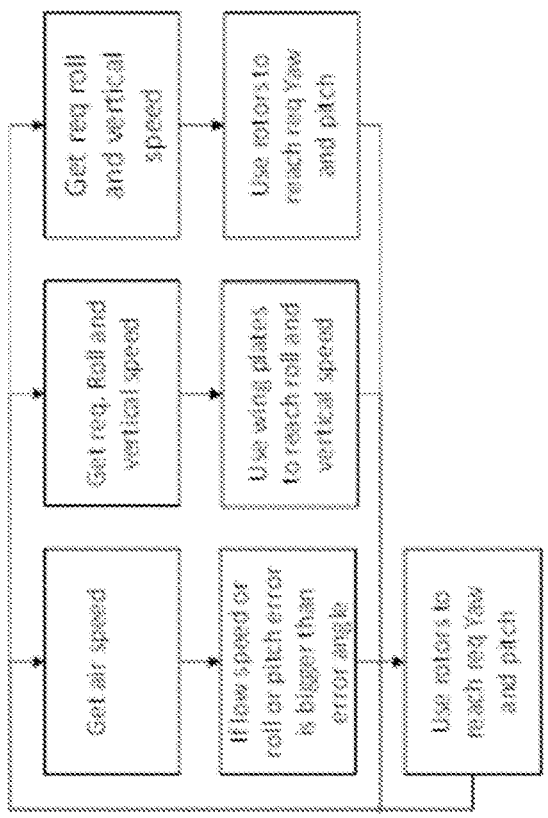
Figure 28A:
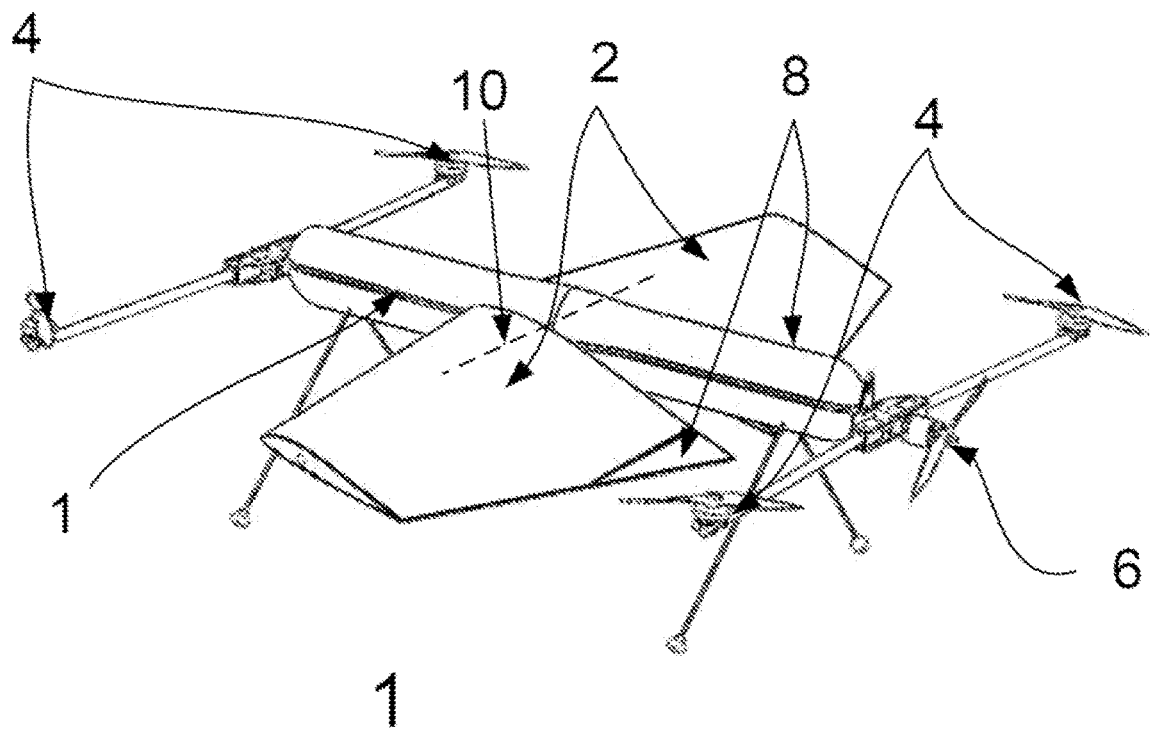
Figure 28B:
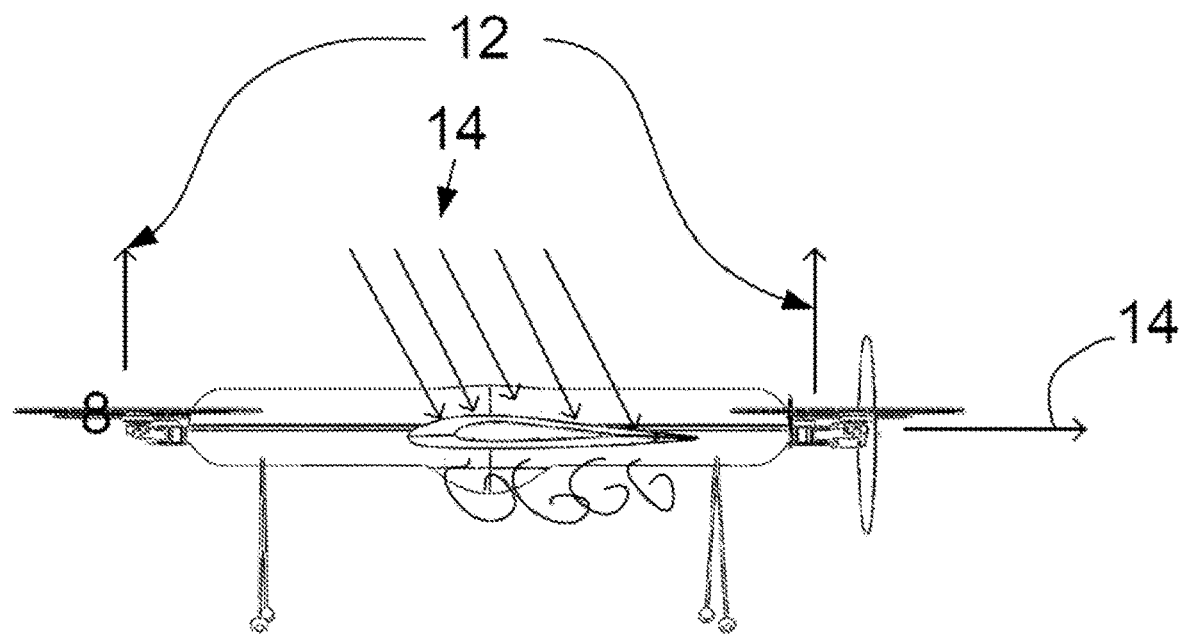
Figure 28C:
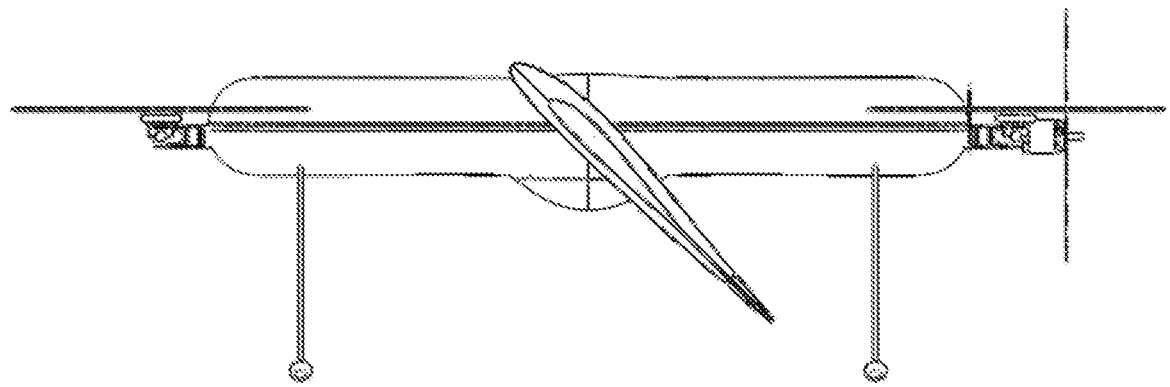
Figure 28D:
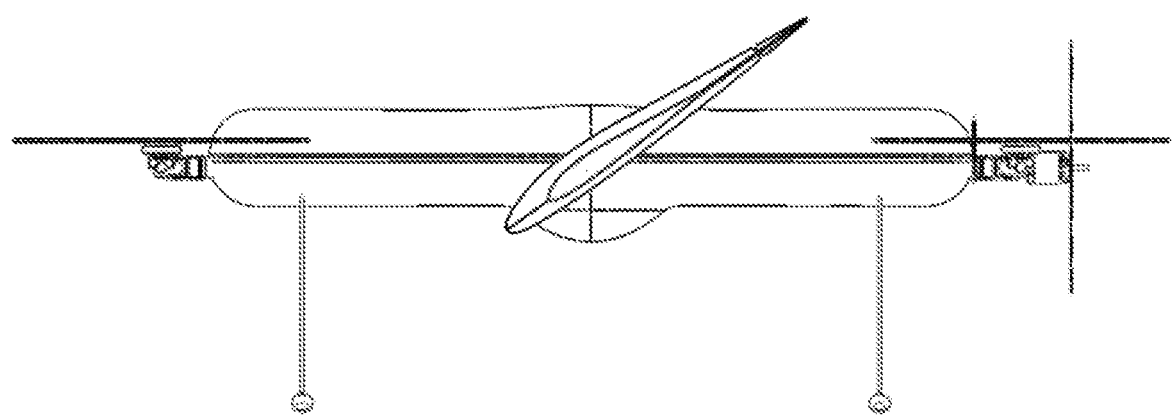
Figure 28E:
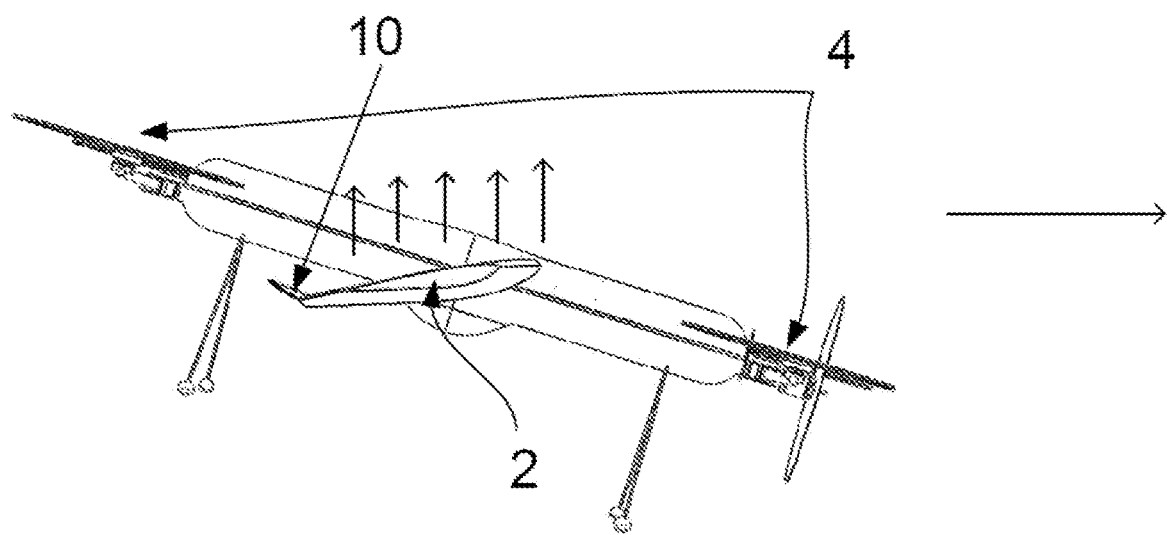

FIG. 18 is a flow diagram for wing tilt of a free wing vehicle in accordance with one or more aspects of the present disclosure.

FIGS. 19-27 are block diagrams illustrating control processes of various aircraft flight modes in accordance with one or more aspects of the present disclosure.

FIGS. 28A-E illustrates various view of rotor vehicle during various modes of flight.

Figure 29:
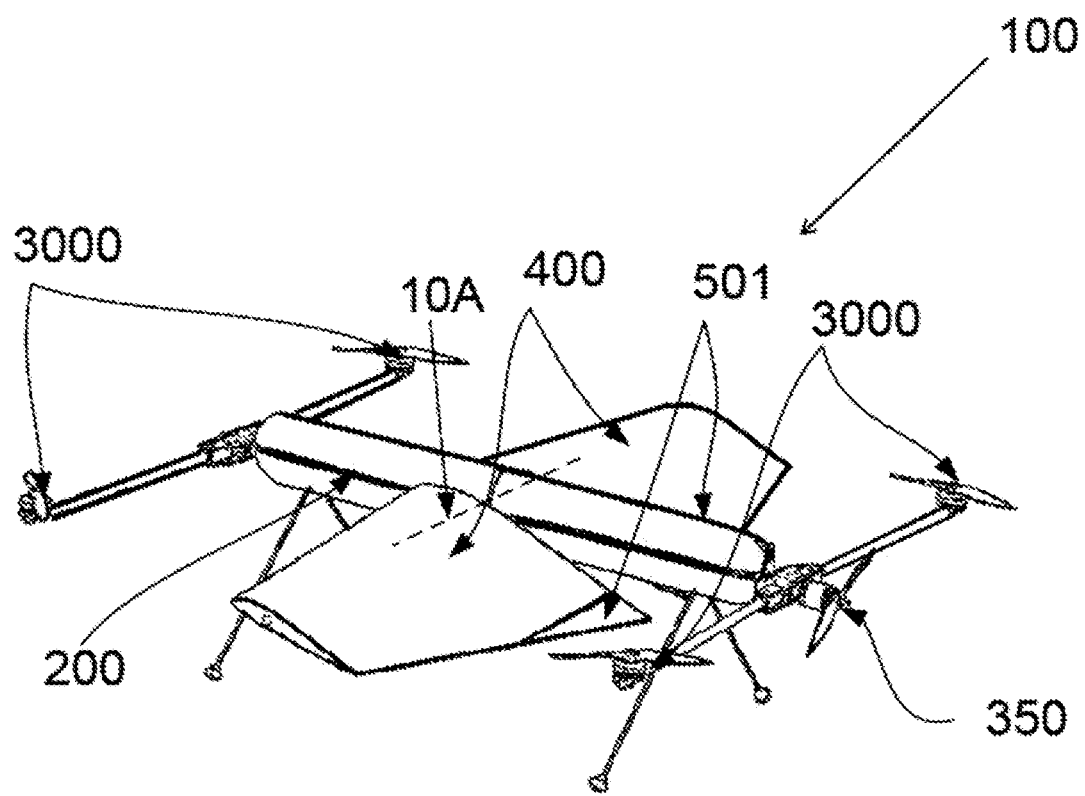

FIG. 29 shows the aircraft and its components.

FIG. 30A shows the aircraft at climbing state.

FIG. 30b shows the aircraft at descending state.

Figure 31:
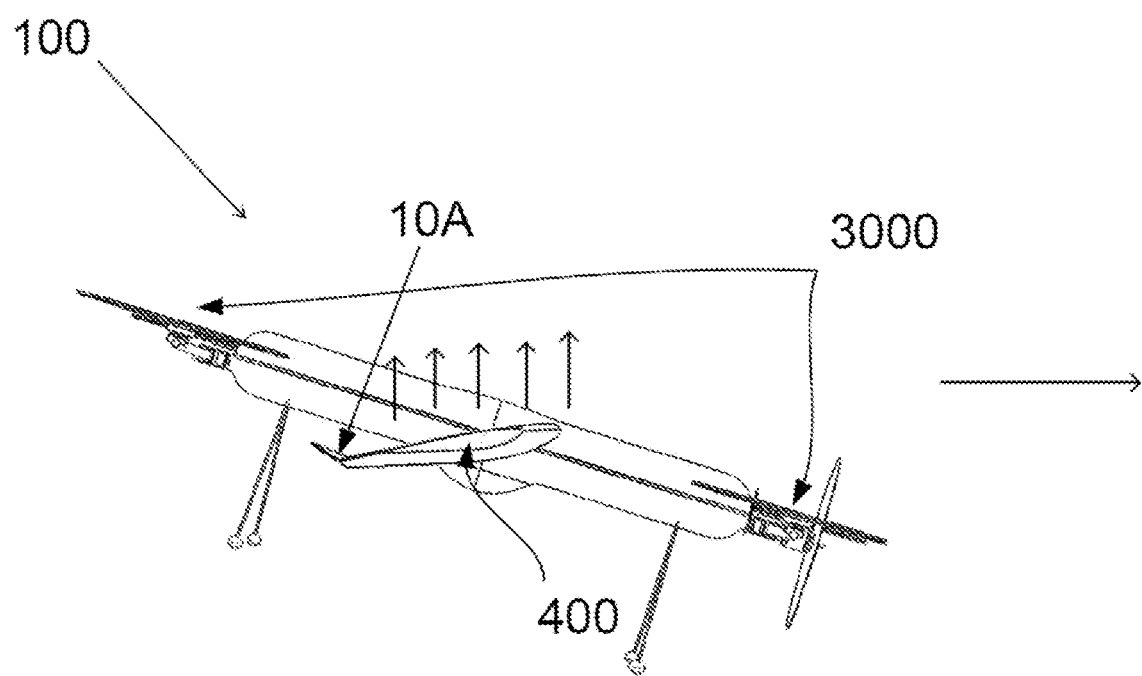

FIG. 31 shows the aircraft while flying backward.

Figure 32:
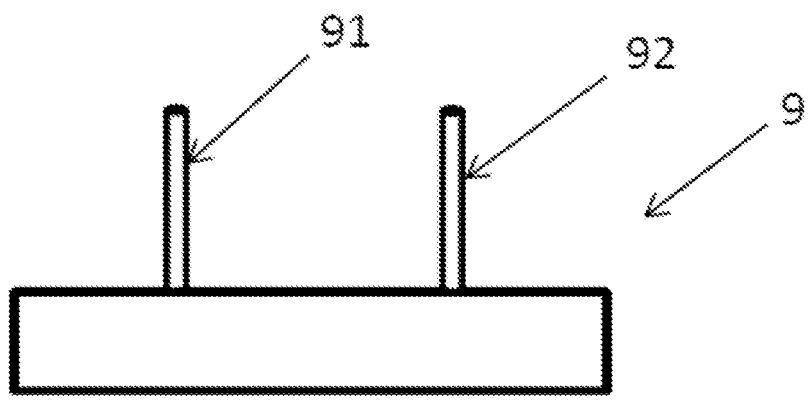

FIG. 32 depicts schematically the remote control system (9) with the left joystick (91) and the right joystick (92).

Figure 33:
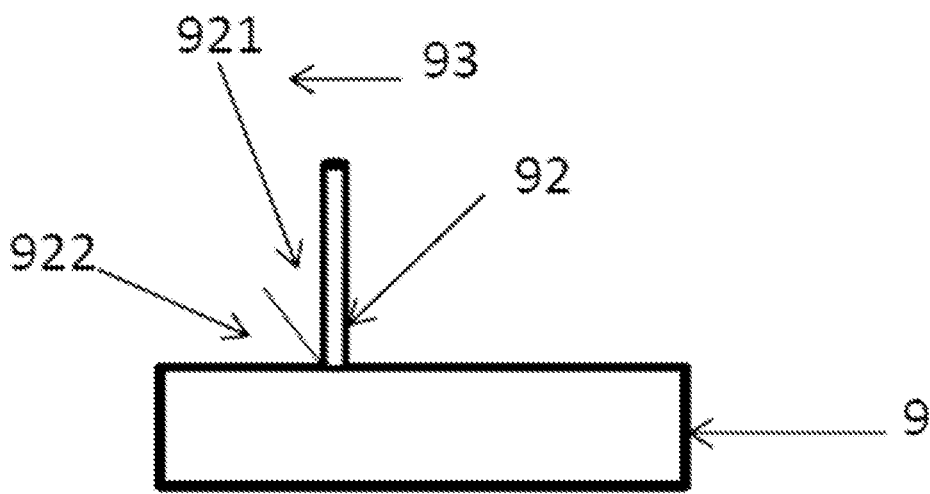

FIG. 33 depicts schematically the right joystick (92) with the first tilt segment (921) and the second tilt segment (922).

Figure 34:
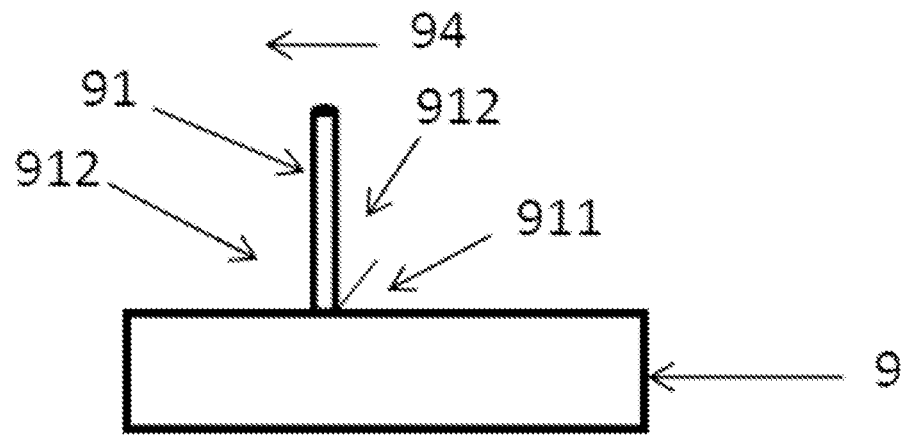

FIG. 34 depicts schematically the left joystick (91) from a side point of view with the back tilt segment (911) and the front tilt segment (912).

THE INVENTION

The main object of the present invention is to provide a multirotor aircraft (100) that includes a chassis (200), three or more vertical rotors (3000), one or more free wings (400), and fixed horizontal rotor (350). Another object of the present invention is to provide method and system of a unique remote control system (9) for controlling the multirotor aircraft (100) subject matter of the present invention.

The free wing 400 is attached to the chassis 200 by an axial connection (18) so that the angle of the free wing 400 is changed relative to the chassis 200 due to the flow of air over the free wing. The free wing may include also an actuator 500 which is designed to change the angle of the free wing relative to the chassis. The free wing may also include control surfaces (501) or a movement-limiting device. The term "rotor" in this application and in the claims refers in fact to any kind of source that produces power or thrust such as rotors, jets, engines and the like. In addition, in this application we use different terms for identical or similar components for the sake of fluency.

This invention enables flight in a constant pitch angle of the aircraft with a free wing, both at climbing and lowering of the aircraft. This is possible thanks to the free wing that rotates freely around the horizontal axis connection. It can adjust to every direction in which it advances and produce lift, except in moving sideward. The aircraft which is depicted in FIG. 29 includes the chassis (200) to which three or more vertical rotors (3000) are rigidly attached. These vertical rotors produce thrust which is larger than the aircraft's weight and enable it to take off and land vertically and hover in the air, similar to standard multi-bladed aircrafts. While flying forward they are able to carry a part of the aircraft's weight, while the free wing (400), which rotates around a horizontal axis (10a) produce lift which carries most of the aircraft's weight. This is possible thanks to one or more of fixed horizontal rotors (350), which push or pull the aircraft forward. A flight control device and sensors inside the aircraft perform the control and supervision of the aircraft. Carrying the aircraft's weight on the wings saves up to a third of the energy demand.

The free wings (400) may be equipped with a pair of control surfaces (501) which control the attach angle of each free wing separately, and so rise or lower the lift of each of them, which enables to control the climbing and lowering of the aircraft, and the rolling of the aircraft economically, unlike the wasteful rolling performance of the vertical rotors (3000). FIG. 30A depicts the aircraft while climbing—the wing is turned in the flow direction and produces lift. In FIG. 30B the aircraft is seen while lowering, the wing turns downward and the sum of the speed components preserves the lift.

The aircraft's algorithm and flight control is unique because of its special form and operation technique of the aircraft. When on the ground, the control surfaces of the wing (501) are in neutral position so that a sporadic wing will not produce some lift and rise the aircraft unintentionally. While taking off the vertical rotors (3000) begin to work at minimal thrust force until the control surfaces (501) begin to rise to the position in which they would give some lift lower than the aircraft's weight if it would fly at low speed. Only when the procedure of lifting the control surfaces is finished, the vertical rotors (3000) go on rising the thrust and lifting the aircraft.

During the take-off and the hovering the vertical rotors (3000) stabilize the aircraft in every axis including the flight altitude and the positioning of the aircraft with regard to the ground, like a multi-blade aircraft, up to a certain aerial speed, because this control is quicker and more agile than the ability of the fixed horizontal rotor (350) to do so.

When the vertical rotors (3000) produce thrust equal to the aircraft's weight, then it hovers in the air. When the thrust is bigger than the aircraft's weight, then the aircraft climbs, and when the thrust is smaller—the aircraft lowers.

When it is windy the free wings (400) produce lift and it saved energy from the vertical rotors (3000) when keeping the altitude is needed. When we want forward flying we operate the fixed horizontal rotor (350), the aircraft moves forward at a constant pitch position in case a different pitch position was needed to stabilize and direct the aircraft.

When the free wings (400) begin to produce lift they are the direct the aircraft at the rolling axis, the vertical rotors (3000) stop directing the aircraft at the rolling or pitching axis and their main function is to determine and keep the pitch angle of the chassis (200), to turn the aircraft around when there is no direction stabilizer and to act as backing for the steering when there are steering problem. It is possible to add a pitch stabilizer in order to help the vertical rotors while flying horizontally and when there is a problem because the rotors stop working.

When the aircraft accumulates airspeed the free wings (400) produce lift and contribute to the general lift and the aircraft climbs. To stop the climbing we reduce the rotors thrust to a minimal thrust which enables control at a fixed angle of the pitch of the chassis (200). If the aircraft is still climbing the lift on the wings has to be reduced with the control surfaces (501).

The forward speed is controlled by the thrust in the horizontal engine. As the speed of the aircraft grows, so grows the lift on the wings, when the vertical engines (3000) thrust is already minimal and the aircraft is still climbing, than the lift on the wings has to be reduced by reducing the attack angle with the control surfaces (501).

When hovering the fixed horizontal rotors (350) stops the thrust until the aircraft slows down while the altitude control is performed with the vertical rotors (3000) and the lift on the free wings (400). At air speed zero all the lift is supplied only by the vertical rotors (3000), and then the control of vehicle's position and situation is performed by these engines only.

The wing control surfaces (501) are always operating to stabilize the aircraft's rolling, in case there is wind for example. Flying backward is performed by the vertical rotors (3000) but at this situation the free wing (400) turns over as shown in FIG. 31 and the air flow produces a downward force, is a heavy burden on the vertical rotors (3000) and endangers the aircraft to crash.

In order to prevent this situation the control surfaces (501) change direction to the lower part of the free wing (400), that is upwards when the wing is in this situation, so that a positive attack angle is produced, which changes the lift upwards. In this situation the control surfaces still function to stabilize the aircraft in the rolling level.

When human control of the aircraft is needed, it is performed by two sticks with two freedom degrees each, which send orders to the flight computer that controls the aircraft. The vertical axis of one stick, which is centralized, control the speed and position of the aircraft by the pitch angle of the chassis. By beginning to push it forward at first it controls the vertical engines (3000) on the pitch axis until the speed is reached, or a specific pitch angle at which the vertical rotors (3000) change and fix the pitch angle of the aircraft's chassis (200) and then the fixed horizontal rotors (350) begins to work and produce thrust. At this stage the computer controls a constant pitch angle and from now on the speed is controlled by pushing this stick. The maximum speed is reached when the stick reaches the edge of its movement. When the stick is returned towards the center, from a certain point the fixed horizontal rotor (350) stops working and the aircraft is again controlled by the vertical rotors (3000). Delays and rejections can be integrated in these actions.

The horizontal axis of this stick controls the rolling of the aircraft by activating the vertical rotors (3000) at low speed and the wing control surfaces (501) at speeds when the wings (400) produce the appropriate lift. The vertical axis of the second stick controls the vertical rotors and the lift of the wings as described at this application.

The horizontal axis of the second axis controls the rotation of the aircraft, which is performed by the vertical rotors, and/or a direction stabilizer which is connected to the chassis or to the wings when the aircraft is flying forward.

When the aircraft is flying horizontally the vertical engines are planned to provide mainly lift and turning, as there is no direction stabilizer. In this way the aircraft is using the strong aerodynamic forces which are making it efficient in energy consumption.

These vertical rotors are planned to join the steering during the horizontal flight when some steering problem arises. Controlling the control surfaces of the free wing is not necessary, but improves the energy efficiency and enables control of the aircraft for a smooth and pleasant flight.

Because of the numerous variables there is a possibility to perform a control combining the vertical rotors (3000), the fixed horizontal rotor (350) and the wing control surfaces so that the lift compared to the drag and general energy consumption is minimal for a certain speed which was calculated when the aircraft flies at a constant altitude.

Another design for example: where there are more wings in tandem where there are wings in the front side and wings in the rear side of the aircraft. controlling the front wing and the back wing by control surfaces changes the lift forces of each one of them and it can balance the aircraft pitch so the is no need to do it by the vertical rotors (4) no by stabilizers so as a result it is possible to shut them down and by that save more energy and control the aircraft by aerodynamic force with relatively low energy consumers servo motor of the control surfaces. By electrically brake the motors by the speed controller of each motor the propeller will reach the position where their drag is minimal.

From the explanations and the figures in this patent application it is understood that the multirotor aircraft (100) includes a chassis (200), three or more vertical rotors (3000), one or more free wings (400), and one or more fixed horizontal rotor (350). The free wing (400) is attached to the chassis (200) by an axial connection (18) so that the angle of the free wing (400) may be changed relative to the chassis (200) due to the flow of air over the free wing. The multirotor aircraft (100) may also include an actuator (500) or control surface (501) and the actuator and the control can change the angle of the free wing relative to the chassis. The free wing can rotate freely and independently 360 degrees endless times, but it may also include a movement-limiting device.

The fixed horizontal rotor (350) enables the multirotor aircraft (100) to lower and climb while flying forward at a stable horizontal pitch of the chassis (200). It is preferably that the pitch of the fixed horizontal rotor (350) will be relatively larger than the pitch of the vertical rotors (3000). The fact that the multirotor aircraft (100) is able to climb and lower during horizontal flight at a constant stable pitch of the chassis (200) provides great advantages: For example, when the multirotor aircraft (100) is equipped with a camera then there is no need for stabilizing equipment, or when the aircraft includes passengers they will be at horizontal position during the flight. It is clear from the above explanations that a multirotor aircraft without a fixed horizontal rotor should change the pitch of its chassis during lowering and climbing when flying horizontally.

The vertical rotors (3000) are fixed to the chassis (200) but it is clear that their direction may be changed, for example, when the aircraft fly forward the chassis (200) tilt forward at some degrees for creating a horizontal power for the forward movement and at the same time a vertical power for the lifting of the aircraft. Due to their main aim, which is the lifting of the aircraft, these vertical rotors (3000) have relatively small pitch, which is efficient for the lifting and for very low speed but inefficient for the forward movement at a relatively higher speed unless using mechanical complex less reliable variable pitch propellers mechanism. For the movement forward it is more efficient to use a rotor with relatively large pitch, as of the fixed horizontal rotor (350). The fact that the power that derives the aircraft horizontally forward comes from the fixed horizontal rotor (350) with has relatively large pitch that fit for a relatively high speed optimizes the battery utilization, rather than using the vertical rotors (3000) for driving forward the aircraft at such speeds whereas their pitch are more fit for lifting low speed airspeed.

The multirotor aircraft (100) may be controlled by the unique remote control system (9) based on a unique method. Before explaining the method under which the remote control system (9) is operated, first we will explain the known methods of known remote control systems for aircrafts, which usually includes two joysticks. For that, we should divide the term 'aircraft' to an airplane that is characterized by a fixed wing and a horizontal motor and a multirotor that is characterized by vertical motors.

In airplanes, the LEFT joystick controls the motor power which controls the speed and the RIGHT joystick controls the airplane pitch which controls the altitude. In multirotors, the LEFT joystick controls the mainly altitude and the RIGHT joystick mainly controls the speed. In our days, there are many types of combined aircrafts that function as a multirotor when taking-off and landing and as an airplane when flying forward. The remote control system of those combined aircrafts function according those two methods: In taking off the LEFT joystick controls the altitude and in flying forward the RIGHT joystick controls the altitude and the LEFT joystick controls the speed. For moving from each state to the other one the user needs to switch a button. Psychologically is it better for the user to use the same joysticks for climbing and lowering and for the speed all the time and in all situations and the method of the remote control system (9) of the aircraft (100) provides good answer for that problem.

The remote control system (9) of the aircraft (100) includes a left joystick (91) and a right joystick (92). The left joystick controls the altitude of the aircraft (100) by controlling the speed of the vertical rotors (3000) and the control surfaces (501). The right joystick controls the speed and the movement forward of the aircraft (100) by controlling the coordination of the vertical rotors (3000) and by controlling the fixed horizontal rotor (350). The first tilt segment (921) of the right joystick (92) controls the coordination of the vertical rotors (3000) and the second tilt segment (922) of the right joystick (92) controls the fixed horizontal rotor (350). The left joystick (91) and the right joystick (92) serve for the same function during the take-off and hovering as well as during the horizontal flight of the aircraft (100). During the take-off and the hovering the left joystick controls the altitude. For starting a horizontal flight with low speed or for dealing with a wind the user can controls the horizontal movement of the aircraft by the right joystick (92)

when at its first tilt segment (921), that may be around 15 to 20 degrees. Thus, the power for such forward movement at low speed comes from the vertical rotors (3000) and at such low speed they are more efficient and power saving than using the fixed horizontal rotor (350) that its pitch are efficient and power saving at speeds of about 40 to 100 km/h as well. When the user pushes the right stick (92) into the second tilt segment (922) then the vertical rotors (3000) returns to a predetermined position (almost vertical) and the fixed horizontal rotor (350) starts to work and pushing further the right stick increase the power of the fixed horizontal rotor (350) and by that increasing and controlling the speed of the aircraft (100). FIG. 32 depicts schematically the remote control system (9) from a back view point with the left joystick (91) and the right joystick (92). FIG. 33 depicts schematically the right joystick (92) from a side point of view with the first tilt segment (921) and the second tilt segment (922) when the number 93 shows the direction of pushing the stick for larger speed.

The left joystick (91) controls the altitude of the aircraft (100) by controlling the speed of the vertical rotors (3000) and the control surfaces (501). The back tilt segment (911) of the left joystick (91) controls the control surfaces (501) and the front tilt segment (912) of the left joystick (91) controls vertical rotors (3000). In horizontal flight the left joystick (91) while at the front tilt segment (912) controls the vertical rotors (3000) and by that controls the altitude of the aircraft (100). In case when the user wishes that the aircraft (100) will fly at a flat horizontal flight at a specific speed, then if the aircraft at that specific speed still climbing then the user reduces the vertical rotors (3000) power and the user may continue to reduce this power when necessary until the left joystick (91) arrive to the back tilt segment (911) and at that point when the vertical rotors are on predetermined minimum power or shot down, if the aircraft still climbing at that specific speed then the user can reduce the lifting power of the free wings (400) by pulling back the left joystick (91) to the back tilt segment (911) that controls the control surfacing (501) till the point that the aircraft (100) flies at a flat horizontal speed at that specific speed. FIG. 34 depicts schematically the left joystick (91) from a side point of view with the back tilt segment (911) and the front tilt segment (912) when the number 94 show the direction of pushing the stick for higher altitude.

According to aspects of the disclosure, a tilt winged multirotor vehicle is provided. The vehicle may include free wings that can move freely on about a longitudinal shaft attached to the multirotor. The free wings may be either controlled by an actuator. In other embodiments, the free wings may be uncontrolled, such that a wing angle and lift produced are a result of the flow of air on the wing.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

These and other features, advantages, and objects of the present invention will be further understood and appreciated by those skilled in the art by reference to the following specification, claims, and appended drawings.

In the following description of various examples of the invention, reference is made to the accompanying drawings which show, by way of illustration, various example systems and environments in which aspects of the present disclosure may be practiced. It is to be understood that other specific arrangements of parts, example systems, and environments may be utilized and structural and functional modifications may be made without departing from the scope of this disclosure.

In addition, the present disclosure is described in connection with one or more embodiments. The descriptions set forth below, however, are not intended to be limited only to the embodiments described. To the contrary, it will be appreciated that there are numerous equivalents and variations that may be selectively employed that are consistent with and encompassed by the disclosures below.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The systems, methods, and devices of the present disclosure relate to fee wing multi-rotors systems for an advanced vehicle configuration, such as an aircraft with vertical take-off and landing ("VTOL") and hover capabilities, as well as cruise capability. In this manner, various embodiments may provide vehicles, such as aircraft, with efficient VTOL and cruise mode capabilities. Certain such tilt wing or free wing multirotor aircraft are described in WO 2016/035068 and related U.S. application Ser. No. 15/505,078 filed on Feb. 18, 2017, as well as U.S. Provisional Application Ser. No. 62/469,404 filed on Mar. 9, 2017, each of which are incorporated by reference herein in their entirety.

The present invention refers to a multirotor aircraft with a free wing, designed so that, on the one hand, wings may be used to enhance flight efficiency and save energy and, on the other hand, the problem that exists with multirotor aircraft equipped with wings that are attached to the chassis or engines of the aircraft is avoided.

Figure 1A:
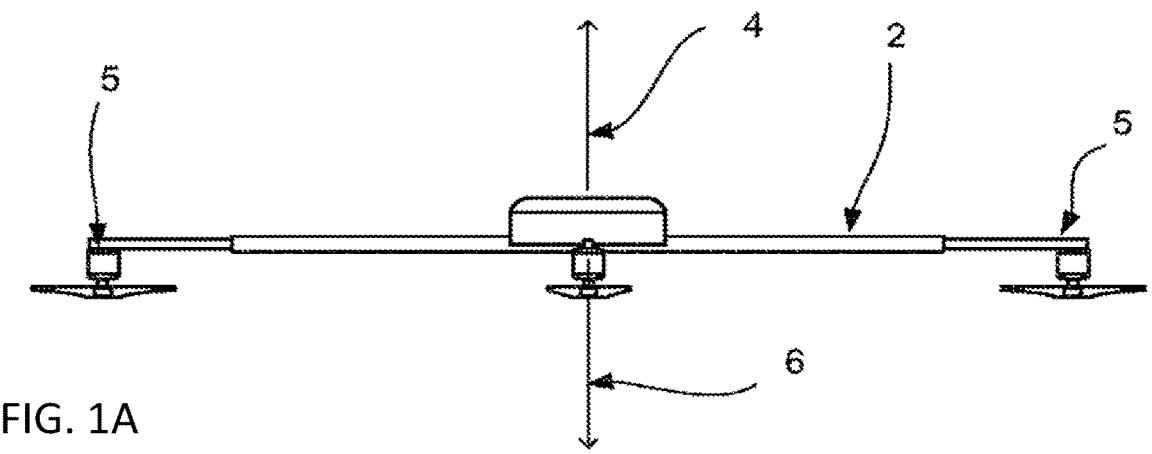
FIG. 1A depicts a multirotor aircraft in horizontal position, and the force vectors acting on it.
Figure 1B:
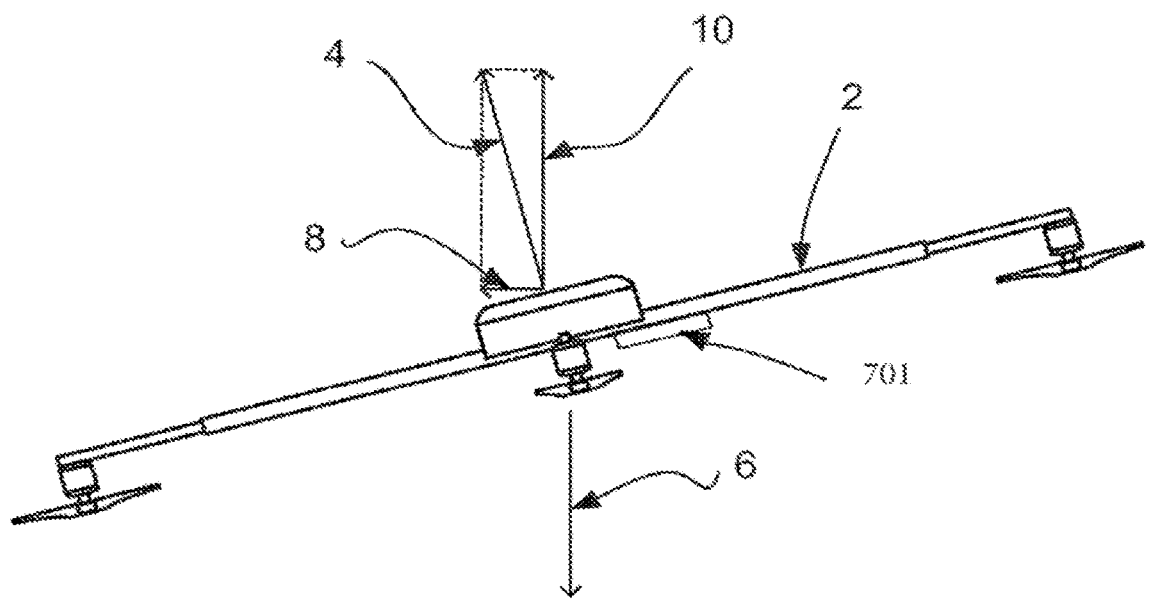
FIG. 1B depicts a multirotor aircraft tilted forward, and in horizontal flight forward.

The multirotor aircraft is stabilized and controlled autonomously by means of sensors and a flight computer that operate its engines and propellers. Thus, for example, if the user wants the aircraft to fly forward, the rear engines receive a command to accelerate, and the front engines receive a command to slow down. This creates the moment that rotates and tilts the craft forward, while the thrust propels it in the horizontal direction. Since some of the energy is required for forward motion, the power of the engines must be increased in order for the aircraft to maintain altitude; thus, the craft consumes more energy in this state, as depicted in FIGS. 1A and 1B. FIG. 1A depicts a multirotor craft (2) hovering in the horizontal position. The lift vector (4) is the overall force applied by the engines and propellers (5) and the gravity vector (6) is the center of gravity of the aircraft (2). When these two forces are equal in magnitude, the aircraft (2) is in a state of equilibrium i.e. hovering and maintaining its flight altitude.

Drawing 1B depicts an aircraft (2) tilted forward in horizontal forward flight (or when facing a wind), whereby the lift vector (4) is the resultant force created from the action of the engines and the propellers (5) that may be broken down into components so that the forward vector (8) is the component of the resultant force (4) that enables forward movement, and vector (10) is the component of the resultant force that determines craft altitude.

It can be seen that vector (10) is smaller than both vector (4) and vector (6); hence, in this state the craft will lose altitude and descend. To enable the aircraft to maintain its altitude, the resultant force must be increased until vector (10) is equal to vector (6) i.e. the overall weight of maintain flight altitude. Increasing the resultant force causes waste of energy and shortens flight time.

Figure 1C:
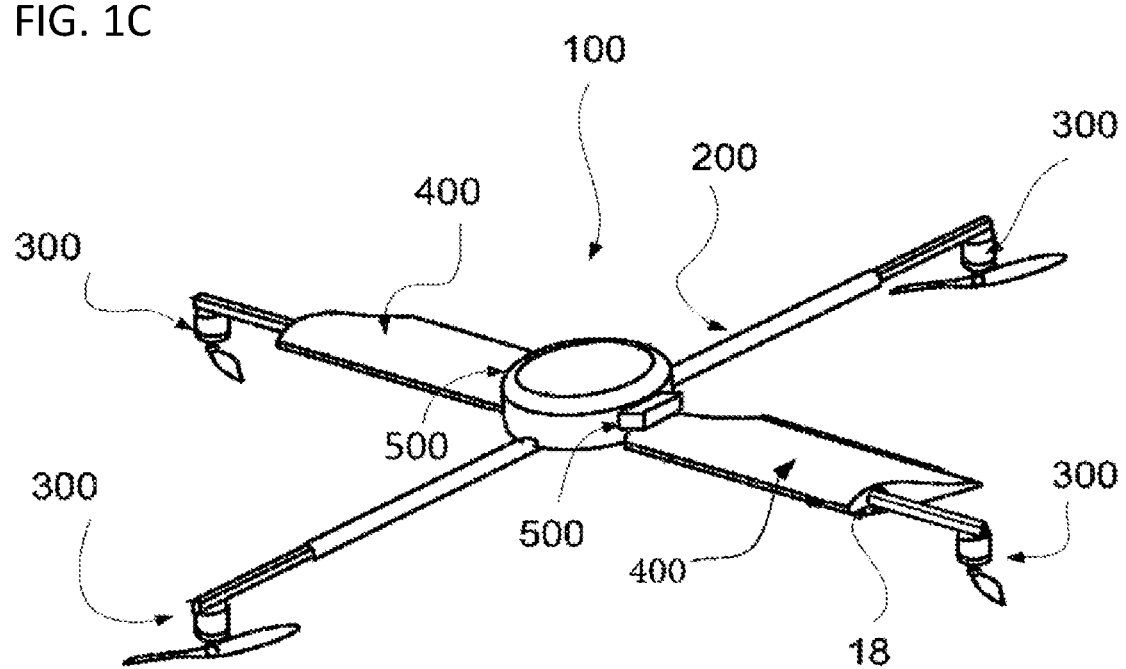
FIG. 1C depicts a multirotor aircraft including a pair of free wings.
Figure 1D:
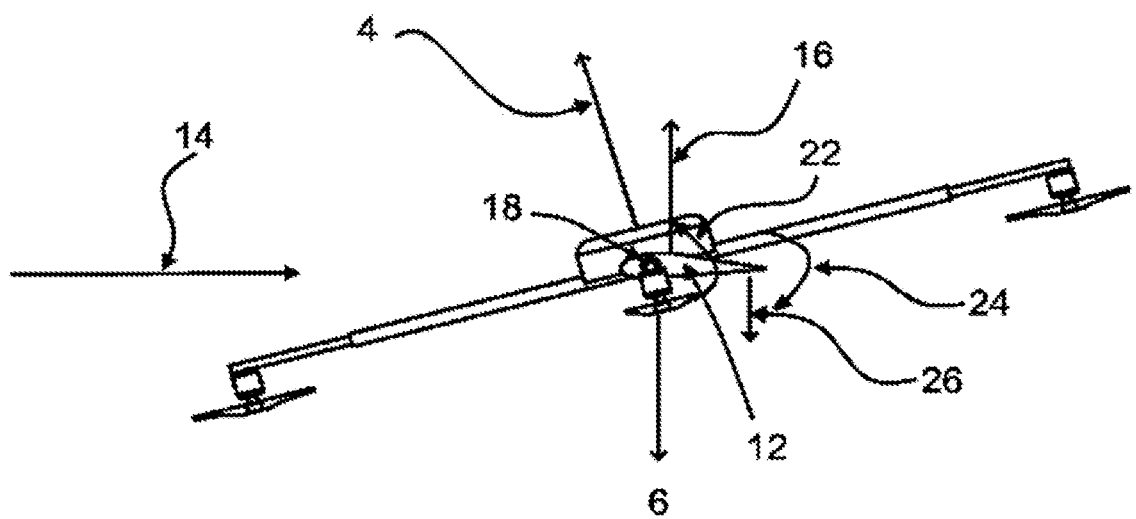
FIG. 1D depicts a multirotor aircraft including free wings and the force vectors acting on it in horizontal flight.

The present invention refers to a multirotor aircraft (100) that comprises a chassis (200), three or more engines (300), and a free wing (400) (or pair of wings on either side of the chassis) as depicted in FIGS. 1C and 1D. The free wing (400) is attached to the chassis (200) by means of an axial connection (18). Thus, the angle between the free wing (400) and the chassis (200) may be changed using an actuator (500) or by force of the flow of air over the wing.

In order for the free wings (400) to create lift in flight with a horizontal component (hereinafter "horizontal flight"), they must be at a specific positive attack angle relative to the airflow direction (14). Since the chassis (200) tilts forward towards the airflow, it is important that the free wing (400) not be permanently attached to the chassis. Otherwise, a negative angle will be created, causing loss of both altitude and energy.

To bring the free wing to a specific positive angle relative to the airflow, the actuators that govern the wing steering or computer-controlled wing-mounted engines may be used. Alternatively, a totally free wing (400) may be used that attains its optimal state relative to air movement automatically, without intervention. This is possible thanks to the wing's structure, but in this case it will be less aerodynamically efficient for a variety of flight positions.

The free wing (400) is attached to the chassis (200) by means of an axle (18), in such a way that enables the free wing to rotate freely around this axle. The free wing (400) is automatically stabilized against the airflow (14) (or is stabilized by a computer-controlled actuator), adding upward lift, which is denoted as a vector (16) and supplements the lift created by the engines (300).

The free wing, depicted for instance, in FIG. 1D, may rotate freely around the axle (18). Vector (16) is the upward lift created by the free wing, whose center is positioned behind the axle (18), thus creating moment (22) that causes the trail edge of the wing to rise around the axle (18). A control surface located on the wing or the upward tilting of the trail edge of the wing result in a downward force (26) that causes moment (24) in the opposite direction of upward moment (22), until a state of equilibrium is reached in which the wing is stabilized visa-vis the airflow and produces lift. To maintain efficiency while hovering, the aircraft (100) must be kept facing the wind, and when in flight, the wing must be kept free vis-a-vis the airflow. Designated software, the flight computer, and sensors installed on the aircraft are all used to maintain the orientation of the free wing (400) during horizontal flight.

It is clear from the aforementioned and from the drawings attached to this patent application that the present invention refers to multirotor aircraft (100) with three or more propellers (300) that are attached to the chassis (200) of the aircraft (100) by a fixed connection, so that the angle between the propellers (300) and the chassis is a fixed. In addition, the aircraft (100), subject of the present invention, is equipped with one or more free wings (400) connected to the chassis (200) by means of an axle (18) that enables to change the angle between the wing (400) and the chassis (200) of the aircraft (100). The attack angle of the wing (400) may be changed using an actuator (500) that may be a motor, a propeller, or any other means of rotating the wing. Alternatively, since the free wing (400) is attached in such a way that it can rotate freely, its attack angle may change according to the flow of air towards and over the free wing (400).

Thus, during horizontal flight, the horizontal airflow around the wing adjusts the attack angle of the wing in such a way that the lift vector of the wing (400) is in the upward direction. This increases the lift of the aircraft (100) and reduces the amount of energy required to operate the propellers (300). The invention may be implemented in other versions of aircraft (100) by adding two free wings (400). In addition, the axial connection (18) of the wings (400) to the chassis (200) may be such that the wings may rotate 360 degrees, endless rotations.

When the aircraft (100) is hovering, taking off or landing in a side wind, for example, the aircraft (100) will tilt sideways towards the wind so as to remain above the ground point, and the wing will revolve until it reaches a position in which the leading edge of the wing (400) faces the wind, thus considerably reducing drag as well as the extent to which the aircraft (100) diverts from the ground point over which it is supposed to be. As shown by the drawings and as clarification, each side of the wing (left and right) can rotate independently, this makes the control of the multirotor possible, especially on the yaw axis, since the drag effect each side of the wing differently, so by making each side of the wing independent creates very small momentum compare to the momentum create by the multirotor motors and propellers, for the same reason the multirotor is more stable on windy conditions.

The free wing (400) may be equipped with control surfaces to enable optimal, quick control of wing lift and of the aircraft. Alternatively, the free wing (400) may be equipped with a limiting device to limit the possibility of the wing revolving upward about its axle (18). In other words, in order to create lift at low speeds, the rear part of the wing should not rise above a certain angle. Said limiting device, however, should not prevent the rear part of the wing from being lowered, as required for takeoff, hovering, and landing.

Figure 1E:
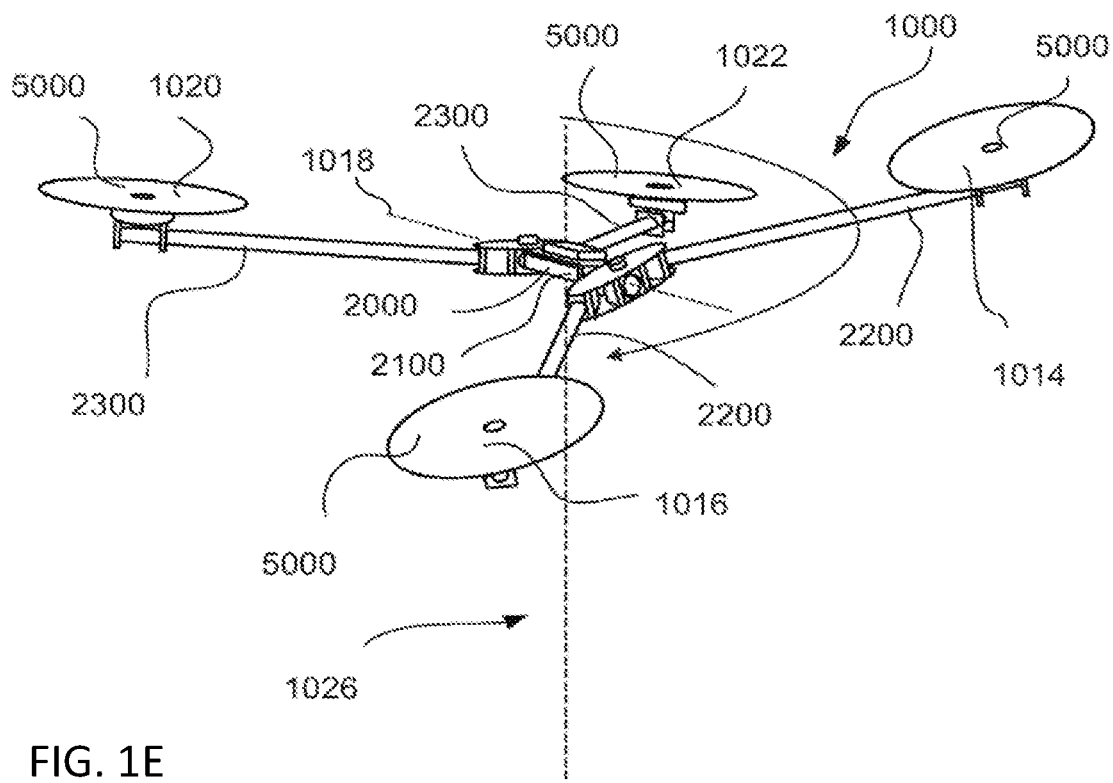
FIG. 1E depicts the multirotor yawing to the right.
Figure 1F:
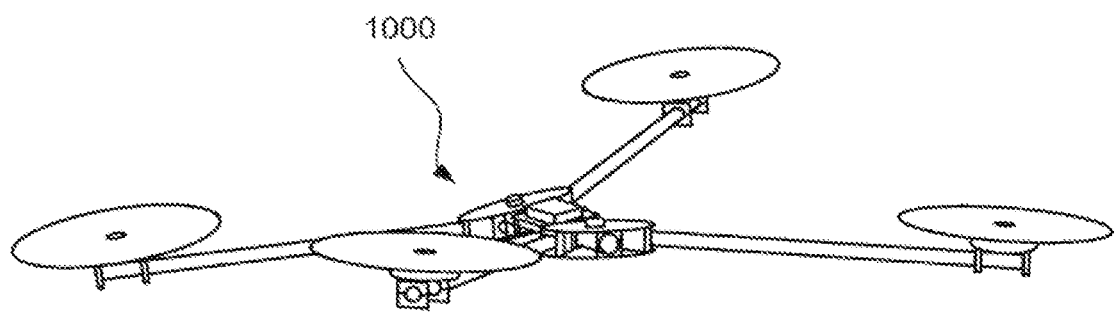
FIG. 1F depicts the multirotor yawing to the left.
Figure 1G:
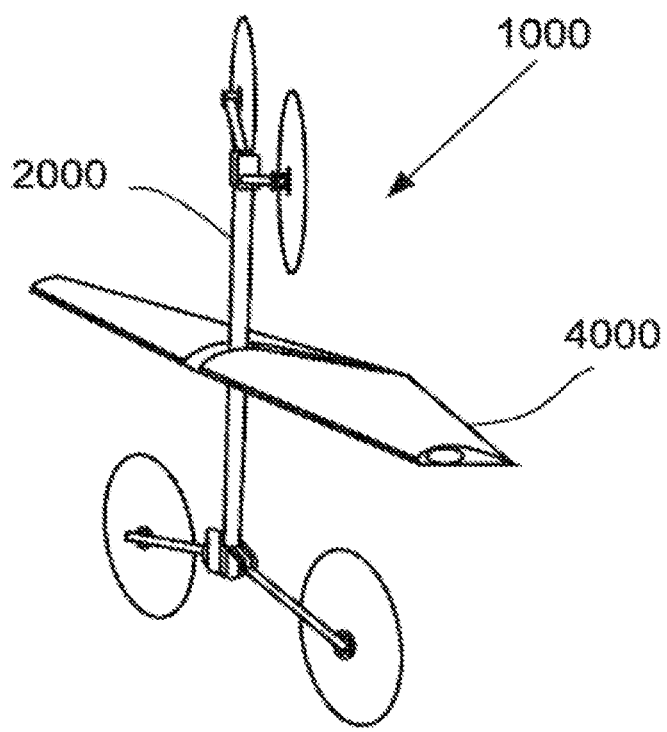
Figure 1H:
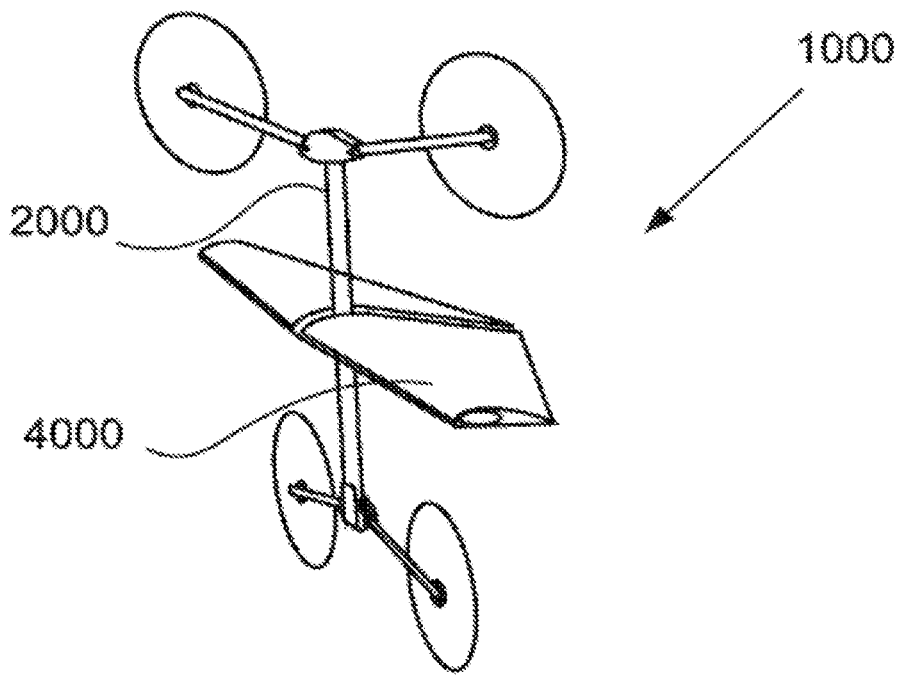

A second version of the present invention refers to the multirotor (1000) schematically depicted in FIGS. 1E and 1F. The revolution around the axle (1026), which is the vertical axle in the multirotor aircraft (1000), is usually the result of the difference in moment between the propellers (5000) that are revolving clockwise and those that are revolving counterclockwise. These moments are relatively small, for optimal control of the multirotor. The multirotor (1000) includes a chassis (2000) and four or more propellers (5000).

The chassis (2000) consists of a main body (2100) and a pair of shafts (2200) (2300), which, for the sake of this explanation, we shall refer to as "right shaft" (2200) and "left shaft" (2300).

A propeller (5000) is attached to the end of each of said shafts and each shaft (2200) (2300) is connected to the main body (2100) by an axial connection (1018). Assuming the four propellers (5000) operate with the same force, upwards for instance, the multirotor (1000) will ascend vertically in such a way that all four engines (5000) are in one horizontal plane.

Should the user want to yaw the multirotor (1000) say, to the right, he may do so by increasing power in one propeller on the right shaft (2200) and reducing power in the other propeller on the same shaft (2200). This will cause the right shaft (2200) to revolving around the axle (1018) connected to the main body (2100), since one propeller will ascend and the other will descend, resulting in the multirotor yawing to the right.

FIG. 1E depicts the multirotor (1000) yawing clockwise to the right, due to an increase in the thrust of the engine (1014) on the right shaft (2200) and the engine (1020) on the left shaft (2300) (it is possible to reduce the thrust in engines 1016 and 1022 as well, simultaneously) thus causing the multirotor to yaw around the main axle (1026). FIG. 1F depicts the opposite situation in which the multirotor yaws to the left.

A third version of the present invention refers to the aforementioned multirotor (1000) wherein it is also equipped with a free wing (4000) that is attached to the main body (2100) of the chassis (2000) by means of an axial connection, as depicted schematically in FIGS. 1G-J in several positions.

FIG. 2A illustrates an example free wing vehicle that include eight rotors 300 (an "octa-rotor copter") off of body 100, three sets of free wings 400 and rotor 350, e.g., a push or pull rotor, at an aft end of the vehicle. Rotors 300 may or may not be protected by shrouds to improve performance. Six balanced free wings 400 may be free to rotate separately or paired as desired. Wing balancer 450 may be designed to keep wing 400 horizontal even without face wind to provide better lift in low speed and keep solar panels that may be mounted on top of the free wing 400 facing up receiving as much sunlight as possible. Balancer 450 may not be mandatory to the vehicle designs described herein, it is preferred that free wings 400 will be vertical during hover in which case balancer 450 will not be included. Free wings 400 may be arranged between rotors 300 to reduce wind effects on the rotor 300 and maximize effects from outside wind and wind caused by movement of the aircraft. Reducing wind effect on the rotors 300 will increase atmospheric wind immunity during hovering and VTOL modes. Other embodiments discussed herein which may have rotor wind effects on the free wing may have different arrangements of rotors and wings. Body 100 may contain batteries 120 that provide power to the rotors 300 and to the control system 150. Control system 150 may include CPU with SW to control the plane and peripheral sensors such as a global positioning system, accelerometer, compass, airspeed sensor and the like.

FIG. 2B illustrates a twisted bar configuration of front and rear rotor bars 301. Bars 301 may be controlled but not limited with a servo motor or freely changed when a rotor speed of two restive rotors are different. Such mechanism may increase yaw effect created by the rotors 300, e.g., to overcome yaw effects caused by differences in drag between wings 400. In some embodiments, the movement of the twisted bars 301 may include a shock observing mechanism (not shown) to moderate erratic gusts of wind.

FIG. 2C illustrates a close-up view of the pair of rotors 350 at the aft end of body 100 of a multirotor vehicle. Both rotors 350 may be rigidly connected to each other and may be configured to move together around the pivot 314. Each of the rotors 350 may include a pushing or pulling motor, and may be configured to push or pull the multirotor vehicle forward. Each of the rotors 350 may also be configured to control the yaw axis by thrust vectoring, created by a differential control between the pair of rotors 350. For example, if the right rotor provides more thrust than the left rotor, the pair of rotors will rotate to the right via pivot 314 and the multirotor vehicle will yaw to the left. Thus, the pair of rotors 350 may operate as a self-actuated, vector thrust rudder to control a yaw of the vehicle.

FIG. 2D is a lower perspective view of the vehicle body 100, that shows a cargo bay door mechanism 170 along a bottom portion of body 100 that in closeable and may be used to store packages 220 or other types of payload. Door mechanism 170 may include hinges, actuators, or other similar components for allowing the door to be opened and closed.

FIG. 2E illustrates a free wing vehicle in accordance with another embodiment that includes two pull rotors 350 (as known as tractors). Pull rotors 350 may be configured to control a yaw axis of the aircraft by controlling the power of each pull rotor 350 differentially or by reversing a rotation direction of one of the pull rotors 350 so as to reverse the thrust to a negative thrust relative to the other pull rotor 350 may also be configured to control the yaw while the vehicle is hovering. Free wings 400 may be placed on an upper portion of vehicle body 100 and above pull rotors 350, e.g., so as to not stand out from body 100. Payload free wing 480 may be relatively larger than the other free wings 400 and may include a balancer 450. Payload free wing 480 may be configured to holding packages or containers or sensors or any other payload types for the vehicle operation. As shown in FIG. 2F payload space 470 is provided in a portion of payload free wing. These features of the vehicle illustrated in FIGS. 2A and 2B may provide larger lift than the component total weight.

In another embodiment, one or more containers 470 may be provided in a central portion of the vehicle instead of payload free wing 480. As shown in FIG. 2G, a plurality of containers may be provided and may be aerodynamically shaped so as to reduce drag.

For example, containers 470 may be designed and adapted so as to store and/or spray liquids when mounted in the vehicle. A cross section of container 470 is shown in FIG. 2H. Container 470 may be divided by one or more partitions 471. Partition 471 may be configured to maintain balance of the container 470 even when rotated. Each partition 471 may be provided with a hole 476 at a lower portion and/or a leaf valve 472 to allow liquid to flow between cells only in one direction, e.g., toward a center portion of the container when a sprayer 475 is provided. Sprayer 475 may be provided with small holes for spraying the liquid from the container 470. A first baffle 477 may be provided and may be configured to refill or refuel the container 470, and second baffle 478 may be provided and may be configured to release air while refilling or refueling the container 470. In order to spray the liquid from container 470, first baffle 477 may be sealed and second baffle 478 may be used to inject air by a compressor in the vehicle. Generated pressure from the injected air may cause liquid to spread to sprayer 475.

FIG. 3A illustrates a free wing quadcopter with a divided wing 400. The quadcopter includes four rotors 300 coupled to body 100. Payload container 470 may be provided on a lower portion of body 100. Divided free wings 400 may include various features for improved aerodynamics. As shown in FIG. 3B, divided free wing 400 includes wing main body 401 that may be configured to provide lift. Control plate 402 may be connected to main body 401 and positioned forward of main body 401 via one or more connecting members. Control plate 402 may aerodynamically optimize the wing profile and effectively increase the aspect ratio of the wing 400. Control plate 402 may also be designed to increase the moment of the wing and/or to reduce to total weight of the wing relative to the lift provided. Weight balancer 450 may be configured to balance the wing 400 horizontally by pivoting the wing 400 about rotation axis 410.

Payload container 470 may be arranged in series along a bottom portion of body 100, as shown in FIG. 3C. Add-ons may be provided to the front and the back ends of the series of payload containers for improved aerodynamics. All mechanisms of containers/components carriers described above can be used in different platforms and not limited to the platforms shown in the drawings.

FIG. 4A illustrates a free wing quadcopter with a pair of free wings 400 projecting off opposite longitudinal sides of body 100, and four rotors 300 coupled to body 100. Rotors 300 may each have a variant pitch mechanism 320. Variant pitch mechanism 320 may be configured to optimize the rotor 300 for hovering (i.e., low pitch, low rotor speed) as shown in FIG. 4A as well as forward flight (i.e., high pitch, high rotor speed) while the wings 400 provide lift as shown in FIG. 4B. It is noted that a pitch mechanism is not mandatory and may be used to achieve improved power consumption, performance and speed. A gimbaled camera mechanism 110 may be mounted at the front of body 100. As shown in FIGS. 4A and 4B, camera mechanism may be designed and positioned to provide 360 degrees during flight, even when the vehicle is positioned as a high pitch or angle of attack.

FIG. 5A illustrates another free wing quadcopter with a pair of free wings 400 projecting off opposite longitudinal sides of body 100, and four rotors 300 coupled to body 100. Wing lock mechanism 110 may be provided and may be configured to enable the vehicle to operate in a full "plane mode" by locking wings 400 at a fixed angle to the body 100 (e.g., parallel to the body 100). Such "plane modes" may be employed in high speed maneuvering, e.g., for special tasks, or interceptions. The free wings 400 may be equipped with control surfaces configured to be controlled by a main controller assembly housed in body 100. Main controller may control the control surface by sending a signal along a wire or wireless to a servo or an actuator 411 coupled to the control surface so as to move the control surface about a pivot connection 412. A slip ring assembly 407 may be provided between the wing 400 and the body to allow the wing 400 to rotate without damaging any wiring. In some embodiments, slip ring 407 may also transfer the electric power created by a solar panel provided on the wing to a main battery located in the body 100. Signals from the main controller may also transmitted to actuator 411 by a pair of transceivers, one transceiver locked one on the wing 400 and the other in the body 100.

Control plates may be provided and may be configured to control roll and pitch. The rotors 300 may be shut down or may be kept powered on to assist this flight mode as required. An additional free or controlled stabilizer 150 may be provided as shown in FIG. 5B. Stabilizer 150 may be configured to control the yaw in plane mode, to assist in other modes during forward flight, to reduce drag while in hover or VTOL flight modes, and/or to increase stability and control on the yaw axis.

As shown in FIG. 5C, stabilizer 150 may be locked or fixed on body 100. Stabilizer 150 may be configured to balance yaw momentum and/or overcome yaw momentums caused by drag of winds, rotors or other components. Electro-mechanical mechanism 130 may be provided on a lower surface of body 100 to reduce drag from rotors 300 by folding the rotors 300 and rotor arms into or adjacent to the body 100, as shown in FIG. 5D. The positioning of the rotors 300 relative to a folded or unfolded position may be controlled by the main controller and using a servo motor or any other mechanical component. In addition, the rotors 300 may be configured to be locked at an angle associated with reduced or minimal drag.

FIG. 6 illustrates a free wing quadcopter with multi-part wing 400 projecting off opposite longitudinal sides of body 100, and quad rotors 300 coupled to body 100 at front and rear ends of body 100. Push rotor 350 may be provided and an end of body 100. Free wings 400 may include a plurality of wing parts coupled together at a pivot axis, and each wing part may or may not be balanced. The multi-part wing 400 may provide enhanced vehicle stability, e.g., in the event of erratic wind forces during hovering, while still providing the lift for forward flight. In some embodiments, multi-part wing 400 may also be configured for wing folding configurations (not shown).

FIG. 7A illustrates a free wing quadcopter with a wing assist, with free wings 400 projecting off opposite longitudinal sides of body 100, and quad rotors 300 coupled to body 100 at front and rear ends of body 100. Push rotor 350 may be provided and an end of body 100. Free wings 400 may each include an actuator or stepper motor 110 configured to assist or control movement of the wings 400 or to lock the wings 400, e.g., for a full plane mode as described above. Stepper motor 110 may be provided between the wing 400 and body 100, as shown in the close up view in FIG. 7B. Winglets 460 may be provided on each tip of the wings 400 and may be configured to reduce drag and increase efficiency of the quadcopter vehicle.

FIG. 8A illustrates a free wing quadcopter with free wings 400 projecting off opposite longitudinal sides of body 100, and quad rotors 300 coupled to body 100. A middle free wing 401 may be configured for a payload, and may be stabilized by rotors 110 provided in a portion of the middle free wing 401. A close up view of rotors 110 is shown in FIG. 8B. Rotors 110 may be configured to stabilize to middle free wing 401 and may include smaller and lower energy consuming rotors than rotors 300. Rotors 110 may be configured to keep middle free wing 401 horizontal, even when the vehicle tilts to steep angles during forward flight. Rotors may be able to create a large amount of momentum relative to their weight, unlike other known mechanical accessories, like stepper motors or other actuators.

FIG. 9A illustrates an autonomous or manned service vehicle 800 equipped with a lift mechanism 760 and wheels 650. Since it is difficult for VTOL drone to land precisely there is a need for a Service vehicle 800 may have maneuvering capabilities in all directions and may include optical sensors configured to allow an aerial vehicle 1000, similar to the free wing quadcopters or vehicles described above, to be locked thereon and to maneuver the service vehicle 760 for placing and/or moving the aerial vehicle 1000 and can autonomously maintain, operate, charge, protect and collect goods from the air vehicle. Both the service vehicle 760 and the aerial vehicle 1000 may have conductive surfaces that contact each other when the aerial vehicle 1000 is mounted thereon. Such conductive surfaces may be enabled to charge the aerial vehicle 1000 by solar panels attached to them while positioned on the service vehicle 760. As shown in FIG. 9B, in some embodiments, service vehicle 760 may be protected by a container 750 that may also protect the aerial vehicle 1000. The container 750 may have solar panels 850 that may be configured to charge batteries of the aerial vehicle 1000 and the service vehicle itself and by that it becomes self-depended.

FIG. 9C illustrates an array of vehicles 800 arranged in a parking area associated with maintenance and a landing area for aerial vehicles 1000. Each landed aerial vehicle 1000 may be transported by a vehicle 800 to the maintenance parking area to recharge and refuel and returned to the landing site for takeoff. A central control system (not shown) may wirelessly control the entire fleet. FIG. 9D illustrates another embodiment of vehicle 800 with solar panel 850, and maneuvering components 653, 658.

FIG. 10A is a cross sectional view of a wing profile 400 of a free wing vehicle. Wing 400 may be configured to rotate about axis 428 until stabilized at a minimal drag angle of attack. Vector 416 illustrates the magnitude and direction of lift provided by wing 400 in front wind conditions. Axis 444 is the axis on which control plate 432 is connected to the wing 400. Vector 418 illustrates the magnitude and direction of force provided by the control plate 432 in front wind conditions. Servo motor 411 is connected to push rod 760 which is connected to the control plate 432. Vector 423 illustrates the magnitude and direction of total weight of the vehicle. Angle of attack 458 illustrates a pitch angle of the wing 400.

As shown in FIG. 10B, the servo motor 411 is pushing the push rod 760 in order to push control plate 432 and increase the attack angle 458. If air speed is maintained, such action will result and increase the lift vector 416. FIG. 10C illustrates a configuration that may occur in hovering mode in which the atmosphere wind arrives from the back. In such case the free wing 400 rotates to the other side until minimal drag is reached. In order to increase lift by pushing up the control plate 432 the push rod 760 must be pulled instead of pushed and vice versa.

FIG. 11 illustrates a free wing vehicle mounted with a grasping mechanism in accordance with one or more aspects of the present disclosure.

There are some types of multirotor and many ways to fold wings, some wings are fabric wings with tube structures, some are fabric inflated in which the structure becomes strong from the air pressure created a box shape structure. Some structures are stiff telescopic airfoil shape which is one inside the other and can be deployed in the same way as in electric telescopic car antenna.

Those folded winds can be controlled on the roll axis by twisting them with cables and actuators, or by moving the center of gravity by an actuator like done in hang gliders, or by an aileron in certain embodiments. It can also be controlled by the multi-rotors, but such configurations waist more energy.

One multirotor type is shown on FIG. 12A where it is equipped with a chassis 200 and 4 rotors 300 attached to it and a pusher rotor 350 attached to it in a perpendicular way. This type of multirotor controls the chassis by using the four or more rotors like any other multirotor, as described above, during hovering and/or during VTOL stages, but in the forward flight mode, the multirotor stabilizes in a horizontal position or other constant angle and the pusher motor 350 starts turning and moving the aircraft forward.

On this stage after gaining some airspeed the wings 400 are deployed as shown on FIG. 12B and create lift which lift the multirotor up and the thrust of the rotors 300 can now be lowered in order to keep level altitude and thereby saving energy. When slowing down back to hovering or VTOL position the atmospheric wind becomes again more dominant compare to the multirotor airspeed and the wings 400 are folded again on order to make the multirotor controllable and stable on windy condition.

Since the loose fabric can be a hazard and create drag while folded, a spring stipe 480 may be provided inside the fabric rolls the wing trail edge and tied to wing structure.

Another embodiment for folding wing is accordion like wing surface with a telescopic tube structure inside it.

FIG. 13A shows another way of folding wings with three joints on each wing, which can be done by radial or linear actuators, by hydraulic or pneumatic pistons or by electric motors turns pulleys and cables. The wing fabric might be elastic so there is no need to collect and roll the fabric. Another way is an inflated wing which can be inflated by an airborne air compressor and a spiral spring along the wing to fold it back to prevent from it get into the working rotors.

FIG. 14A describes an embodiment of a drone with quad vertical rotor 300 a push rotor 350 and free wings 400. 225 is a mechanical lock/unlock mechanism that locks the wings on high wind speed and release it in low speed. In FIG. 14B there is a detailed description on of 225 in unlock state. 282 is the free wing axis. 284 are the springs that keep the breaks pads 286 open in low wind. 257 are the aerodynamic pedals that are pressing the brakes 286 on the wings axis 282 in high wind speed 107 as shown in FIG. 14c, FIG. 15A illustrates an extendable free wing quadcopter vehicle in accordance with one or more aspects of the present disclosure. FIG. 15B is the extendable free wing quadcopter vehicle in a retracted configuration of FIG. 15A.

Control systems will now be described for various multirotor vehicles. The following control system architectures may be applicable to any of the above described vehicle configurations.

FIG. 16 is a system diagram of an avionics system for a free wing vehicle in accordance with one or more aspects of the present disclosure.

FIG. 17 is a flow diagram for a motor emergency of a free wing vehicle in accordance with one or more aspects of the present disclosure.

FIG. 18 is a flow diagram for wing tilt of a free wing vehicle in accordance with one or more aspects of the present disclosure.

The vehicles described herein may operate with a control system that modifies or adjusts certain components of the vehicle based on sensed. Conditions. The process flows associated with the control system are described in more detail with regard to the flight conditions described below.

Basic Flight modes include transition conditions: Ground mode to Take off (Arming motors/rotors); Takeoff to Hover (Reaching predefined height or increase speed); Hover to Flight (Activating push/pull rotor); Flight to hover (Stop push rotor); Hover to Landing (Reaching position and predefined height and no speed); Landing to Hover (Increase speed); Landing to Ground (Disarming motors/rotors); Take off to Landing and vice versa (manual mode only, changing direction of vertical speed with throttle stick).

Ground mode includes: Full control over wing plates, full functionality of all sensors, all motors are disarmed.

Takeoff mode includes: Only vertical motors are controlling and stabilizing the drone; Wings plates are locked in maximal lift state; Only vertical speed allowed pitch roll and yaw are used to maintain position; In manual mode throttle position defines vertical speed; Negative vertical speed will switch to landing mode; and transition to hover upon reaching predefine height or speed >0.

Hover modes includes: Only vertical motors are controlling and stabilizing the drone; Wings plates are changed to provide lift for required vertical speed; In manual mode pitch stick controls push rotor RPM; Opposite wing plates control when flying backward and wings are stabilized in opposite direction.

Flight mode includes: Push rotor provides thrust for required speed; Pitch locked in predefined angle to provide minimal drag; Wing plates provide roll and vertical speed; Rotors in minimal speed to save energy; Rotors provide yaw and pitch; and Rotors assist wing plates in roll and vertical speed upon reaching predefined error.

Landing mode includes: Only vertical motors are controlling and stabilizing the drone; Wings plates are locked in minimal lift state; Only vertical speed allowed pitch roll and yaw are used to maintain position; In manual mode throttle position defines vertical speed; positive vertical speed will switch to takeoff mode; transition to hover upon speed >0; Transition to ground upon measured airspeed and height=0 and minimal RPM on rotors.

An aircraft with a fixed wing is also provided, having the ability of vertical take-off and landing. It flies horizontally in a constant pitch angle by using a wing which moves freely around a vertical axis and driven by vertical and horizontal engines. By using a constant wing at least two thirds of the energy needed for the flight is saved. Aircrafts with a constant wing are usually built from a chassis, wings and engines which are joined together rigidly. This forces the aircraft to adjust to the direction of the air flow so that air flows around the wing to produce lift. In order to climb or lower the vehicle has to change its pitch angle.

The pitch angle is a nuisance because it prevents people from walk inside the aircraft when the angle is too sharp. If a camera or a baggage is installed some stabilizing devices are needed, like engines and mechanisms with some degrees of freedom which will stabilize them. These stabilizing devices are complicated and add extra weight to the aircraft. Aspects of this disclosure combine a unique structure and a unique flight control algorithm which enable the aircraft to fly horizontally at a fixed pitch angle both while climbing and lowering as long as no turns are needed. This removes one important degree of freedom, because during aerial photographing the aircraft flies straight but has to change its altitude according to the physical features.

Aspects of this disclosure enable flight in a constant pitch angle of an aircraft with a fixed wing, both at climbing and lowering of the aircraft. This is possible thanks to a wing which rotates freely around a horizontal axis. It can adjust to every direction in which it advances and produce lift, except in moving sideward.

The aircraft may be made up of the chassis to which 3 or more vertical engines are rigidly attached. These engines produce thrust which is larger than the aircraft's weight and enable it to take off and land vertically and hover in the air, similar to multi-bladed aircrafts. While flying forward they are able to carry a part of the aircraft's weight, while the free wings, which move around a horizontal axis produce lift which carries most of the aircraft's weight. This is possible thanks to one or more horizontal engines, which push or pull the aircraft forward. A flight control device and sensors inside the aircraft perform the control and supervision of the aircraft. Carrying the aircraft's weight on the wings saves up to a third of the energy demand. Wings may be equipped with a pair of control surfaces which control the attach angle of each wing separately, and so rise or lower the lift of each of them, which enables to control the climbing and lowering of the aircraft, and the rolling of the aircraft economically, unlike the wasteful rolling performance of the vertical engines.

Keeping the chassis vertical while flying forward is achieved thanks to the wing which spins freely around a horizontal axis. By this it can adjust to every direction in which it is moving and produce lift. If it were fixed to the body it would lose some of the lift if the speed component would come from above. Speed components of the vertical engines, the components of the horizontal engine, and the sum of the components influencing the wing if it were fixed to the chassis, would form turbulence under the wing and the lift would disappear. When the aircraft is climbing, the wing is turned in the flow direction and produces lift. When the aircraft is landing, the wing turns downward and the sum of the speed components preserves the lift.

The aircraft's algorithm and flight control is unique because of its special form and operation technique. When on the ground, the control surfaces of the wing are in neutral position so that a sporadic wing will not produce some lift and rise the aircraft unintentionally. While taking off the vertical engines begin to work at minimal thrust force until the control surfaces begin to rise to the position in which they would give some lift lower than the aircraft's weight if it would fly at low speed. Only when the procedure of lifting the control surfaces is finished, the vertical engines go on rising the thrust and lifting the aircraft.

During take-off or hover modes, the vertical engines stabilize the aircraft in every axis including the flight altitude and the positioning of the aircraft with regard to the ground, like a multi-blade aircraft, up to a certain aerial speed, because this control is quicker and more agile than the ability of the pushing engine to do so. When the engines produce thrust equal to the aircraft's weight, then the aircraft hovers in the air. When the thrust is bigger than the aircraft's weight, then the aircraft climbs, and when the thrust is smaller—the aircraft lowers. When it is windy the wings produce lift, energy is saved from the vertical engines when keeping the altitude is needed.

When forward flying the horizontal engines operate and the aircraft moves to constant pitch position in case a different pitch position was needed to stabilize and direct the aircraft. When the wings begin to produce lift they are the ones who direct the aircraft at the rolling axis, the vertical engines stop directing the aircraft at the rolling or pitching axis and their main function is to determine and keep the pitch angle of the chassis, to turn the aircraft around when there is no direction stabilizer and to act as backing for the steering when there are steering problems. It is possible to add an altitude stabilizer in order to help the vertical engines while flying horizontally and when there is a problem because the engines stop working. When the aircraft accumulates height the wings produce lift and contribute to the general lift and the aircraft climbs. To stop the climbing, we reduce the engine thrust to a minimal thrust which enables control at a fixed angle of the chassis pitch. If the aircraft is still climbing the lift on the wings has to be reduced with the control surfaces.

The forward speed is controlled by the thrust in the horizontal engine. As the speed of the aircraft grows, so grows the lift on the wings, when the vertical engines thrust is already minimal and the aircraft is still climbing, then the lift on the wings has to be reduced by reducing the attack angle with the control surfaces. When hovering the horizontal engine stops the thrust until the aircraft slows down while the altitude control is performed with the vertical engines and the lift on the wings. At air speed zero all the lift is supplied only by the vertical engines, and then the control of vehicle's position and situation is performed by these engines only.

The wing control surfaces may be always operating to stabilize the aircraft's rolling, in case there is wind. Flying backward is performed by the vertical engines but at this situation the wing turns over and the air flow produces a downward force, is a heavy burden on the vertical engines and endangers the aircraft to crash. In order to prevent this situation, the control surfaces change direction to the lower part of the wing, that is upwards when the wing is in this situation, so that a positive attack angle is produced, which changes the lift upwards. In this situation the control surfaces still function to stabilize the aircraft in the rolling level. When human control of the aircraft is needed, it is performed by 2 sticks only withe 2 freedom degrees each, which send orders to the flight computer which controls the aircraft.

The vertical axis of one stick, which is centralized, controls the speed and position of the aircraft by the pitch angle of the chassis. By beginning to push it forward at first it controls the vertical engines on the pitch axis until the speed is reached, or a specific pitch angle at which the vertical engines change and fix the pitch angle of the aircraft's chassis and then the pushing engine begins to work and to produce thrust. At this stage the computer controls a constant pitch angle and from now on the speed is controlled by pushing this stick. The maximum speed is reached when the stick reaches the edge of its movement. When the stick is returned towards the center, from a certain point the pushing engine stops working and the aircraft is again controlled by the vertical engines. Delays and rejections can be integrated in these actions.

The horizontal axis of this stick controls the rolling of the aircraft by activating the vertical engines at low speed and the wing control surfaces at speeds when the wings produce the appropriate lift. The vertical axis of the second stick controls the vertical engines and the lift of the wings. The horizontal axis of the second axis controls the rotation of the aircraft, which is performed by the vertical engines, and/or a direction stabilizer which is connected to the chassis or to the wings when the aircraft is flying forward. When the aircraft is flying horizontally the vertical engines are planned to provide mainly lift and turning, as there is no direction stabilizer. In this way the aircraft is using the strong aerodynamic forces which are making it efficient in energy consumption.

These vertical engines are planned to join the surfaces during the horizontal flight when some steering problem arises. Controlling the control surfaces of the free wing is not necessary, but improves the energy efficiency and enables control of the aircraft for a smooth and pleasant flight. Because of the numerous variables there is a possibility to perform a control combining the vertical engines, the horizontal engines and the wing control surfaces so that the lift compared to the drag and general energy consumption is minimal for a certain speed which was calculated when the aircraft flies at a constant altitude.

The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage memory. Any and all permutations of features from the above-described embodiments are within the scope of the invention.

What is claimed is:

1. A remote control system for a multirotor aircraft having a chassis, at least three vertical rotors, one or more free wings, and at least one fixed horizontal rotor, the one or more free wings are attached to the chassis by an axial connection and are freely rotatable around their horizontal axis such that an angle of the one or more free wings is modified in accordance with airflow relative thereto, the fixed horizontal rotor, the at least three vertical rotors and the one or more free wings enabling the multirotor aircraft to descend and climb while flying forward at a fixed horizontal pitch of the chassis, the remote control system comprising:
a first joystick for controlling a speed of the vertical rotors for controlling an altitude of the aircraft;
a second joystick for controlling horizontal movement of the aircraft, the second joystick having a first tilt segment configured to control coordination of the vertical rotors, a second tilt segment configured to control the horizontal rotor, such that the second joystick controls a speed and forward movement of the aircraft where operating the second joystick within the first tilt segment imparts horizontal thrust to the aircraft by coordinated operation of the vertical rotors, and where operating the second joystick within the second tilt segment move the vertical rotors into a predetermined configuration and the horizontal rotor imparts upon the aircraft horizontal thrust which increases proportionally to a tilt magnitude of the second joystick within the second tilt segment.

2. The remote control system of claim 1, wherein each of the one or more free wings further comprise at least one control surface configured to affect the angle of the one or more wings.

3. The remote control system of claim 1, wherein the one or more wings comprise at least two wings, each having a control surface coupled thereto, the control surfaces of each of the at least two wings being individually controllable.

* * * * *